United States Patent
Kinouchi et al.

(10) Patent No.: US 11,597,010 B2
(45) Date of Patent: *Mar. 7, 2023

(54) PLURALITY OF FLAKY MAGNETIC METAL PARTICLES, PRESSED POWDER MATERIAL, AND ROTATING ELECTRIC MACHINE

(71) Applicant: KABUSHIKI KAISHA TOSHIBA, Tokyo (JP)

(72) Inventors: Hiroaki Kinouchi, Shinagawa Tokyo (JP); Tomohiro Suetsuna, Kawasaki Kanagawa (JP); Takahiro Kawamoto, Kawasaki Kanagawa (JP); Yasuyuki Hotta, Ota Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 1204 days.

This patent is subject to a terminal disclaimer.

(21) Appl. No.: 16/106,636

(22) Filed: Aug. 21, 2018

(65) Prior Publication Data

US 2019/0283127 A1  Sep. 19, 2019

(30) Foreign Application Priority Data

Mar. 16, 2018 (JP) .............................. JP2018-049900

(51) Int. Cl.
H01F 1/24 (2006.01)
H01F 1/26 (2006.01)
(Continued)

(52) U.S. Cl.
CPC .............. *B22F 1/0545* (2022.01); *B22F 1/17* (2022.01); *B22F 3/02* (2013.01); *B22F 9/04* (2013.01);
(Continued)

(58) Field of Classification Search
CPC .... B22F 1/0014; B22F 1/0018; B22F 1/0055; B22F 1/02; B22F 1/025; B22F 1/0011;
(Continued)

(56) References Cited

U.S. PATENT DOCUMENTS 4,923,533 A  5/1990  Shigeta et al.
5,238,507 A  8/1993  Kugimiya et al.
(Continued)

FOREIGN PATENT DOCUMENTS

JP  55-027608  2/1980
JP  63-035701  2/1988
(Continued)

OTHER PUBLICATIONS

Halder, et al. "Separation of particle size and lattice strain in integral breadth measurements", Acta. Cryst. (1966) 20, 312, pp. 312-313.

*Primary Examiner* — Matthew E. Hoban
*Assistant Examiner* — Lynne Edmondson
(74) *Attorney, Agent, or Firm* — Amin, Turocy & Watson, LLP

(57) ABSTRACT

Provided is a plurality of flaky magnetic metal particles of embodiments, each flaky magnetic metal particle having a flat surface having either or both of a plurality of concavities and a plurality of convexities, the concavities or convexities being arranged in a first direction and each having a width of 0.1 μm or more, a length of 1 μm or more, and an aspect ratio of 2 or higher; and a magnetic metal phase containing at least one primary element selected from the group consisting of iron (Fe), cobalt (Co), and nickel (Ni). The flaky magnetic metal particles have an average thickness of between 10 nm and 100 μm inclusive, and the average value of the ratio of the average length within the flat surface with respect to the thickness is between 5 and 10,000 inclusive.

12 Claims, 38 Drawing Sheets

IN CASE IN WHICH TEN SITES ARE SELECTED (EXCLUDING ENDS) AT EQUAL INTERVAL FROM END TOWARD ANOTHER END IN DIRECTION WITHIN FLAT SURFACE, AND THICKNESS AT EACH SITE IS DESIGNATED AS $t_1, t_2, \cdots,$ or $t_{10}$,
THICKNESS OF FLAKY MAGNETIC METAL PARTICLE = $(t_1 + t_2 + \cdots + t_{10})/10$

(51) Int. Cl.
*H01F 1/33* (2006.01)
*H01F 1/147* (2006.01)
*B22F 1/068* (2022.01)
*H02K 1/02* (2006.01)
*B22F 1/0545* (2022.01)
*B22F 9/04* (2006.01)
*B22F 3/02* (2006.01)
*B22F 1/17* (2022.01)
*H01F 1/153* (2006.01)
*B22F 1/054* (2022.01)

(52) U.S. Cl.
CPC ............... *H01F 1/24* (2013.01); *H02K 1/02* (2013.01); *B22F 1/0551* (2022.01); *B22F 2009/043* (2013.01); *B22F 2009/048* (2013.01); *B22F 2304/05* (2013.01); *B22F 2304/10* (2013.01); *H01F 1/153* (2013.01)

(58) Field of Classification Search
CPC ........... B22F 1/0007; B22F 2001/0033; B22F 2301/35; B22F 2301/15; B22F 2304/05; B22F 2304/10; B22F 1/068; B22F 1/054; B22F 1/0551; H01F 1/24; H01F 1/26; H01F 1/28; H01F 1/33; H01F 1/20; H01F 1/0266; H01F 1/14741; H01F 1/0551; H01F 1/15375; H02K 1/02
USPC ..... 252/62.55, 62.51 R, 62.56, 62.54, 62.57, 252/62.51 C, 62.53, 62.58, 62.59
See application file for complete search history.

(56) References Cited

U.S. PATENT DOCUMENTS

| | | | |
|---|---|---|---|
| 5,514,475 | A | 5/1996 | Nawa et al. |
| 8,840,800 | B2 | 9/2014 | Suetsuna et al. |
| 9,362,033 | B2 | 6/2016 | Suetsuna et al. |
| 10,071,421 | B2 * | 9/2018 | Suetsuna ............... C22C 1/1084 |
| 10,090,088 | B2 * | 10/2018 | Suetsuna ................ H02K 1/02 |
| 10,774,404 | B2 * | 9/2020 | Suetsuna ............... C22C 38/10 |
| 10,937,576 | B2 * | 3/2021 | Suetsuna ................ H01F 3/08 |
| 11,459,645 | B2 * | 10/2022 | Suetsuna ............... C22C 38/10 |
| 2002/0023697 | A1 | 2/2002 | Arai et al. |
| 2005/0012652 | A1 * | 1/2005 | Wakayama ............... H01F 1/26 342/3 |
| 2013/0228716 | A1 * | 9/2013 | Suetsuna .................. B22F 1/02 252/62.55 |
| 2014/0319406 | A1 | 10/2014 | Suetsuna et al. |
| 2015/0170809 | A1 * | 6/2015 | Komuro ................. C22C 38/005 419/10 |
| 2016/0086700 | A1 * | 3/2016 | Suetsuna ............... H01F 1/0063 252/62.56 |
| 2016/0086717 | A1 * | 3/2016 | Harada .................... C21D 1/00 336/233 |
| 2017/0076845 | A1 | 3/2017 | Suetsuna et al. |
| 2017/0209924 | A1 | 7/2017 | Suetsuna et al. |
| 2018/0258513 | A1 | 9/2018 | Suetsuna et al. |
| 2018/0369902 | A1 | 12/2018 | Sunakawa |
| 2019/0238021 | A1 | 8/2019 | Kinouchi et al. |
| 2020/0035391 | A1 | 1/2020 | Suetsuna et al. |
| 2020/0340087 | A1 | 10/2020 | Suetsuna et al. |

FOREIGN PATENT DOCUMENTS

| | | |
|---|---|---|
| JP | 63-90342 | 4/1988 |
| JP | 63-90642 | 4/1988 |
| JP | 1-139702 | 6/1989 |
| JP | 3-278407 | 12/1991 |
| JP | 6-224525 | 8/1994 |
| JP | 06-232587 | 8/1994 |
| JP | 6-267723 | 9/1994 |
| JP | 2002-015906 | 1/2002 |
| JP | 2003-309016 | 10/2003 |
| JP | 2004-111756 | 4/2004 |
| JP | 2004-339598 | 12/2004 |
| JP | 2006-052268 | 2/2006 |
| JP | 2008-174814 | 7/2008 |
| JP | 2008-279459 | 11/2008 |
| JP | 2013-65844 | 4/2013 |
| JP | 2014-131054 | 7/2014 |
| JP | 2017-59816 | 3/2017 |
| JP | 2017-120924 | 7/2017 |
| JP | 2017-135358 | 8/2017 |
| JP | 2018-152449 | 9/2018 |
| JP | 2019-058014 | 4/2019 |
| JP | 2020-017741 | 1/2020 |
| WO | 2017/090402 | 6/2017 |
| WO | 2019/058602 | 3/2019 |

\* cited by examiner

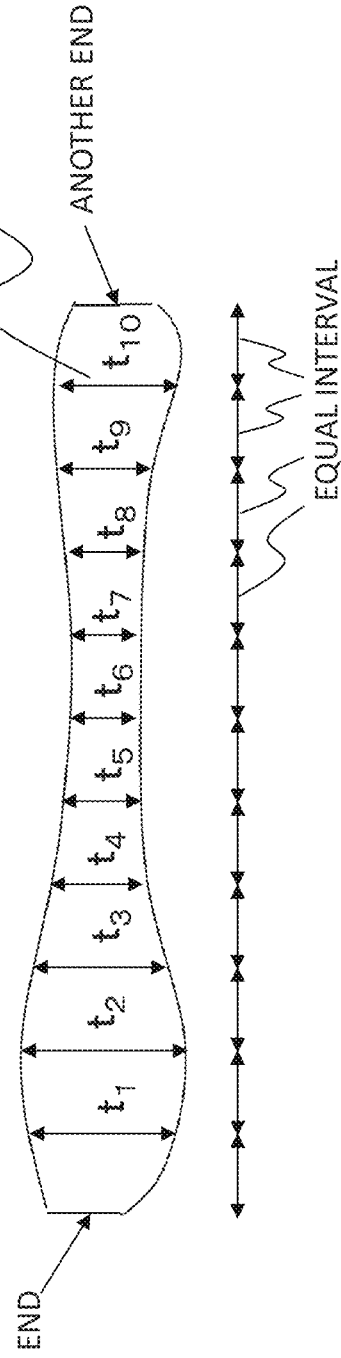

PLAN VIEW (FLAT SURFACES OF FLAKY MAGNETIC METAL PARTICLES)
FIG.2A IN CASE OF TRIANGLE
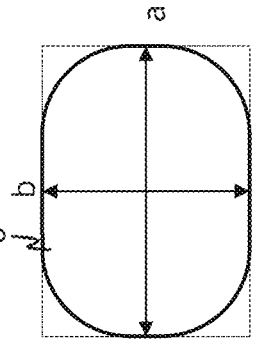
FIG.2B IN CASE OF QUADRILATERAL
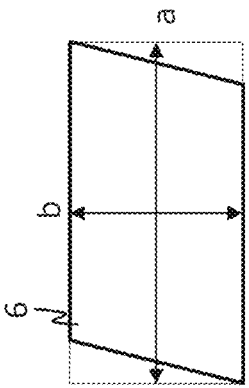
FIG.2C IN CASE OF ROUNDISH SHAPE
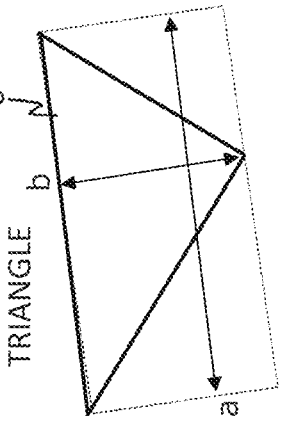
FIG.2D IN CASE OF ACTUAL FLAKY MAGNETIC METAL PARTICLES
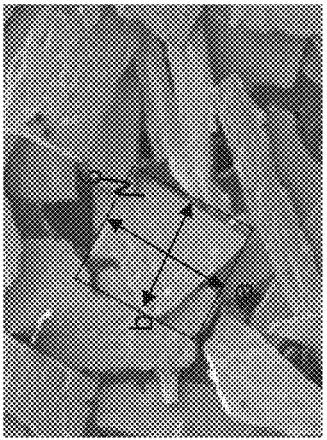
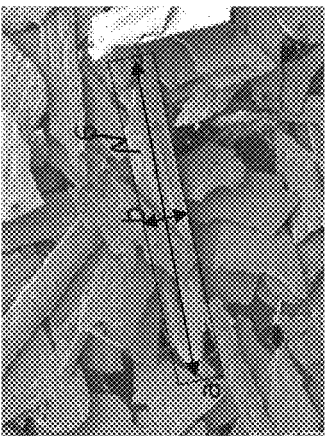
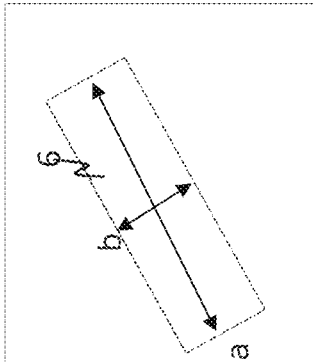

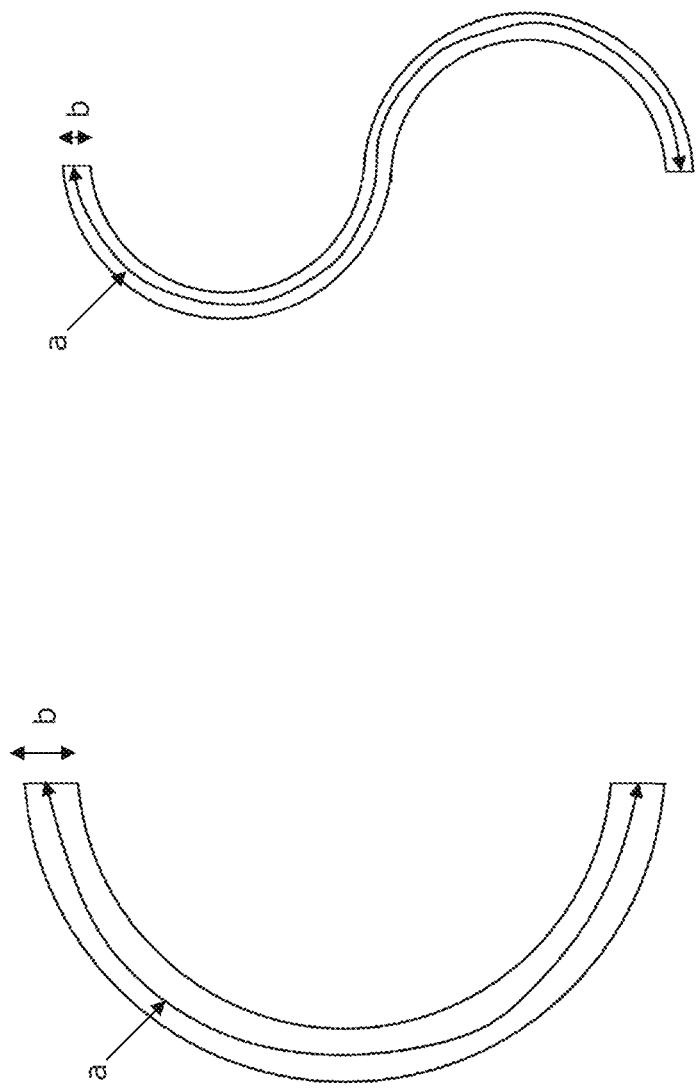

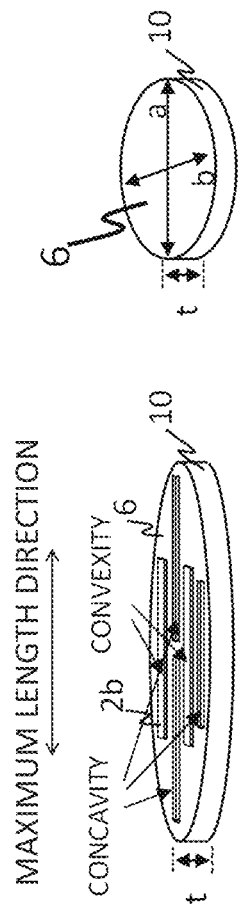
FIG.5A  FIG.5B  FIG.5C
PLAN VIEW (FLAT SURFACES OF FLAKY MAGNETIC METAL PARTICLES)
EXAMPLE OF a/b = 6.0
EXAMPLE OF a/b = 1.2

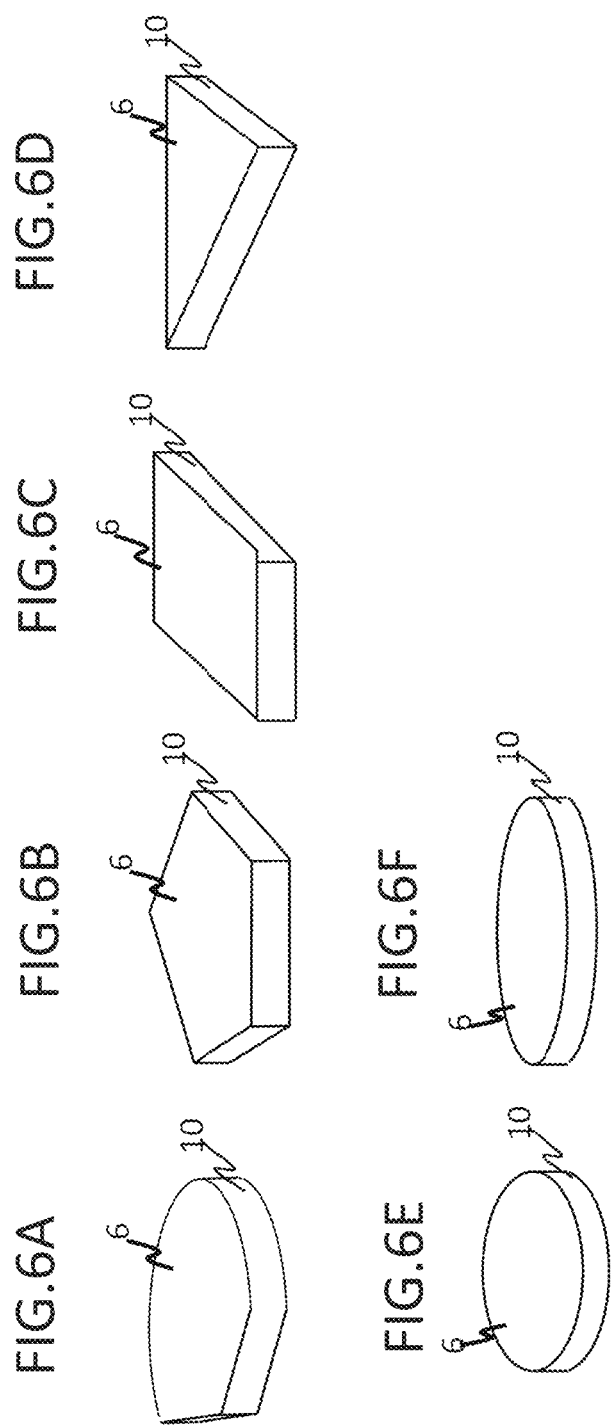

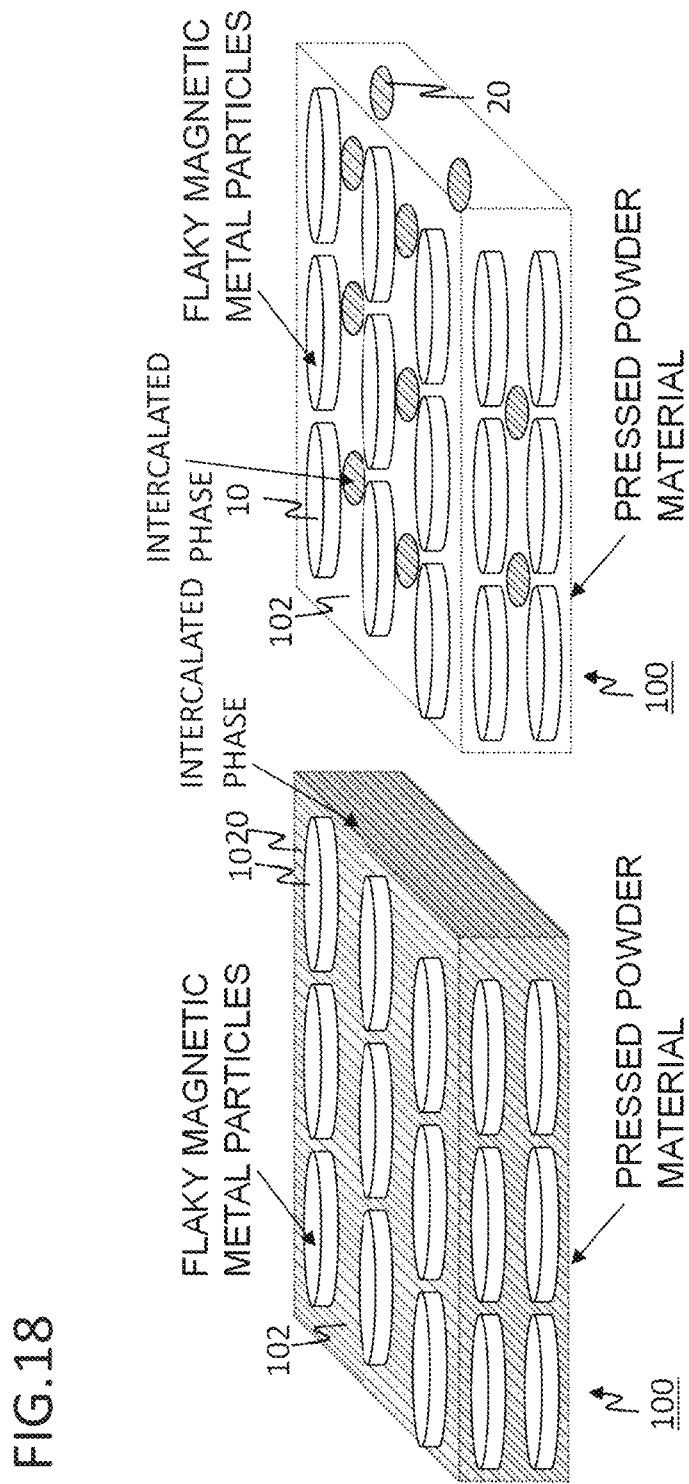

FIG.20
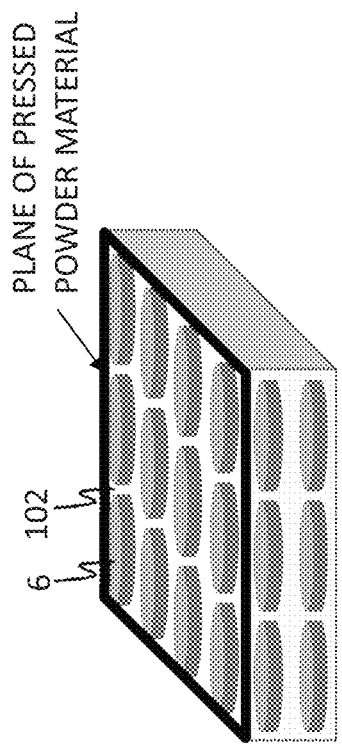
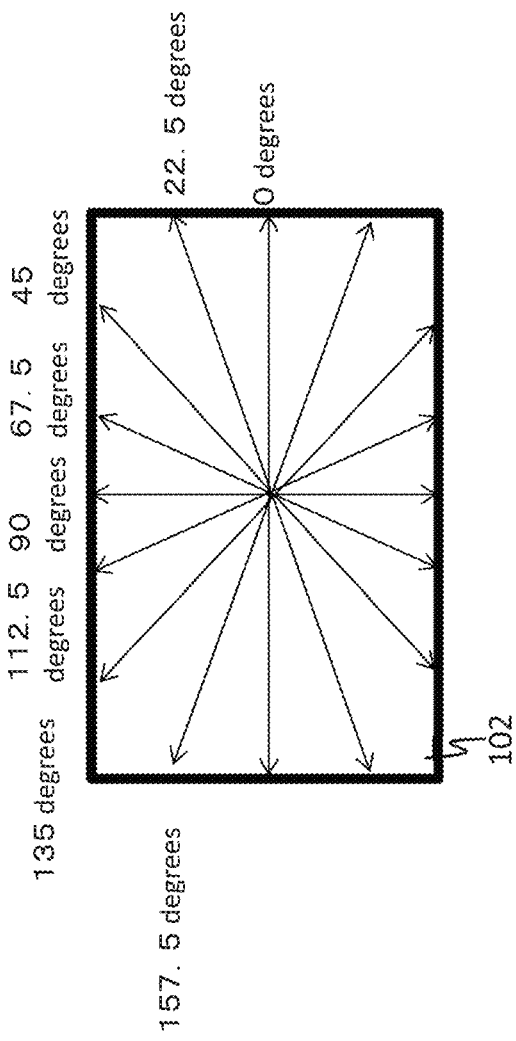

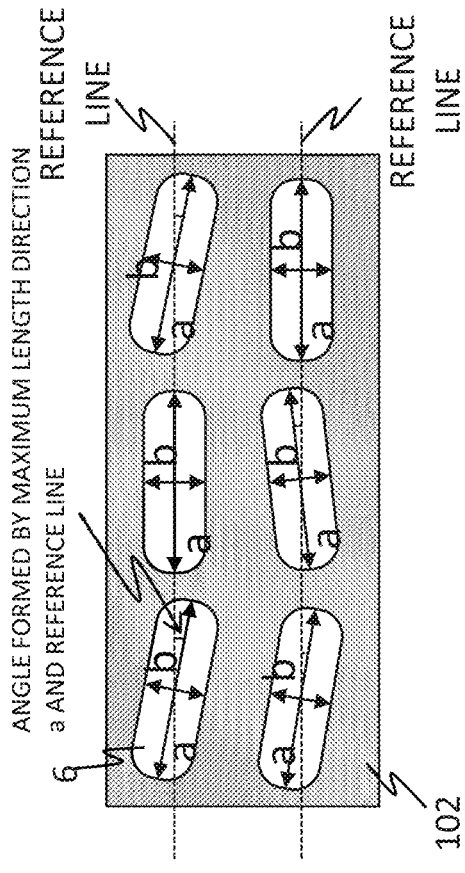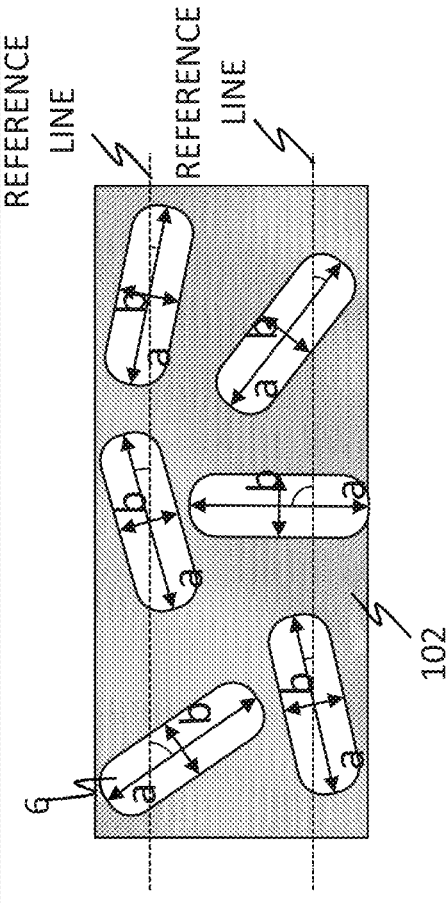

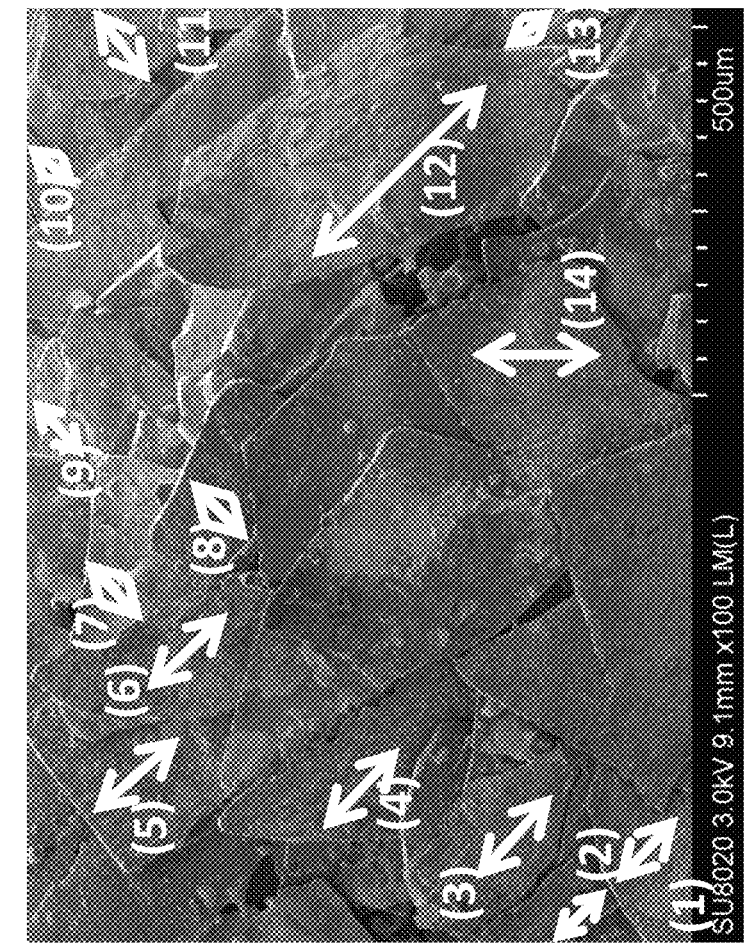
FIG.26
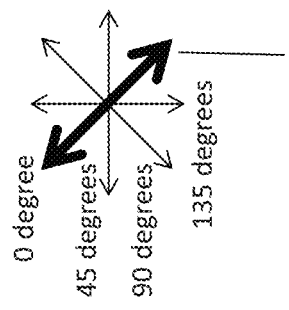
DIRECTIONS OF ANGLE FOR DETERMINING APPROXIMATE FIRST DIRECTION
0 degree
45 degrees
90 degrees
135 degrees
DIRECTION THAT COINCIDES WITH DIRECTION OF ARRANGEMENT OF CONCAVITIES OR CONVEXITIES ACCOUNTING FOR LARGEST PROPORTION = SECOND DIRECTION FIG.27
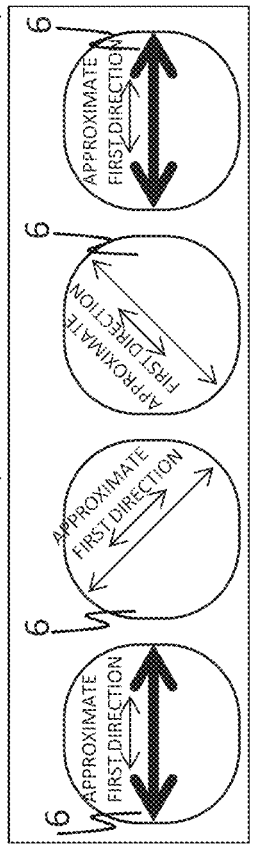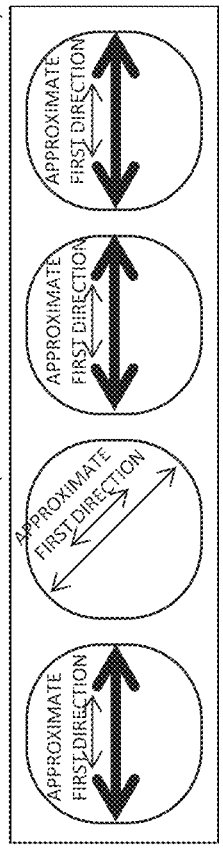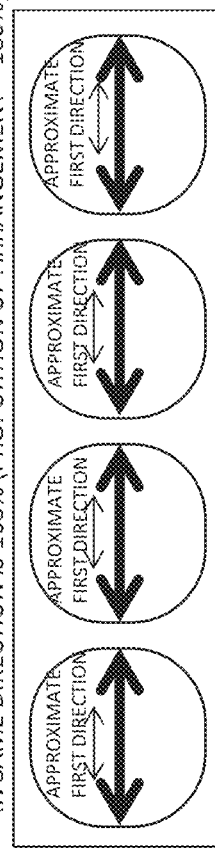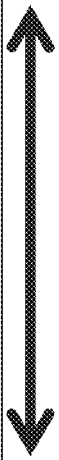

PLURALITY OF FLAKY MAGNETIC METAL PARTICLES, PRESSED POWDER MATERIAL, AND ROTATING ELECTRIC MACHINE

CROSS-REFERENCE TO RELATED APPLICATION

This application is based upon and claims the benefit of priority from Japanese Patent Application No. 2018-049900, filed on Mar. 16, 2018, the entire contents of which are incorporated herein by reference.

FIELD

Embodiments described herein relate generally to a plurality of flaky magnetic metal particles, a pressed powder material, and a rotating electric machine.

BACKGROUND

Currently, soft magnetic materials are applied to the component parts of various systems and devices, such as rotating electric machines (for example, motors and generators), potential transformers, inductors, transformers, magnetic inks, and antenna devices. Thus, soft magnetic materials are regarded as very important materials. In these component parts, the real part of the magnetic permeability (real part of the relative magnetic permeability), $\mu'$, of a soft magnetic material is utilized, and therefore, in the case of actual use, it is preferable to control $\mu'$ in accordance with the working frequency band. Furthermore, in order to realize a highly efficient system, it is preferable to use a material having a loss that is as low as possible. That is, it is preferable that the imaginary part of the magnetic permeability (imaginary part of the relative magnetic permeability), $\mu''$ (corresponding to a loss), is minimized as far as possible. In regard to the loss, the loss factor, $\tan \delta \, (=\mu''/\mu' \times 100(\%))$ serves as a criterion, and as $\mu''$ becomes smaller relative to $\mu'$, the loss factor $\tan \delta$ becomes smaller, which is preferable. In order to attain such conditions, it is preferable to make the core loss for the conditions of actual operation small, that is to say, it is preferable to make the eddy current loss, hysteresis loss, ferromagnetic resonance loss, and residual loss (other losses) as small as possible. In order to make the eddy current loss small, it is effective to increase the electrical resistance, or decrease the sizes of metal parts, or finely divide the magnetic domain structure. In order to make the hysteresis loss small, it is effective to reduce coercivity or increase the saturation magnetization. In order to make the ferromagnetic resonance loss small, it is effective to make the ferromagnetic resonance frequency higher by increasing the anisotropic magnetic field of the material. Furthermore, in recent years, since there is an increasing demand for handling of high electric power, it is required that losses are small, particularly under the operation conditions in which the effective magnetic field applied to the material is large, such as high current and high voltage. To attain this end, it is preferable that the saturation magnetization of a soft magnetic material is as large as possible so as not to bring about magnetic saturation. Furthermore, in recent years, since size reduction of equipment is enabled by increased frequency, increase of the working frequency bands in systems and device equipment is underway, and there is an urgent need for the development of a magnetic material having high magnetic permeability and low losses at high frequency and having excellent characteristics.

Furthermore, in recent years, due to the heightened awareness of the issues on energy saving and environmental issues, there is a demand to increase the efficiency of systems as high as possible. Particularly, since motor systems are responsible for the major portion of electric power consumption in the world, efficiency enhancement of motors is very important. Above all, a core and the like that constitute a motor are formed from soft magnetic materials, and it is requested to increase the magnetic permeability or saturation magnetization of soft magnetic materials as high as possible, or to make the losses as low as possible. Furthermore, in regard to the magnetic wedge that is used in some motors, there is a demand for minimizing losses as far as possible. There is the same demand also for systems using transformers. In motors, transformers and the like, the demand for size reduction is also high, along with efficiency enhancement. In order to realize size reduction, it is essential to maximize the magnetic permeability and saturation magnetization of the soft magnetic material as far as possible. Furthermore, in order to also prevent magnetic saturation, it is important to make saturation magnetization as high as possible. Moreover, the need for increasing the operation frequency of systems is also high, and thus, there is a demand to develop a material having low losses in high frequency bands.

Soft magnetic materials having high magnetic permeability and low losses are also used in inductance elements, antenna devices and the like, and particularly above all, in recent years, attention has been paid to the application of soft magnetic materials in power inductance elements that are used in power semiconductor devices. In recent years, the importance of energy saving and environmental protection has been actively advocated, and reduction of the amount of $CO_2$ emission and reduction of the dependency on fossil fuels have been required. As the result, development of electric cars or hybrid cars that substitute gasoline cars is in active progress. Furthermore, technologies for utilizing natural energy such as solar power generation and wind power generation are regarded as key technologies for an energy saving society, and many developed countries are actively pushing ahead with the development of technologies for utilizing natural energy. Furthermore, the importance of establishment of home energy management systems (HEMS) and building and energy management systems (BEMS), which control the electric power generated by solar power generation, wind power generation or the like by a smart grid and supply the electric power to homes, offices and plants with high efficiency, as environment-friendly power saving systems, has been actively advocated. In such a movement of energy saving, power semiconductor devices play a key role. Power semiconductor devices are semiconductor devices that control high electric power or energy with high efficiency, and examples thereof include individual power semiconductor devices such as an insulated gate bipolar transistor (IGBT), a metal oxide semiconductor field effect transistor (MOSFET), a power bipolar transistor, and a power diode; power supply circuits such as a linear regulator and a switching regulator; and a large-scale integration (LSI) logic circuit for power management to control the above-mentioned devices. Power semiconductor devices are widely used in all sorts of equipment including home electrical appliances, computers, automobiles and railways, and since expansion of the supply of these applied apparatuses, and an increase in the mounting ratio of power semiconductor devices in these apparatuses can be expected, a rapid growth in the market for power semiconductor devices in the future is anticipated. For example, inverters that are installed in many home electrical appliances use power semiconductor devices nearly in all parts, and thereby extensive energy saving is made possible. Currently, silicon (Si) occupies a major part in power semiconductor devices; however, for a further increase in efficiency or further size reduction of equipment, utilizing silicon carbide (SiC) and gallium nitride (GaN) is considered effective. Since SiC and GaN have larger band gaps and larger breakdown fields than Si, and the breakdown voltage can be made higher, elements can be made thinner. Therefore, the on-resistance of semiconductor devices can be lowered, and it is effective for loss reduction and efficiency enhancement. Furthermore, since SiC or GaN has high carrier mobility, the switching frequency can be made higher, and this is effective for size reduction of elements. Furthermore, since SiC in particular has higher thermal conductivity than Si, the heat dissipation ability is higher, and operation at high temperature is enabled. Thus, cooling mechanisms can be simplified, and this is effective for size reduction. From the viewpoints described above, development of SiC and GaN power semiconductor devices is actively in progress. However, in order to realize the development, development of power inductor elements that are used together with power semiconductor devices, that is, development of soft magnetic materials having high magnetic permeability (high magnetic permeability and low losses), is indispensable. Regarding the characteristics required for magnetic materials in this case, in addition to high magnetic permeability and low magnetic loss in the driving frequency bands, high saturation magnetization that can cope with a large electric current is preferable. In a case in which saturation magnetization is high, it is difficult to induce magnetic saturation even if a high magnetic field is applied, and a decrease in the effective inductance value can be suppressed. As a result, the direct current superimposition characteristics of the device are enhanced, and the efficiency of the system is increased.

Furthermore, a magnetic material having high magnetic permeability and low losses at high frequency is expected to be applied to high frequency communication equipment devices such as antenna devices. As a method for achieving size reduction and power saving of antennas, there is a method of using an insulated substrate having high magnetic permeability (high magnetic permeability and low losses) as an antenna substrate, and performing transmission and reception of electric waves by dragging the electric waves that should reach an electronic component or a substrate inside a communication apparatus from antennas into the antenna substrate, without allowing the electric waves to reach the electronic component or substrate. As a result, size reduction of antennas and power saving are made possible, and at the same time, the resonance frequency band of the antennas can also be broadened, which is preferable.

Furthermore, examples of other characteristics that are required when magnetic materials are incorporated into the various systems and devices described above include high thermal stability, high strength, and high toughness. Also, in order for the magnetic materials to be applied to complex shapes, a pressed powder body is more preferable than materials having a sheet shape or a ribbon shape. However, generally, when a pressed powder body is used, it is known that characteristics such as saturation magnetization, magnetic permeability, losses, strength and toughness are deteriorated. Thus, enhancement of characteristics is preferable.

Next, in regard to existing soft magnetic materials, the types of the soft magnetic materials and their problems will be described.

Examples of an existing soft magnetic material for systems of 10 kH or less include a silicon steel sheet (FeSi). A silicon steel sheet is a material that is employed in most of rotating electric machines that have been used for a long time and handle large power, and the core materials of transformers. Highly characterized materials ranging from non-directional silicon steel sheets to directional silicon steel sheets can be obtained, and compared to the early stage of discovery, a progress has been made; however, in recent years, it is considered that characteristics improvement has reached an endpoint. Regarding the characteristics, it is particularly critical to simultaneously satisfy high saturation magnetization, high magnetic permeability, and low losses. Studies on materials that surpass silicon steel sheets are actively conducted globally, mainly based on the compositions of amorphous materials and nanocrystalline materials; however, a material composition that surpasses silicon steel sheets in all aspects has not yet been found. Furthermore, studies also have been conducted on pressed powder bodies that are applicable to complex shapes; however, pressed powder bodies have a defect that they have poor characteristics compared to sheets or ribbons.

Examples of existing soft magnetic materials for systems of 10 kHz to 100 kHz include Sendust (Fe—Si—Al), nanocrystalline FINEMET (Fe—Si—B—Cu—Nb), ribbons or pressed powders of Fe-based or Co-based amorphous glass, and MnZn-based ferrite materials. However, all of these materials do not completely satisfy characteristics such as high magnetic permeability, low losses, high saturation magnetization, high thermal stability, high strength and high toughness, and are insufficient.

Examples of existing soft magnetic materials of 100 kHz or higher (MHz frequency band or higher) include NiZn-based ferrites and hexagonal ferrites; however, these materials have insufficient magnetic characteristics at high frequency.

From the circumstances described above, development of a magnetic material having high saturation magnetization, high magnetic permeability, low losses, high thermal stability, and excellent mechanical characteristics, is preferable.

BRIEF DESCRIPTION OF THE DRAWINGS

FIG. 1 is a conceptual diagram for describing a method for determining the maximum length and the minimum length in a flat surface of a flaky magnetic metal particle according to a first embodiment.

FIGS. 2A to 2D are conceptual diagrams for describing a method for determining the maximum length and the minimum length in a flat surface of the flaky magnetic metal particles according to the first embodiment.

FIG. 3 is a conceptual diagram for describing a method for determining the maximum length and the minimum length in a flat surface of the flaky magnetic metal particles according to the first embodiment.

FIGS. 5A to 5C are schematic diagrams illustrating the flaky magnetic metal particles of the first embodiment.

FIGS. 6A to 6F are schematic diagrams illustrating examples of the flaky magnetic metal particles of the first embodiment.

FIG. 18 is a schematic diagram of a pressed powder material of a third embodiment.

FIG. 20 is a diagram illustrating the directions used when coercivity is measured, in a plane of the pressed powder material according to the third embodiment, by varying the direction at an interval of 22.5° over the angle of 360° in the plane.

FIGS. 23A and 23B are schematic diagrams for describing the angles formed by the maximum length directions of the flaky magnetic metal particles and an arbitrary reference line in the pressed powder material of the third embodiment.

FIG. 26 is an exemplary scanning electron microscopic photograph of the direction of arrangement of the approximate first directions according to the third embodiment.

FIG. 27 is a schematic diagram illustrating the approximate first direction and the desired directions of the easy magnetization axis according to the third embodiment.

DETAILED DESCRIPTION

Figure 4:
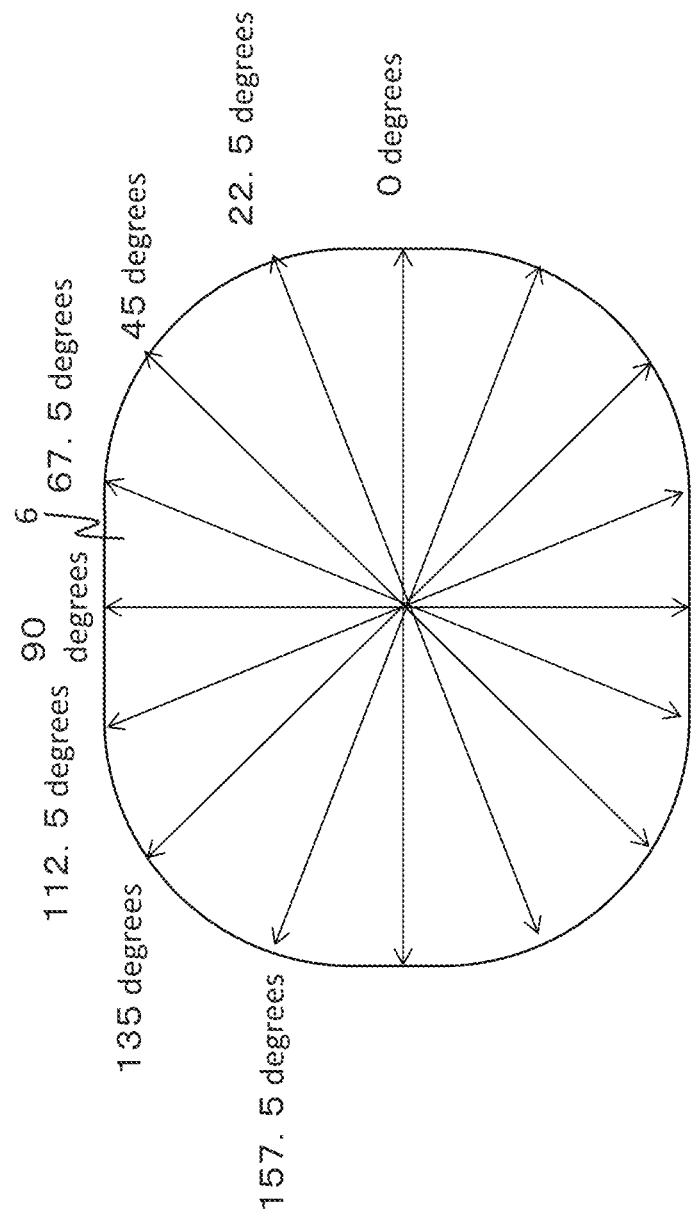
FIG. 4 is a diagram illustrating the directions used when the coercivity is measured by varying the direction at an interval of 22.5° over the angle of 360° in a flat surface of a flaky magnetic metal particle according to the first embodiment.

In the following description, embodiments will be described using the attached drawings. In the diagrams, an identical or similar reference numeral will be assigned to identical or similar sites.

First Embodiment

A plurality of flaky magnetic metal particles of the present embodiment is a plurality of flaky magnetic metal particles, each flaky magnetic metal particle comprising: a flat surface and a magnetic metal phase containing at least one primary element selected from the group consisting of iron (Fe), cobalt (Co), and nickel (Ni), the average thickness of the flaky magnetic metal particles being between 10 nm and 100 μm inclusive, the average value of the ratio of the average length in the flat surface with respect to the thickness being between 5 and 10,000 inclusive, and each of the flaky magnetic metal particles having a direction-induced coercivity difference within the flat surface.

Flaky magnetic metal particles are flaky particles (or flattened particles) having a flaky shape (or a flattened shape).

The term thickness refers to the average thickness in one flaky magnetic metal particle. Regarding a method for determining the thickness, the method is not limited as long as it is a method capable of determining the average thickness in one flaky magnetic metal particle. For example, a method of observing a cross-section perpendicular to the flat surface of a flaky magnetic metal particle by transmission electron microscopy (TEM), scanning electron microscopy (SEM), or optical microscopy, selecting any arbitrary ten or more sites in the in-plane direction of the flat surface in a cross-section of the flaky magnetic metal particle thus observed, measuring the thicknesses at the various selected sites, and employing the average value of the thicknesses, may be used. Furthermore, a method of selecting ten or more sites in a cross-section of the observed flaky magnetic metal particle from an end toward the other end at an equal interval in a direction within the flat surface (at this time, since the end and the other end are special places, it is preferable not to select the end parts), measuring the thickness at each of the sites thus selected, and employing the average value of the thicknesses, may also be used (in FIG. 1, a method for determining the thickness in this case is specifically shown). All of the methods are preferable because when measurement is made at sites as many as possible, average information can be obtained. Meanwhile, in a case in which the contour lines of the cross-section has intense irregularities, or the surface has a rough contour line, and it is difficult to determine the average thickness in an intact state, it is preferable that the contour line is smoothened into an average straight line or curve as appropriate according to the circumstance, and then the above-described method is carried out.

Furthermore, the average thickness refers to the average value of the thickness in a plurality of flaky magnetic metal particles, and the average thickness is distinguished from the simple "thickness" described above. When the average thickness is determined, it is preferable to employ an average value calculated for twenty or more flaky magnetic metal particles. Furthermore, it is preferable to determine the average thickness for as many flaky magnetic metal particles as possible, because average information can be obtained. Furthermore, in a case in which an observation of twenty or more flaky magnetic metal particles cannot be made, it is preferable that an observation of as many flaky magnetic metal particles as possible is made, and an average value calculated for those particles is employed. The average thickness of the flaky magnetic metal particles is preferably between 10 nm and 100 μm inclusive, more preferably between 10 nm and 1 μm inclusive, and even more preferably between 10 nm and 100 nm inclusive. Furthermore, it is preferable that the flaky magnetic metal particles include particles having a thickness of between 10 nm and 100 μm inclusive, more preferably between 10 nm and 1 μm inclusive, and even more preferably between 10 nm and 100 nm inclusive. As a result, when a magnetic field is applied in a direction parallel to the flat surface, the eddy current loss can be made sufficiently small, which is preferable. Furthermore, a smaller thickness is preferred because the magnetic moment is confined in a direction parallel to the flat surface, and magnetization is likely to proceed by rotation magnetization, which is preferable. In a case in which magnetization proceeds by rotation magnetization, since magnetization is likely to proceed reversibly, coercivity is decreased, and the hysteresis loss can be reduced thereby, which is preferable.

The average length of a flaky magnetic metal particle is defined by the formula: $(a+b)/2$, using the maximum length a and the minimum length b in the flat surface. The maximum length a and the minimum length b can be determined as follows. For example, among rectangles that circumscribe the flat surface, a rectangle having the smallest area is considered. Then, the length of the long side of the rectangle is designated as the maximum length a, and the length of the short side is designated as the minimum length b. FIGS. 2A to 2D are schematic diagrams illustrating the maximum length a and the minimum length b determined by the method described above by taking several flaky magnetic metal particles as examples. The maximum length a and the minimum length b can be determined, similarly to the case of the average thickness, by observing the flaky magnetic metal particles by TEM, SEM, or with an optical microscope or the like. Furthermore, it is also possible to determine the maximum length a and the minimum length b by performing an image analysis of the microscopic photograph with a computer. For all of them, it is preferable to determine the maximum length and the minimum length for twenty or more flaky magnetic metal particles as the objects of measurement. Furthermore, it is preferable to determine the maximum length and the minimum length for as many flaky magnetic metal particles as possible as the objects of measurement, because average information can be obtained. Furthermore, in a case in which it is not possible to observe twenty or more flaky magnetic metal particles, it is preferable that an observation of as many flaky magnetic metal particles as possible is made, and average values obtained for those metal particles are employed. Furthermore, in this case, since it is preferable to determine the maximum length and the minimum length by making the values as average as possible, it is preferable to perform an observation or an image analysis in a state in which the flaky magnetic metal particles are uniformly dispersed (in a state in which a plurality of flaky magnetic metal particles having different maximum lengths and minimum lengths is dispersed in a manner as random as possible). For example, it is preferable that an observation or an image analysis is carried out by sufficiently stirring a plurality of flaky magnetic metal particles and adhering the flaky magnetic metal particles onto a tape in that stirred state, or by dropping a plurality of flaky magnetic metal particles from above to fall down and adhering the particles onto a tape.

However, depending on the flaky magnetic metal particles, there are occasions in which when the maximum length a and the minimum length b are determined by the method described above, the method may become a method of determining with no regard to the essence. For example, in a case similar to FIG. 3, the flaky magnetic metal particles are in a state of being elongatedly curved state; however, in this case, the maximum length and the minimum length of the flaky magnetic metal particles are essentially the lengths of a and b illustrated in FIG. 3. As such, the method for determining the maximum length a and the minimum length b cannot be determined completely uniformly, and basically, there is no problem with a method of "considering a rectangle having the smallest area among the rectangles circumscribing the flat surface, and designating the length of the long side of the rectangle as the maximum length a and the length of the short side as b". However, depending the shape of the particles, in a case in which the essence is disregarded in this method, the maximum length a and the minimum length b are determined as the maximum length a and the minimum length b, for which the essence is considered, according to the circumstances. The thickness t is defined as the length in a direction perpendicular to the flat surface. The ratio A of the average length within the flat surface with respect to the thickness is defined by the formula: $A=((a+b)/2)/t$, using the maximum length a, minimum length b, and thickness t.

The average value of the ratio of the average length in the flat surface of the flaky magnetic metal particles with respect to the thickness is preferably between 5 and 10,000 inclusive. This is because the magnetic permeability increases due to the ratio. Furthermore, it is because since the ferromagnetic resonance frequency can be increased, the ferromagnetic resonance loss can be reduced.

Regarding the ratio of the average length in the flat surface with respect to the thickness, an average value is employed. Preferably, it is preferable to employ an average value calculated for twenty or more flaky magnetic metal particles. It is also preferable to determine the average value by taking as many flaky magnetic metal particles as possible as the objects of measurement, because average information can be obtained. In a case in which an observation of twenty or more flaky magnetic metal particles cannot be made, it is preferable that an observation of as many flaky magnetic metal particles as possible is made, and an average value calculated for the particles is employed. In addition, for example, in a case in which there are particle Pa, particle Pb, and particle Pc, and the thicknesses of the particles are referred to as Ta, Tb, and Tc, respectively, while the average lengths in the flat surface are referred to as La, Lb, and Lc, respectively, the average thickness is calculated by the formula: (Ta+Tb+Tc)/3, and the average value of the ratio of the average length in the flat surface with respect to the thickness is calculated by the formula: (La/Ta+Lb/Tb+Lc/Tc)/3.

When the phrase "having a coercivity difference" is used, it is implied that when a magnetic field is applied in the direction of 360° in the flat surface and the coercivity is measured, there exist a direction in which maximum coercivity is obtained, and a direction in which minimum coercivity is obtained. For example, when the coercivity is measured by varying the direction at an interval of 22.5° over an angle of 360° in the flat surface, a coercivity difference is obtained. In other words, in a case in which there are an angle at which the coercivity becomes larger and an angle at which the coercivity becomes smaller, the concept of "having a coercivity difference" applies. FIG. 4 shows the directions used when the coercivity is measured by varying the direction at an interval of 22.5° over an angle of 360° in the flat surface of a flaky magnetic metal particle, as an example. By having a coercivity difference within the flat surface, the minimum coercivity value becomes smaller compared to the case of isotropy with almost no coercivity difference, which is preferable. In regard to a material having magnetic anisotropy within the flat surface, there is a difference in the coercivity depending on the direction in the flat surface, and the minimum coercivity value becomes small compared to a material that is magnetically isotropic. As a result, the hysteresis loss is reduced, and the magnetic permeability is increased, which is preferable.

Furthermore, the coercivity can be evaluated using a vibrating sample magnetometer (VSM) or the like. In the case of having low coercivity, even a coercivity of 0.1 Oe or less can be measured by using a low magnetic field unit. In regard to the direction of the magnetic field to be measured, measurement is made by varying the direction in the flat surface.

It is more preferable that the proportion of the direction-induced coercivity difference within the flat surface is larger, and it is preferable that the proportion is 1% or more. The proportion of the coercivity difference is more preferably 10% or more, the proportion of the coercivity difference is even more preferably 50% or more, and the proportion of the coercivity difference is still more preferably 100% or more. The proportion of the coercivity difference as used herein is defined by the formula: (Hc(max)−Hc(min))/Hc(min)×100 (%), using the maximum coercivity Hc(max) and the minimum coercivity Hc (min) in the flat surface.

The ratio a/b of the maximum length a to the minimum length b in the flat surface is preferably 2 or more, more preferably 3 or more, even more preferably 5 or more, and still more preferably 10 or more, on the average. It is preferable that particles having a ratio a/b of the maximum length a to the minimum length b in the flat surface of 2 or more are included, and it is more preferable that particles having a ratio a/b of 3 or more, even more preferably 5 or more, and still more preferably 10 or more, are included. As a result, it is easy to impart magnetic anisotropy to the particles, and it is desirable. When magnetic anisotropy is imparted, a coercivity difference occurs in the flat surface, and the minimum coercivity value becomes small compared to a material that is magnetically isotropic. As a result, the hysteresis loss is reduced, and the magnetic permeability is increased, which preferable. More preferably, in regard to the flaky magnetic metal particle as described above, it is desirable that the first direction of either or both of a plurality of concavities and a plurality of convexities that will be described below is arranged in the maximum length direction. Schematic diagrams of this magnetic metal particle are shown in FIG. 5A and FIG. 5B. Furthermore, in a case in which the flaky magnetic metal particles are produced into a pressed powder, since the ratio a/b of the flaky magnetic metal particles is large, the area (or area proportion) in which the flat surfaces of individual flaky magnetic metal particles overlap one another increases, and the strength as a pressed powder body is increased, which is preferable. Furthermore, when the ratio of the maximum length to the minimum length is larger, the magnetic moment is confined in a direction parallel to the flat surface, and magnetization is likely to proceed by rotation magnetization, which is preferable. In a case in which magnetization proceeds by rotation magnetization, since magnetization is likely to proceed reversibly, coercivity becomes small, and the hysteresis loss can be reduced thereby, which is preferable. On the other hand, from the viewpoint of strength improvement, it is preferable that the ratio a/b of the maximum length a to the minimum length b in the flat surface is 1 or higher and lower than 2, and more preferably, the ratio a/b is 1 or higher and lower than 1.5, on the average. The fluidity or packing property of the particles is enhanced thereby, which is desirable. Furthermore, the strength in a direction perpendicular to the flat surface is increased compared to the case of having a large value of a/b, and it is preferable from the viewpoint of strength improvement of the flaky magnetic metal particles. Furthermore, when the particles are powder-compacted, there is less chance that the particles are powder-compacted in a bent state, and the stress to the particles is likely to be reduced. That is, strain is reduced, this leads to reduction of the coercivity and hysteresis loss, and also, since stress is reduced, thermal stability and mechanical characteristics such as strength and toughness may be easily enhanced. A schematic diagram of this magnetic metal particle is shown in FIG. 5C.

Furthermore, a particle having an angle in at least a portion of the contour shape of the flat surface is preferably used. For example, a contour shape such as a square or a rectangle, in other words, a contour shape having an angle of a corner of about 90°, is desirable. As a result, symmetry of the atomic arrangement is decreased at the corner parts, the electron orbits are confined, and therefore, magnetic anisotropy may be easily imparted to the flat surface, which is desirable. Examples of these magnetic metal particles are shown in FIGS. 6A to 6F. Particularly, FIG. 6B shows a case in which the contour shape of the flat surface is a pentagon, FIG. 6C shows a case in which the contour shape of the flat surface is a quadrilateral, and FIG. 6D shows a case in which the contour shape of the flat surface is a triangle.

On the other hand, from the viewpoint of loss reduction or strength improvement, it is more desirable that the contour shape of the flat surface is formed by a roundish curve. In an extreme example, it is more desirable to employ a round contour shape such as a circle or an ellipse. As a result, abrasion resistance of the particles is enhanced, which is desirable. Furthermore, stress is not easily concentrated around the contour shape, the magnetic strain of the flaky magnetic metal particle is reduced, coercivity is decreased, and the hysteresis loss is reduced, which is desirable. Since stress concentration is reduced, thermal stability and mechanical characteristics such as strength and toughness are also likely to be enhanced, which is desirable. Schematic diagrams of these magnetic metal particles are shown in FIGS. 6E and 6F. FIG. 6E shows a case in which the contour shape of the flat surface is a circle, and FIG. 6F shows a case in which the contour shape of the flat surface is an ellipse.

Figure 7:
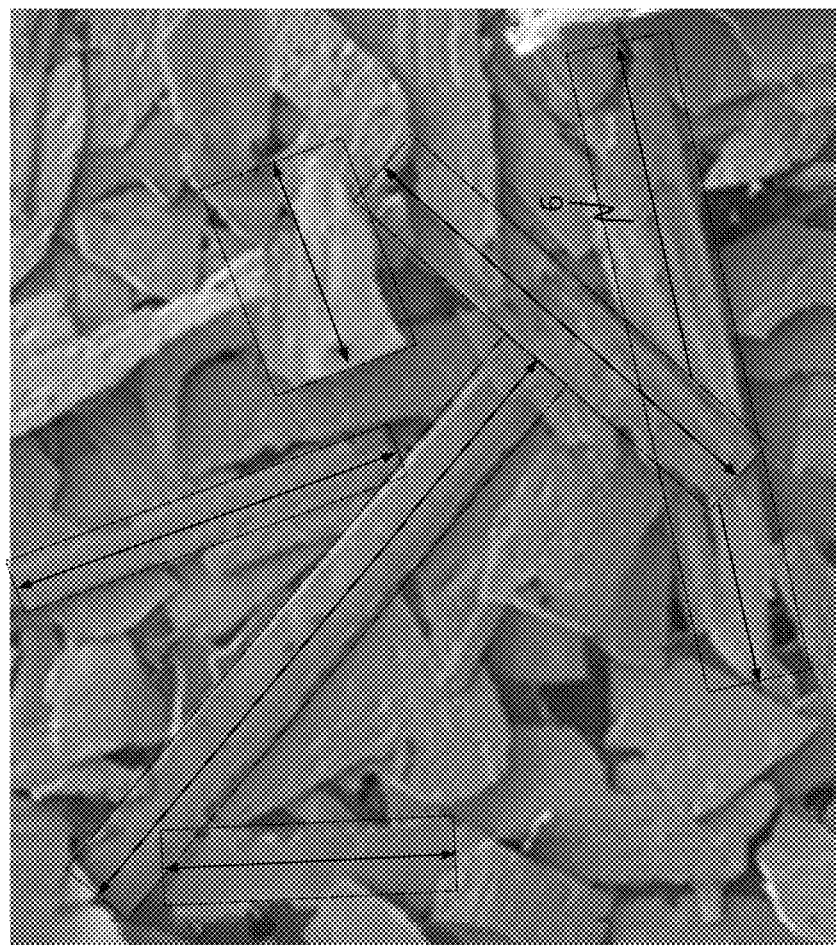
FIG. 7 is a scanning electron microscopic photograph of the flaky magnetic metal particles of the first embodiment.

FIG. 7 is an example of a microscopic photograph of the flaky magnetic metal particles of the present embodiment. In FIG. 7, the flaky magnetic metal particles have large ratios of the maximum length to the minimum length in the flat surface, and have rectangular contour shapes.

Figure 8:
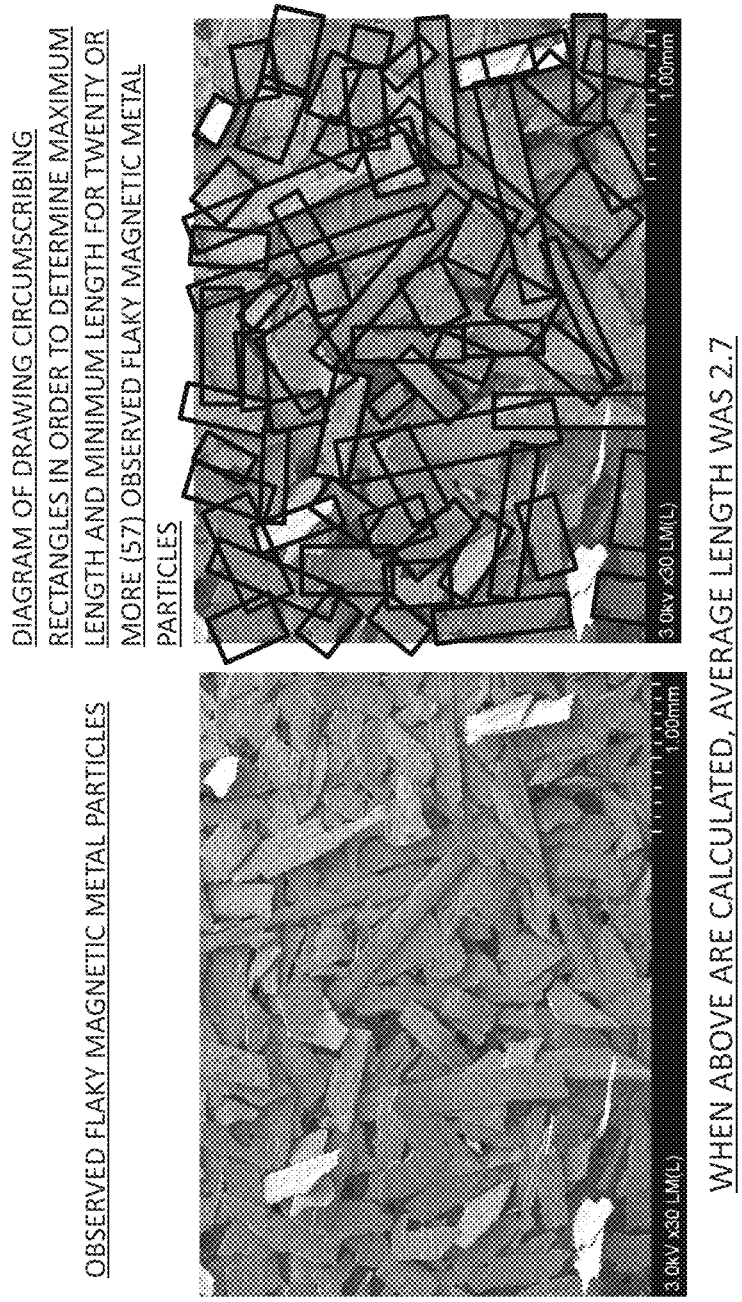
FIG. 8 is a diagram illustrating an example of specifically determining the ratio of the maximum length to the minimum length in a flat surface from a microscopic photograph of the flaky magnetic metal particles of the first embodiment.

FIG. 8 shows an example of specifically determining the ratio of the maximum length to the minimum length in the flat surface, from a microscopic photograph of the flaky magnetic metal particles of the present embodiment. Here, a case in which the ratio of the maximum length to the minimum length is 2 or larger is shown as an example. The diagram on the right-hand side is a diagram in which rectangles circumscribing twenty or more (57 particles) flaky magnetic metal particles thus observed are drawn in order to determine the maximum length and the minimum length. When the ratio of the maximum length to the minimum length in the flat surface was determined from this diagram, the ratio was 2.7. Meanwhile, even in a case in which the ratio of the maximum length to the minimum length is 1 or higher and lower than 2, the ratio of the maximum length to the minimum length can be specifically determined by a technique such as described above.

The crystal grain size of the magnetic metal phase is preferably 10 nm or less. The crystal grain size is more preferably 5 nm or less, and even more preferably 2 nm or less. Meanwhile, the crystal grain size can be conveniently determined by an XRD analysis. That is, the crystal grain size can be determined by XRD, in relation to the most intense peak among the peaks attributed to the magnetic metal phase, based on Scherrer's Formula from the diffraction angle and the half-value width. Scherrer's formula is represented by the formula: $D=0.9\lambda/(\beta \cos \theta)$, wherein D represents the crystal grain size, X represents the X-ray wavelength for measurement, $\beta$ represents the half-value width, and $\theta$ represents Bragg's angle of diffraction. The crystal grain size can also be determined by observing a large number of magnetic metal phases by a transmission electron microscope (TEM), and averaging the particle sizes. In a case in which the crystal grain size is small, it is preferable to determine the crystal grain size by XRD analysis, and in a case in which the crystal grain size is large, it is preferable to determine the crystal grain size by TEM observation. However, it is preferable to select the measurement method depending on the circumstances, or to comprehensively determine the crystal grain size by using both of the methods in combination. The crystal grain size of the magnetic metal phase that can be determined by XRD analysis or TEM observation is preferably 10 nm or less, more preferably 5 nm or less, and even more preferably 2 nm or less. As a result, for example, magnetic anisotropy may be easily imparted by applying a heat treatment in a magnetic field, and the coercivity difference within the flat surface becomes large, which is preferable. Furthermore, when it is said that the crystal grain size is small, it is implied that the material is closer to the amorphous state. Therefore, electrical resistance becomes higher compared to a highly crystalline material, and consequently, the eddy current loss may be easily decreased, which is preferable. Also, the material has excellent corrosion resistance and oxidation resistance compared to a highly crystalline material, and thus it is preferable.

It is preferable that the magnetic metal phase contains at least one additive element selected from the group consisting of B, Si, Al, C, Ti, Zr, Hf, Nb, Ta, Mo, Cr, Cu, W, P, N, Ga, and Y. As a result, amorphization proceeds, magnetic anisotropy may be easily imparted, and the coercivity difference within the flat surface becomes large, which is preferable. An additive element which has a large difference between the atomic radius of the additive element and the atomic radius of at least one primary element selected from the group consisting of Fe, Co, and Ni, is preferable. Furthermore, an additive element such that the enthalpy of mixing of at least one primary element selected from the group consisting of Fe, Co, and Ni with the additive element increases negatively, is preferred. Also, a multicomponent system that is composed of three or more kinds of elements in total, including the primary element and an additive element, is preferred. Since semimetallic additive elements such as B and Si have slow rates of crystallization and are easily amorphized, it is advantageous when the semimetallic additive elements are mixed into the system. From the above viewpoint, B, Si, P, Ti, Zr, Hf, Nb, Y, Cu, and the like are preferable, and above all, it is more preferable that the additive element includes any one of B, Si, Zr, and Y. It is also preferable that the total amount of the additive element is altogether between 0.001 at % and 80 at % inclusive with respect to the total amount of the first element and the additive element. The total amount is more preferably between 5 at % and 80 at % inclusive, and even more preferably between 10 at % and 40 at % inclusive. As the total amount of the additive element is larger, amorphization proceeds, and it becomes easier to impart magnetic anisotropy, which is preferable (that is, preferable from the viewpoints of low losses and high magnetic permeability). On the other hand, since the proportion of the magnetic metal phase becomes smaller, it is not preferable from the viewpoint that saturation magnetization is reduced. However, depending on the use application (for example, magnetic wedges of a motor), the material can be sufficiently used even in a case in which saturation magnetization is relatively low, and there are occasions in which it is rather preferable that the material specializes in low losses and high magnetic permeability. Meanwhile, magnetic wedges of a motor are lid-like objects for the slot parts into which coils are inserted. Usually, non-magnetic wedges are used; however, when magnetic wedges are employed, the sparseness or denseness of the magnetic flux density is moderated, the harmonic loss is reduced, and the motor efficiency is increased. At this time, it is preferable that saturation magnetization of the magnetic wedges is higher; however, even with relatively low saturation magnetization (for example, about 0.5 to 1 T), sufficient effects are exhibited. Therefore, it is important to select the composition and the amount of the additive element, depending on the use application.

In regard to the flaky magnetic metal particles, the primary element includes Fe and Co, and the amount of Co is preferably between 10 at % and 60 at % inclusive, and more preferably between 10 at % and 40 at % inclusive, with respect to the total amount of Fe and Co. As a result, an appropriately high magnetic anisotropy may be easily imparted, and the magnetic characteristics described above are enhanced, which is preferable. Furthermore, a Fe—Co-based material is preferable because high saturation magnetization may be easily realized. When the composition range of Fe and Co is within the range described above, higher saturation magnetization can be realized, and thus it is preferable.

It is preferable that the flaky magnetic metal particles contain at least one non-magnetic metal selected from the group consisting of Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements. As a result, thermal stability and oxidation resistance of the flaky magnetic metal particles can be enhanced. Among them, Al and Si are particularly preferable because these elements may easily form solid solutions with Fe, Co, and Ni, which are main components of the flaky magnetic metal particles, and contribute to the enhancement of thermal stability or oxidation resistance.

It is preferable that the flaky magnetic metal particles have a portion containing Fe and Co and having a body-centered cubic (bcc) crystal structure. As a result, an appropriately high magnetic anisotropy may be easily imparted, and the magnetic characteristics as described above can be enhanced, which is preferable. Furthermore, "a crystal structure of a mixed phase of bcc and fcc", which partially has a face-centered cubic (fcc) crystal structure, is also preferable because an appropriately high magnetic anisotropy may be easily imparted, and the magnetic characteristics described above are enhanced.

It is preferable that the flat surface is crystallographically oriented. The direction of orientation is preferably the (110) plane orientation or the (111) plane orientation, and more preferably the (110) plane orientation. When the crystal structure of the flaky magnetic metal particles is the body-centered cubic (bcc) structure, the (110) plane orientation is preferred, and when the crystal structure of the flaky magnetic metal particles is the face-centered cubic (fcc) structure, the (111) plane orientation is preferred. As a result, an appropriately high magnetic anisotropy may be easily imparted, and the magnetic characteristics described above are enhanced. Therefore, it is preferable.

As a more preferable direction of orientation, the (110) [111] direction and the (111) [110] direction are preferred, and the (110) [111] direction is more preferred. When the crystal structure of the flaky magnetic metal particles is the body-centered cubic (bcc) structure, orientation in the (110) [111] direction is preferred, and when the crystal structure of the flaky magnetic metal particles is the face-centered cubic (fcc) structure, orientation in the (111) [110] direction is preferred. As a result, an appropriately high magnetic anisotropy may be easily imparted, and the magnetic characteristics described above are enhanced, which is preferable. According to the present specification, the "(110) [111] direction" refers to a direction in which the slide surface is the (110) plane or a plane crystallographically equivalent thereto, namely, the {110} plane, and the slide direction is the [111] direction or a direction crystallographically equivalent thereto, namely, the <111> direction. The same also applies to the (111) [110] direction. That is, the (111) [110] direction refers to a direction in which the slide surface is the (111) plane or a plane crystallographically equivalent thereto, namely, the {111} plane, and the slide direction is the [110] direction or a direction crystallographically equivalent thereto, namely, the <110> direction.

The lattice strain of the flaky magnetic metal particles is preferably between 0.01% and 10% inclusive, more preferably between 0.01% and 5% inclusive, even more preferably between 0.01% and 1% inclusive, and still more preferably between 0.01% and 0.5% inclusive. As a result, an appropriately high magnetic anisotropy may be easily imparted, and the magnetic characteristics described above are enhanced, which is preferable.

The lattice strain can be calculated by analyzing in detail the line widths obtainable by an X-ray diffraction (XRD) method. That is, by drawing a Halder-Wagner plot or a Hall-Williamson plot, the extent of contribution made by expansion of the line width can be separated into the crystal grain size and the lattice strain. The lattice strain can be calculated thereby. A Halder-Wagner plot is preferable from the viewpoint of reliability. In regard to the Halder-Wagner plot, for example, N. C. Halder, C. N. J. Wagner, Acta Cryst., 20 (1966), 312-313 may be referred to. Here, a Halder-Wagner plot is represented by the following expression:

$$\frac{\beta^2}{\tan^2\theta} = \frac{K\lambda}{D}\frac{\beta}{\tan\theta\sin\theta} + 16\varepsilon^2, \varepsilon = \varepsilon_{max}\frac{\sqrt{2\pi}}{2}\sqrt{\overline{\varepsilon^2}} \quad \text{[Math. 1]}$$

($\beta$: integrated width, K: constant, $\lambda$: wavelength, D: crystal grain size, $\varepsilon^2$: lattice strain (root-mean-square))

That is, $\beta^2/\tan^2\theta$ is plotted on the vertical axis, and $\beta/\tan\theta\sin\theta$ is plotted on the horizontal axis. The crystal grain size D is calculated from the gradient of the approximation straight line of the plot, and the lattice strain E is calculated from the ordinate intercept. When the lattice strain obtained by the Halder-Wagner plot of the expression described above (lattice strain (root-mean-square)) is between 0.01% and 10% inclusive, more preferably between 0.01% and 5% inclusive, even more preferably between 0.01% and 1% inclusive, and still more preferably between 0.01% and 0.5% inclusive, an appropriately high magnetic anisotropy may be easily imparted, and the magnetic characteristics described above are enhanced, which is preferable.

The lattice strain analysis described above is a technique that is effective in a case in which a plurality of peaks can be detected by XRD; however, in a case in which the peak intensities in XRD are weak, and there are few peaks that can be detected (for example, in a case in which only one peak is detected), it is difficult to perform an analysis. In such a case, it is preferable to calculate the lattice strain by the following procedure. First, the composition is determined by high-frequency inductively coupled plasma (ICP) emission spectroscopy, energy dispersive X-ray spectroscopy (EDX), or the like, and the composition ratio of three magnetic metal elements, namely, Fe, Co and Ni, is calculated (in a case in which there are only two magnetic metal elements, the composition ratio of two elements; in a case in which there is only one magnetic metal element, the composition ratio of one element (=100%)). Next, an ideal lattice spacing $d_0$ is calculated from the composition of Fe—Co—Ni (refer to the values published in the literature, or the like. In some cases, an alloy having the composition is produced, and the lattice spacing is calculated by making a measurement). Subsequently, the amount of strain can be determined by determining the difference between the lattice spacing d of the peaks of an analyzed sample and the ideal lattice spacing $d_0$. That is, in this case, the amount of strain is calculated by the expression: $(d-d_0)/d_0 \times 100(\%)$. Thus, in regard to the analysis of the lattice strain, it is preferable to use the two above-described techniques appropriately depending on the state of peak intensity, and depending on cases, it is preferable to evaluate the lattice strain by using the two techniques in combination.

The lattice spacing in the flat surface varies depending on the direction, and the proportion of the difference between the maximum lattice spacing $d_{max}$ and the minimum lattice spacing $d_{min}$ $(=(d_{max}-d_{min})/d_{min} \times 100(\%))$ is preferably between 0.01% and 10% inclusive, more preferably between 0.01% and 5% inclusive, even more preferably between 0.01% and 1% inclusive, and still more preferably between 0.01% and 0.5% inclusive. As a result, an appropriately high magnetic anisotropy may be easily imparted, and the magnetic characteristics described above are enhanced, which is preferable. Furthermore, the lattice spacing can be conveniently determined by an XRD analysis. When this XRD analysis is carried out while the direction is varied within a plane, the differences in the lattice constant depending on the direction can be determined.

In regard to crystallites of the flaky magnetic metal particles, it is preferable that either the crystallites are unidirectionally linked in a row in the flat surface, or the crystallites are rod-shaped and are unidirectionally oriented in the flat surface. As a result, an appropriately high magnetic anisotropy may be easily imparted, and the magnetic characteristics described above are enhanced, which is preferable.

It is preferable that the flat surface of the flaky magnetic metal particle has either or both of a plurality of concavities and a plurality of convexities, the concavities and the convexities being arranged in a first direction and each of the concavities and the convexities having a width of 0.1 μm or more, a length of 1 μm, and an aspect ratio of 2 or higher. As a result, magnetic anisotropy is easily induced in the first direction, and the direction-induced coercivity difference within the flat surface is increased, which is preferable. From this point of view, more preferably, a width of 1 μm or more and a length of 10 μm or more are preferred. The aspect ratio is preferably 5 or higher, and more preferably 10 or higher. Furthermore, by including such concavities or convexities, the adhesiveness between the flaky magnetic metal particles at the time of synthesizing a pressed powder material by powder-compacting the flaky magnetic metal particles is enhanced (the concavities or convexities bring an anchoring effect of attaching the particles to neighboring particles), and thereby, thermal stability and mechanical characteristics such as strength and hardness are enhanced. Therefore, it is preferable.

Figure 9:
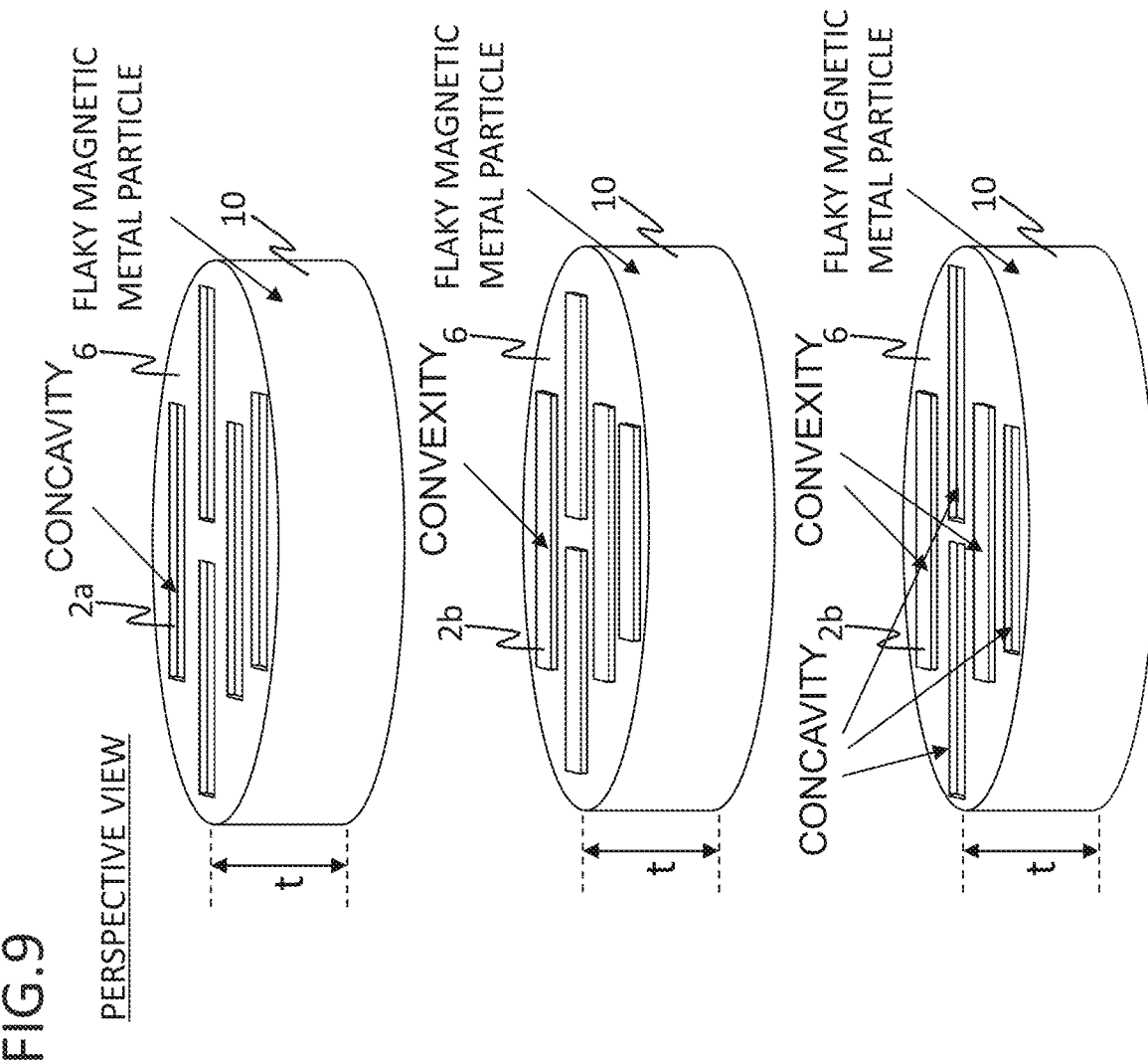
FIG. 9 is a schematic diagram illustrating the flaky magnetic metal particles of the first embodiment.
Figure 10:
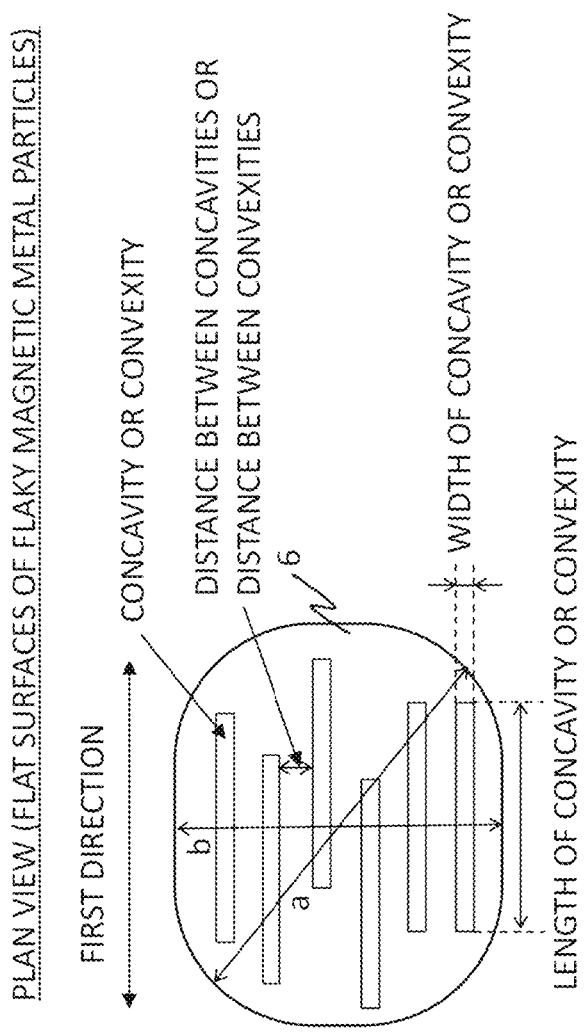
FIG. 10 is a schematic diagram illustrating the flaky magnetic metal particles of the first embodiment.

FIG. 9 and FIG. 10 are schematic diagrams of the flaky magnetic metal particles of the present embodiment. FIG. 9 is a schematic perspective view of the flaky magnetic metal particles of the present embodiment. Meanwhile, in the upper diagram of FIG. 9, only concavities are provided, and in the middle diagram of FIG. 9, only convexities are provided; however, as shown in the lower diagram of FIG. 9, one flaky magnetic metal particle may have both concavities and convexities. FIG. 10 is a schematic diagram of a case in which a flaky magnetic metal particle of the present embodiment is viewed from above. The width and length of the concavities or convexities, and the distance between concavities or convexities are shown. The aspect ratio of a concavity or a convexity is the ratio of the length of the major axis/the length of the minor axis, and in FIG. 10, the aspect ratio is the ratio of (length of a concavity or a convexity)/(width of a concavity or a convexity). That is, when the length side is larger (longer) than the width, the aspect ratio is defined as the ratio of length/width, and when the width is larger (longer) than the length, the aspect ratio is defined as the ratio of width/length. As the aspect ratio is higher, the flaky magnetic metal particle is more likely to have magnetic uniaxial anisotropy (anisotropy), which is more preferable. FIG. 9 shows concavities 2a, convexities 2b, a flat surface 6, and flaky magnetic metal particles 10.

Furthermore, the phrase "(be) arranged in the first direction" implies that concavities or convexities are arranged such that the longer side between the length and the width of the concavities or the convexities is parallel to the first direction. Meanwhile, when concavities or convexities are arranged such that the longer side between the length and the width of the concavities or the convexities is within ±30° in a direction parallel to the first direction, it is said that the concavities or convexities are "arranged in the first direction". As a result, the flaky magnetic metal particles are likely to have magnetic uniaxial anisotropy in the first direction by a shape magnetic anisotropy effect, which is preferable. It is preferable that the flaky magnetic metal particles have magnetic anisotropy in one direction within the flat surface, and this will be described in detail. First, in a case in which the magnetic domain structure of the flaky magnetic metal particles is a multi-domain structure, the magnetization process proceeds by domain wall displacement; however, in this case, coercivity in the easy axis direction within the flat surface becomes lower than that in the hard axis direction, and losses (hysteresis loss) are decreased. Furthermore, magnetic permeability in the easy axis direction becomes higher than that in the hard axis direction. Furthermore, compared to the case of flaky magnetic metal particles that are isotropic, particularly the coercivity in the easy axis direction becomes lower in the case of flaky magnetic metal particles having magnetic anisotropy, and as a result, losses become smaller, which is preferable. Also, magnetic permeability becomes high, and it is preferable. That is, when the flaky magnetic metal particles have magnetic anisotropy in a direction in the flat surface, magnetic characteristics are enhanced as compared to an isotropic material. Particularly, magnetic characteristics are superior in the easy axis direction in the flat surface than in the hard axis direction, which is preferable. Next, in a case in which the magnetic domain structure of the flaky magnetic metal particles is a single domain structure, the magnetization process proceeds by rotation magnetization; however, in this case, coercivity in the hard axis direction in the flat surface becomes lower than that in the easy axis direction, and losses become small. In a case in which magnetization proceeds completely by rotation magnetization, coercivity becomes zero, and the hysteresis loss becomes zero, which is preferable. Whether magnetization proceeds by domain wall displacement (domain wall displacement type) or by rotation magnetization (rotation magnetization type) can be determined on the basis of whether the magnetic domain structure becomes a multi-domain structure or a single domain structure. At this time, whether the magnetic domain structure becomes a multi-domain structure or a single domain structure is determined on the basis of the size (thickness or aspect ratio) of the flaky magnetic metal particles, composition, the condition of the interaction between particles, and the like. For example, as the thickness t of the flaky magnetic metal particles is smaller, the magnetic domain structure is more likely to become a single domain structure, and when the thickness is between 10 nm and 1 μm inclusive, and particularly when the thickness is between 10 nm and 100 nm inclusive, the magnetic domain structure is likely to become a single domain structure. Regarding the composition, in a composition having high magnetocrystalline anisotropy, even if the thickness is large, it tends to be easy to maintain a single domain structure. In a composition having low magnetocrystalline anisotropy, if the thickness is not small, it tends to be difficult to maintain a single domain structure. That is, the thickness of the borderline between being a single domain structure or a multi-domain structure varies depending also on the composition. Furthermore, when the flaky magnetic metal particles magnetically interact with neighboring particles, and the magnetic domain structure is stabilized, the magnetic domain structure is likely to become a single domain structure. The determination of whether the magnetization behavior is of the domain wall displacement type or of the rotation magnetization type can be made simply as follows. First, within a plane of the material (a plane that is parallel to the flat surface of a flaky magnetic metal particle), magnetization is analyzed by varying the direction in which a magnetic field is applied, and two directions in which the difference in the magnetization curve becomes the largest (at this time, the two directions are directions tilted by 90° from each other) are found out. Next, a comparison is made between the curves of the two directions, and thereby it can be determined whether the magnetization behavior is of the domain wall displacement type or the rotation magnetization type.

As described above, it is preferable that the flaky magnetic metal particles have magnetic anisotropy in one direction within the flat surface; however, more preferably, when the flaky magnetic metal particles have either or both of a plurality of concavities and a plurality of convexities, the concavities or convexities being arranged in a first direction, and each of the concavities and the convexities having a width of 0.1 μm or more, a length of 1 μm or more, and an aspect ratio of 2 or higher, magnetic anisotropy is more easily induced in the first direction, which is more preferable. From this point of view, a width of 1 μm or more and a length of 10 μm or more are more preferred. The aspect ratio is preferably 5 or higher, and more preferably 10 or higher. By having such concavities or convexities provided on the flaky magnetic metal particles, the adhesiveness between the flaky magnetic metal particles is enhanced at the time of synthesizing a pressed powder material by powder-compacting the flaky magnetic metal particles (the concavities or convexities bring an anchoring effect of attaching the particles to neighboring particles). As a result, mechanical characteristics such as strength and hardness, and thermal stability are enhanced, and therefore, it is preferable.

Figure 11:
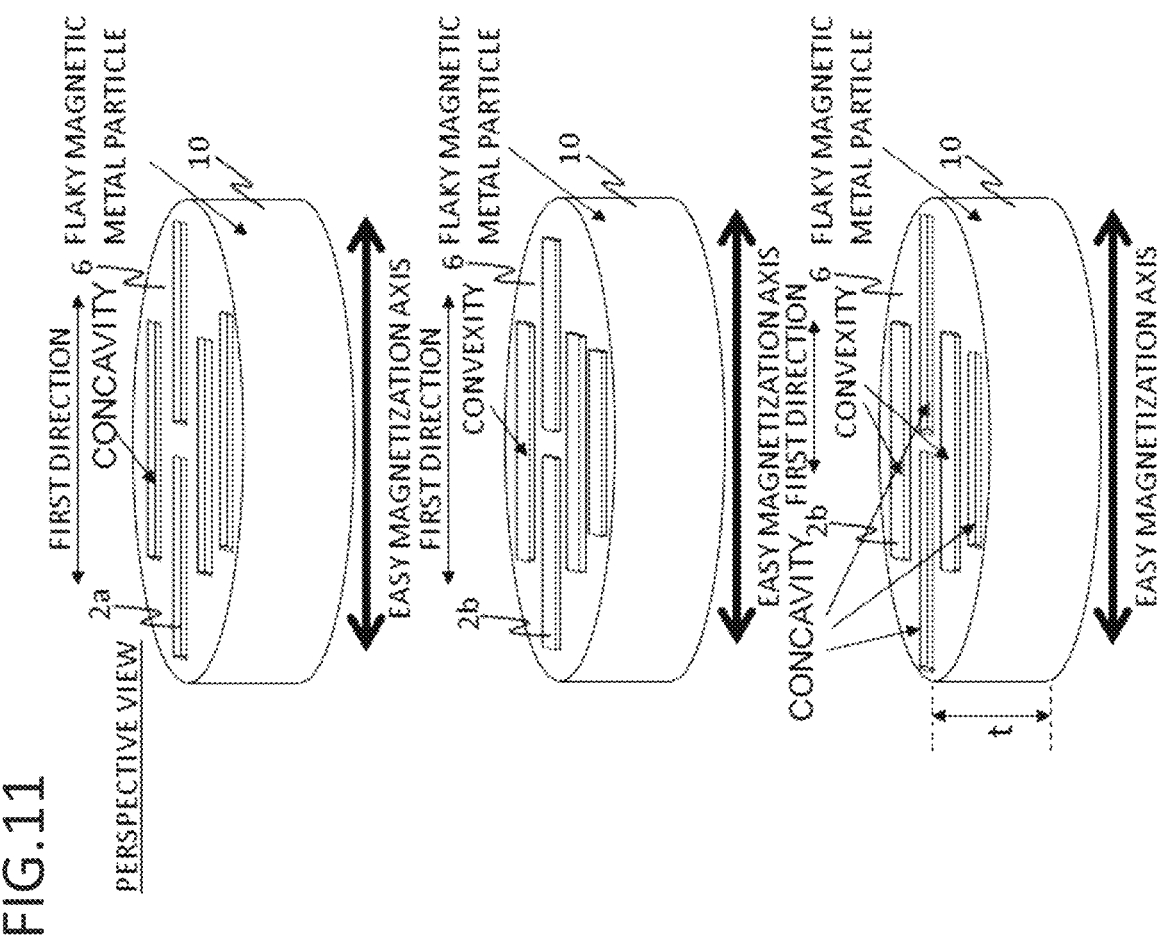
FIG. 11 is a schematic diagram illustrating the desired direction of the easy magnetization axis of the flaky magnetic metal particles according to the first embodiment.
Figure 12:
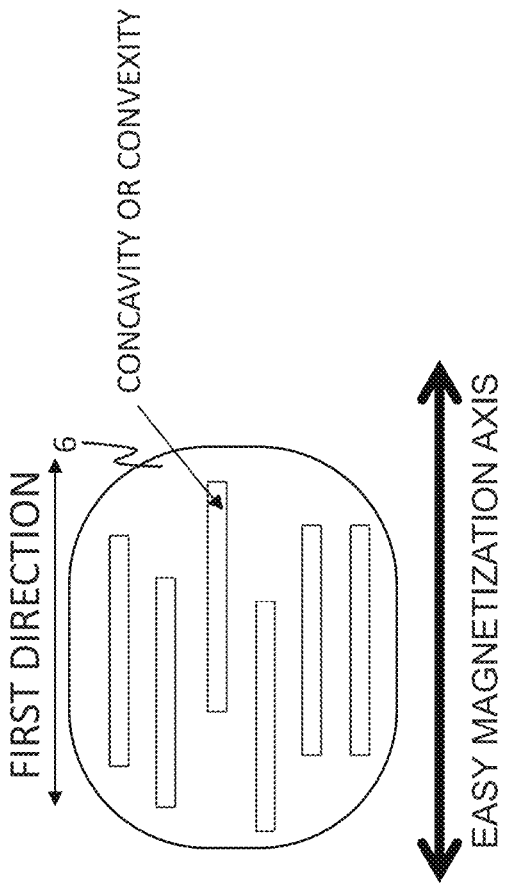
FIG. 12 is a schematic diagram illustrating the desired direction of the easy magnetization axis of the flaky magnetic metal particle according to the first embodiment.

In regard to the flaky magnetic metal particles, it is preferable that the first directions of either or both of a plurality of concavities and a plurality of convexities are mostly arranged in the direction of the easy magnetization axis. That is, in a case in which there are a large number of directions of arrangement (=first directions) in the flat surface of a flaky magnetic metal particle, it is preferable that the direction of arrangement (=first direction) that accounts for the largest proportion in the large number of directions of arrangement (=first directions) coincides with the direction of the easy axis of the flaky magnetic metal particles. Since the length direction in which the concavities or convexities are arranged, namely, the first direction, is likely to become the easy magnetization axis as a result of the effect of shape magnetic anisotropy, when the flaky magnetic metal particles are oriented with respect to this direction as the easy magnetization axis, magnetic anisotropy may be easily imparted, which is preferable. For the reference, FIG. 11 and FIG. 12 present schematic diagrams illustrating the desired directions of the easy magnetization axis of the flaky magnetic metal particles.

Figure 13:
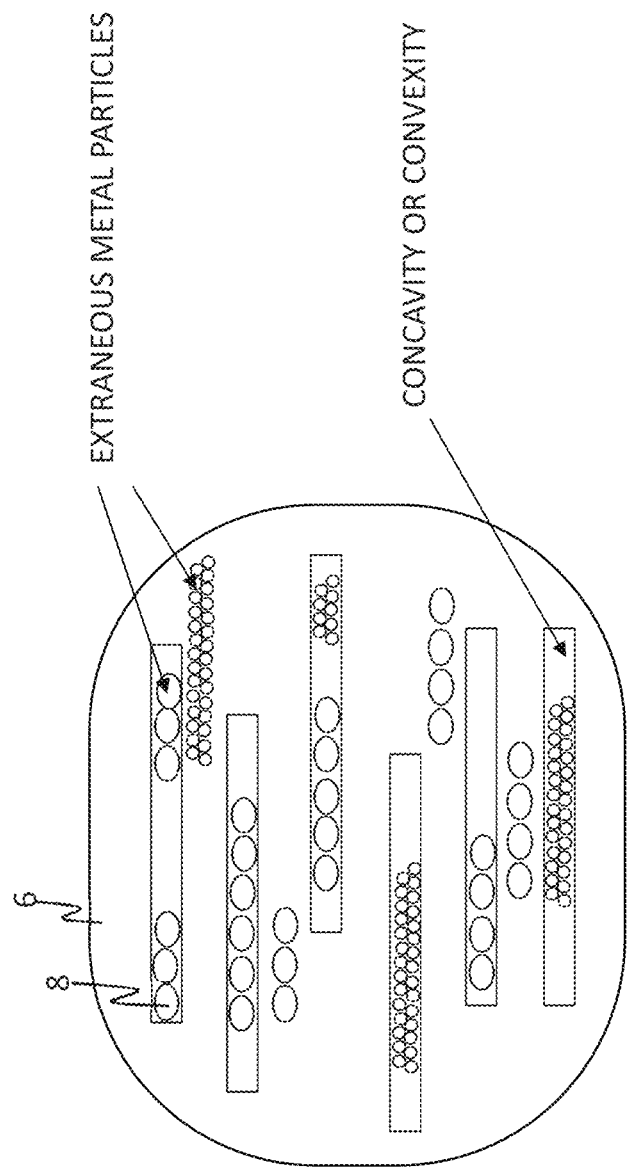
FIG. 13 is a schematic diagram illustrating a flaky magnetic metal particle containing extraneous metal particles according to the first embodiment.
Figure 14:
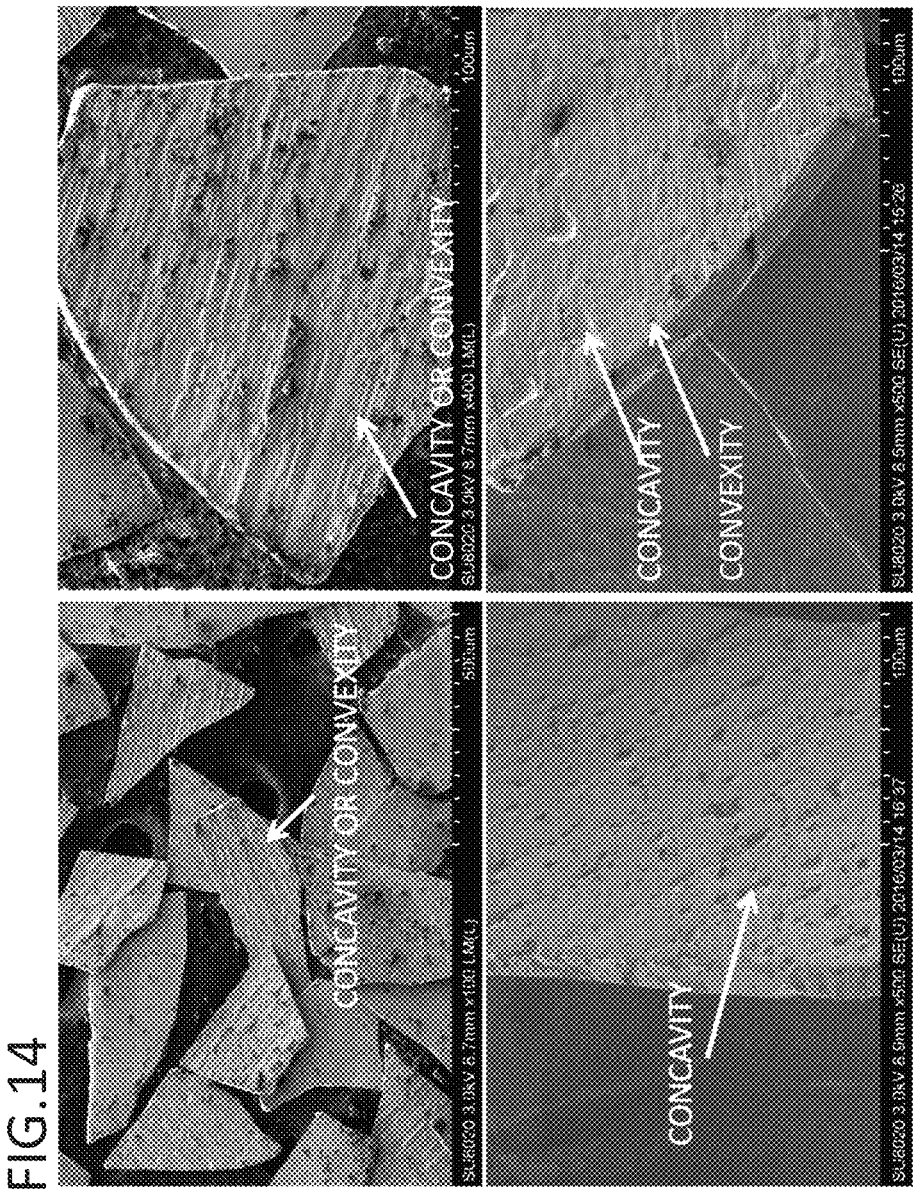
FIG. 14 is a scanning electron microscopic photograph of the flaky magnetic metal particles of the first embodiment.
Figure 15:
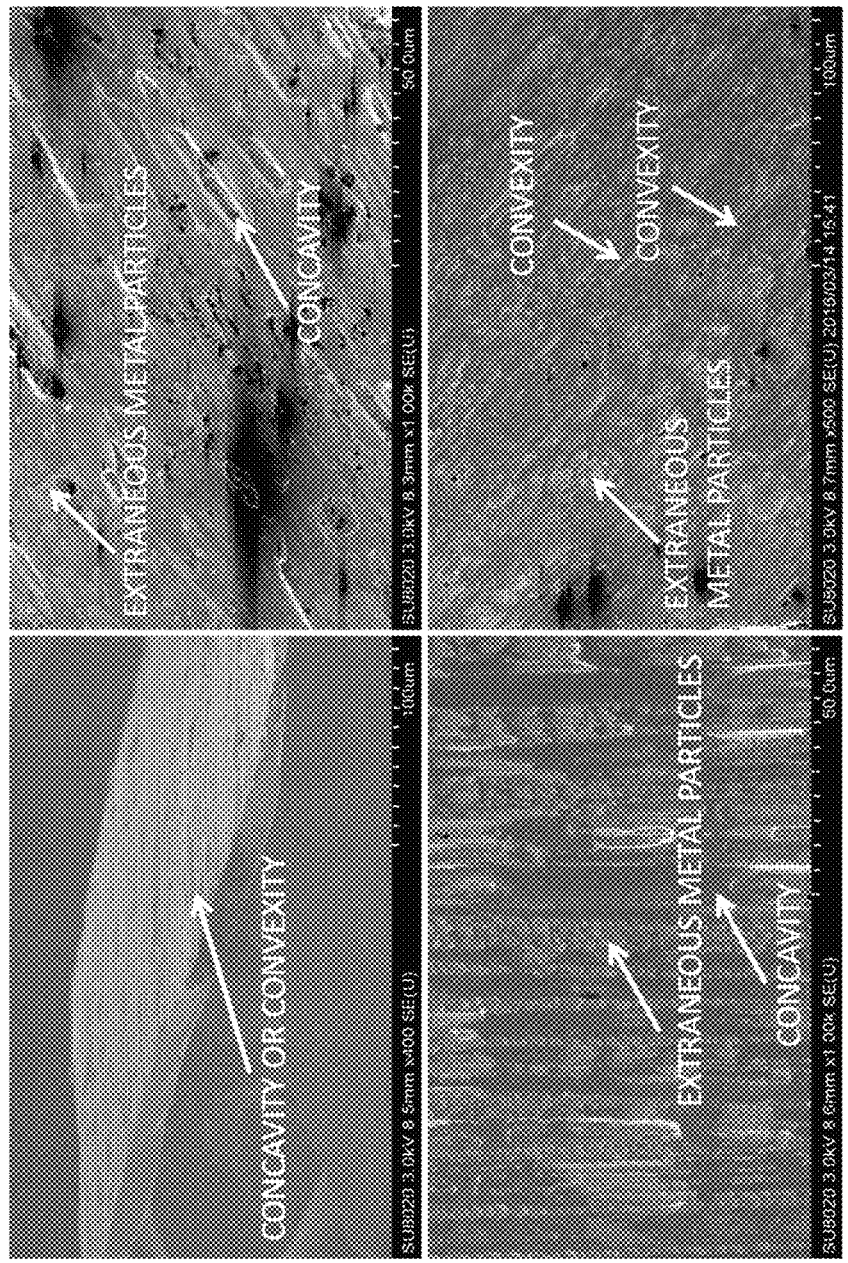
FIG. 15 is a scanning electron microscopic photograph of the flaky magnetic metal particles of the first embodiment.

In regard to either or both of the plurality of concavities and the plurality of convexities, it is desirable that five or more on the average of those are included in one flaky magnetic metal particle. Here, five or more concavities may be included, five or more convexities may be included, or the sum of the number of concavities and the number of convexities may be 5 or larger. More preferably, it is desirable that ten or more of concavities or convexities are included. It is also desirable that the average distance in the width direction between the respective concavities or convexities is between 0.1 μm and 100 μm inclusive. It is also desirable that a plurality of extraneous metal particles containing at least one primary element selected from the group consisting of Fe, Co and Ni as described above and having an average size of between 1 nm and 1 μm inclusive, are arranged along the concavities or convexities. Regarding the method of determining the average size of the extraneous metal particles, the average size is calculated by averaging the sizes of a plurality of extraneous metal particles arranged along the concavities or convexities, based on observation by TEM, SEM, an optical microscope, or the like. When these conditions are satisfied, magnetic anisotropy is easily induced in one direction, which is preferable. Furthermore, the adhesiveness between the flaky magnetic metal particles is enhanced when a pressed powder material is synthesized by powder-compacting the flaky magnetic metal particles (the concavities or convexities bring an anchoring effect of attaching the particles to neighboring particles), and as a result, mechanical characteristics such as strength and hardness, and thermal stability are enhanced, which is preferable. For reference, FIG. 13 presents a schematic diagram of flaky magnetic metal particles including extraneous metal particles. In FIG. 13, extraneous metal particles 8 are shown. Furthermore, FIG. 14 and FIG. 15 show examples of scanning electron microscopic photographs of the flaky magnetic metal particles of the first embodiment.

Figure 16:
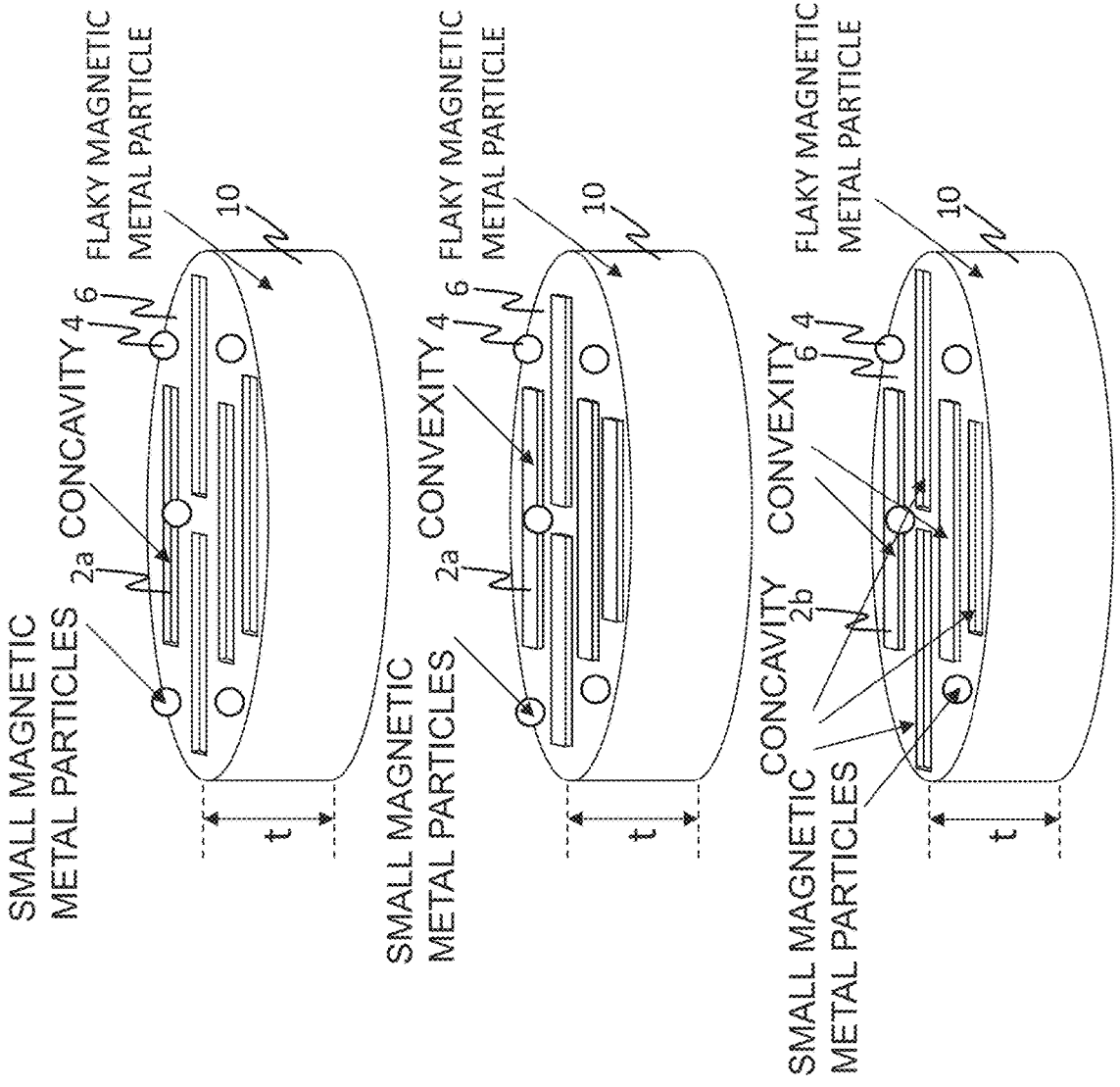
FIG. 16 is a schematic diagram of a flaky magnetic metal particle having small magnetic metal particles of the first embodiment.

It is desirable that each of the flaky magnetic metal particles further comprises a plurality of small magnetic metal particles, that is, five or more particles on the average, on the flat surface. FIG. 16 is a schematic diagram of flaky magnetic metal particles having small magnetic metal particles. The small magnetic metal particles contain at least one primary element selected from the group consisting of Fe, Co and Ni, and the average particle size is between 10 nm and 1 μm inclusive. More preferably, the small magnetic metal particles have a composition that is equal to that of the flaky magnetic metal particles. As the small magnetic metal particles are provided on the surface of the flat surface, or the small magnetic metal particles are integrated with the flaky magnetic metal particles, the surface of the flaky magnetic metal particles is brought to an artificially slightly damaged state. As a result, when the flaky magnetic metal particles are powder-compacted together with an intercalated phase that will be described below, adhesiveness is greatly enhanced. As a result, thermal stability and mechanical characteristics such as strength and toughness may be easily enhanced. In order to exhibit such effects at the maximum level, it is desirable that the average particle size of the small magnetic metal particles is adjusted to be between 10 nm and 1 μm inclusive, and five or more small magnetic metal particles on the average are integrated with the surface, that is, the flat surface, of the flaky magnetic metal particles. When the small magnetic metal particles are unidirectionally arranged within the flat surface, magnetic anisotropy may be easily imparted in the flat surface, and high magnetic permeability and low losses may be easily realized. Therefore, it is more preferable. The average particle size of the small magnetic metal particles is determined by observing the particles by TEM, SEM, an optical microscope, or the like.

The variation in the particle size distribution of the flaky magnetic metal particles can be defined by the coefficient of variation (CV value). That is, CV value (%)=[Standard deviation of particle size distribution (μm)/average particle size (μm)]×100. It can be said that as the CV value is smaller, a sharp particle size distribution with less variation in the particle size distribution is obtained. When the CV value defined as described above is between 0.1% and 60% inclusive, low coercivity, low hysteresis loss, high magnetic permeability, and high thermal stability can be realized, which is preferable. Furthermore, since the variation is small, it is also easy to realize a high yield. A more preferred range of the CV value is between 0.1% and 40% inclusive.

The average thickness of the flaky magnetic metal particles is preferably between 10 nm and 100 μm inclusive, and more preferably between 1 μm and 100 μm inclusive. Furthermore, the average value of the ratio of the average length in the flat surface with respect to the thickness is preferably between 5 and 10,000 inclusive, and more preferably between 10 and 1,000 inclusive. Furthermore, it is preferable that particles having a ratio of the average length in the flat surface to the thickness between 5 and 10,000 inclusive are included, and it is more preferable that particles having a ratio of between 10 and 1,000 inclusive are included. When the thickness is small and the aspect ratio is large, it is preferable from the viewpoint that the eddy current loss may be easily reduced; however, the coercivity tends to become slightly higher. Therefore, from the viewpoint of reducing coercivity, it is preferable that the flaky magnetic metal particles have an appropriate thickness and an appropriate ratio of the average length in the flat surface with respect to an appropriate thickness. At the thickness and the ratio of the average length in the flat surface with respect to the thickness in the ranges described above, the flaky magnetic metal particles provide a material having a good balance between the eddy current loss and the coercivity.

One effective method for providing the direction-induced coercivity difference within the flat surface of a flaky magnetic metal particle is a method of subjecting the flaky magnetic metal particle to a heat treatment in a magnetic field. It is desirable to perform a heat treatment while a magnetic field is applied unidirectionally within the flat surface. Before performing the heat treatment in a magnetic field, it is desirable to find the easy axis direction within the flat surface (find the direction in which coercivity is lowest), and to perform the heat treatment while applying a magnetic field in that direction. It is more preferable if the magnetic field to be applied is larger; however, it is preferable to apply a magnetic field of 1 kOe or greater, and it is more preferable to apply a magnetic field of 10 kOe or greater. As a result, magnetic anisotropy can be exhibited in the flat surfaces of the flaky magnetic metal particles, a direction-induced coercivity difference can be provided, and excellent magnetic characteristics can be realized. Therefore, it is preferable. The heat treatment is preferably carried out at a temperature of between 50° C. and 800° C. inclusive. Regarding the atmosphere for the heat treatment, a vacuum atmosphere at a low oxygen concentration, an inert atmosphere, or a reducing atmosphere is desirable. More desirably, a reducing atmosphere of $H_2$ (hydrogen), CO (carbon monoxide), $CH_4$ (methane), or the like is preferred. The reason for this is that even if the flaky magnetic metal particles have been oxidized, the oxidized metal can be reduced and restored into simple metal by subjecting the metal particles to a heat treatment in a reducing atmosphere. As a result, flaky magnetic metal particles that have been oxidized and have lowered saturation magnetization can be reduced, and thereby saturation magnetization can also be restored. When crystallization of the flaky magnetic metal particles proceeds noticeably due to the heat treatment, characteristics are deteriorated (coercivity increases, and magnetic permeability decreases). Therefore, it is preferable to select the conditions so as to suppress excessive crystallization.

Furthermore, when flaky magnetic metal particles are synthesized, in a case in which the flaky magnetic metal particles are obtained by synthesizing a ribbon by a roll quenching method or the like and pulverizing this ribbon, either or both of a plurality of concavities and a plurality of convexities may be easily arranged in the first direction at the time of ribbon synthesis (concavities or convexities can be easily attached in the direction of rotation of the roll). As a result, the flaky magnetic metal particles may easily have a direction-induced coercivity difference within the flat surface, which is preferable. That is, the direction in which either or both of a plurality of concavities and a plurality of convexities are arranged in the first direction with the flat surface, is likely to become the direction of the easy magnetization axis, and the flat surface may be effectively provided with a direction-induced coercivity difference, which is preferable.

According to the present embodiment, flaky magnetic metal particles having excellent magnetic characteristics such as low magnetic loss can be provided.

Second Embodiment

The flaky magnetic metal particles of the present embodiment are different from the particles of the first embodiment in that at least a portion of the surface of the flaky magnetic metal particles is covered with a coating layer that has a thickness of between 0.1 nm and 1 μm inclusive and contains at least one secondary element selected from the group consisting of oxygen (O), carbon (C), nitrogen (N), and fluorine (F).

In addition, any matters overlapping with the contents of the first embodiment will not be described repeatedly.

Figure 17A:
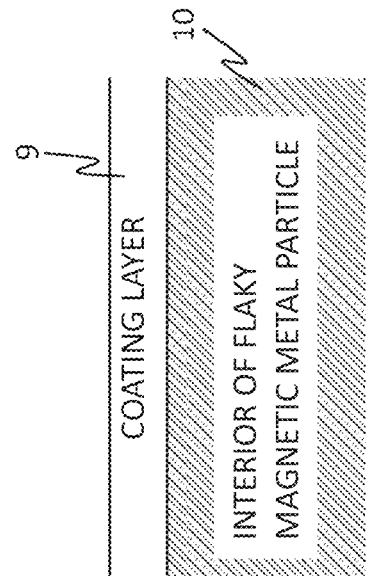
FIGS. 17A and 17B are schematic diagrams of flaky magnetic metal particles of a second embodiment.
Figure 17B:
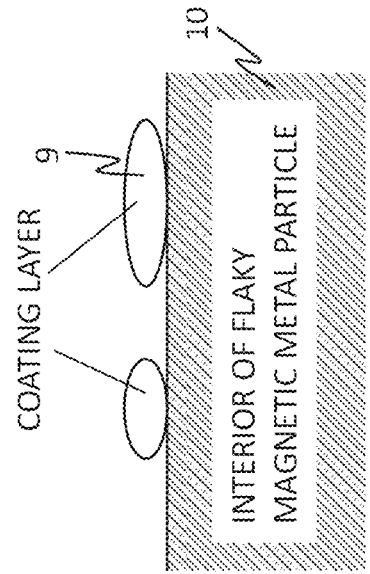

FIGS. 17A and 17B are schematic diagrams of the flaky magnetic metal particles of the present embodiment. The diagrams show a coating layer 9.

It is more preferable that the coating layer contains at least one non-magnetic metal selected from the group consisting of Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements, and also contains at least one secondary element selected from the group consisting of oxygen (O), carbon (C), nitrogen (N), and fluorine (N). The non-magnetic metal is particularly preferably Al or Si, from the viewpoint of thermal stability. In a case in which the flaky magnetic metal particles contain at least one non-magnetic metal selected from the group consisting of Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements, it is more preferable that the coating layer contains at least one non-magnetic metal that is the same as the non-magnetic metal as one of the constituent components of the flaky magnetic metal particles. Among oxygen (O), carbon (C), nitrogen (N), and fluorine (F), it is preferable that the coating layer contains oxygen (O), and it is preferable that coating layer contains an oxide or a composite oxide. This is from the viewpoints of the ease of forming the coating layer, oxidation resistance, and thermal stability. As a result, the adhesiveness between the flaky magnetic metal particles and the coating layer can be enhanced, and the thermal stability and oxidation resistance of the pressed powder material that will be described below can be enhanced. The coating layer can not only enhance the thermal stability and oxidation resistance of the flaky magnetic metal particles, but can also enhance the electrical resistance of the flaky magnetic metal particles. By increasing the electrical resistance, the eddy current loss can be suppressed, and the frequency characteristics of the magnetic permeability can be enhanced. Therefore, it is preferable that the coating layer 14 has high electrical resistance, and for example, it is preferable that the coating layer 14 has a resistance value of 1 mΩ·cm or greater.

Furthermore, the presence of the coating layer is preferable also from the viewpoint of magnetic characteristics. In regard to the flaky magnetic metal particles, since the size of the thickness is small relative to the size of the flat surface, the metal particles may be regarded as a pseudo-thin film. At this time, a product obtained by forming the coating layer on the surface of the flaky magnetic metal particles and integrating the coating layer with the particles may be considered to have a pseudo-laminated thin film structure, and the magnetic domain structure is stabilized in terms of energy. As a result, coercivity can be reduced (hysteresis loss is reduced thereby), which is preferable. At this time, the magnetic permeability also becomes high, and it is preferable. From such a viewpoint, it is more preferable that the coating layer is non-magnetic (magnetic domain structure is easily stabilized).

From the viewpoints of thermal stability, oxidation resistance, and electrical resistance, it is more preferable as the thickness of the coating layer is larger. However, if the thickness of the coating layer is too large, the saturation magnetization becomes small, and the magnetic permeability also becomes small, which is not preferable. Furthermore, also from the viewpoint of magnetic characteristics, if the thickness is too large, the "effect by which the magnetic domain structure is stabilized, and a decrease in coercivity, a decrease in losses, and an increase in magnetic permeability are brought about" is reduced. In consideration of the above-described matters, a preferred thickness of the coating layer is between 0.1 nm and 1 µm inclusive, and more preferably between 0.1 nm and 100 nm inclusive.

Thus, according to the present embodiment, flaky magnetic metal particles having excellent characteristics such as high magnetic permeability, low losses, excellent mechanical characteristics, and high thermal stability can be provided.

Third Embodiment

A pressed powder material of the present embodiment is a pressed powder material including a plurality of flaky magnetic metal particles and an intercalated phase, each of the flaky magnetic metal particles having a flat surface and a magnetic metal phase containing at least one primary element selected from the group consisting of Fe, Co, and Ni, and having an average thickness of between 10 nm and 100 µm inclusive and an average value of between 5 and 10,000 inclusive as the ratio of the average length in the flat surface with respect to the thickness, the intercalated phase existing between the flaky magnetic metal particles and containing at least one secondary element selected from the group consisting of oxygen (O), carbon (C), nitrogen (N), and fluorine (F), wherein in the pressed powder material, the flat surfaces of the flaky magnetic metal particles are oriented parallel to a plane of the pressed powder material, and the pressed powder material has a direction-induced coercivity difference within the flat surface of the pressed powder material.

FIG. 18 is a schematic diagram of the pressed powder material of the present embodiment. FIG. 18 shows an intercalated phase 20, a pressed powder material 100, and a plane 102 of the pressed powder material. The diagram shown on the right-hand side of FIG. 18 is a schematic diagram obtained by removing hatching from the diagram shown on the left-hand side of FIG. 18 in order to make the diagram easier to see the intercalated phase.

Figure 19:
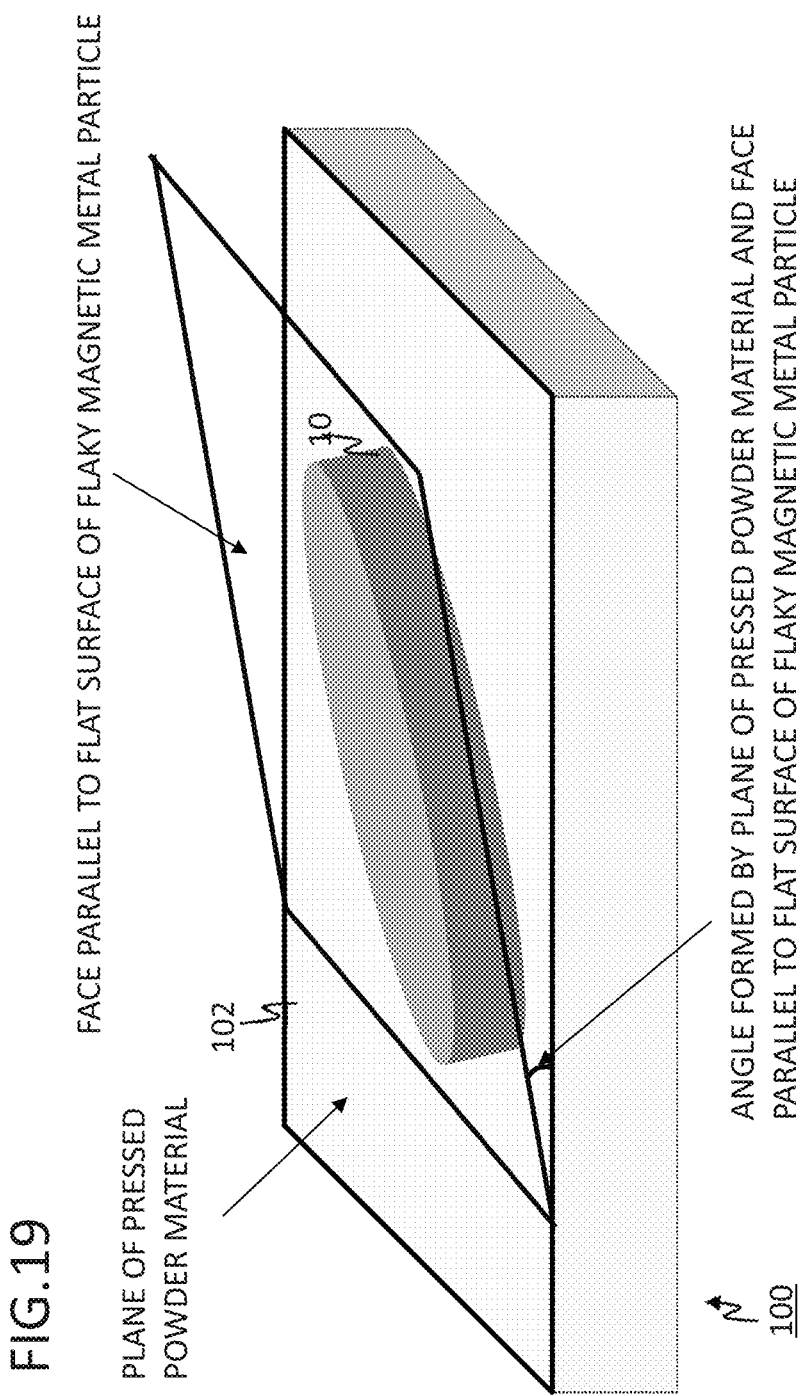
FIG. 19 is a diagram illustrating the angle formed by a face parallel to the flat surface of a flaky magnetic metal particle and a plane of a pressed powder material according to the third embodiment.

As the angle formed by a face parallel to the flat surface of a flaky magnetic metal particle and a plane of the pressed powder material is closer to 0°, it is defined that the flaky magnetic metal particle is oriented. FIG. 19 illustrates the angle formed by a face parallel to the flat surface of a flaky magnetic metal particle and a plane of the pressed powder material. The above-mentioned angle is determined for a large number, that is, ten or more, of flaky magnetic metal particles, and it is desirable that the average value of the angles is preferably between 0° and 45° inclusive, more preferably between 0° and 30° inclusive, and even more preferably between 0° and 10° inclusive. That is, in regard to a pressed powder material, it is preferable that the flat surfaces of the flaky magnetic metal particles are oriented into a layered form such that the flat surfaces are parallel to one another or approximately parallel to one another. As a result, the eddy current loss of the pressed powder material can be reduced, which is preferable. Furthermore, since the diamagnetic field can be made small, the magnetic permeability of the pressed powder material can be made high, which is preferable. Furthermore, since the ferromagnetic resonance frequency can be made high, the ferromagnetic resonance loss can be made small, which is preferable. Furthermore, such a laminated structure is preferable because the magnetic domain structure is stabilized, and low magnetic loss can be realized.

In a case in which coercivity is measured by varying the direction within the above-mentioned plane of a pressed powder material (within the plane parallel to the flat surface of a flaky magnetic metal particle), coercivity is measured by, for example, varying the direction at an interval of 22.5° over the angle of 360° within the plane. FIG. 20 illustrates, as an example, the directions used in a plane of the pressed powder material when coercivity is measured by varying the direction at an interval of 22.5° over the angle of 360° within the plane.

By having a coercivity difference within the above-mentioned plane of a pressed powder material, the minimum coercivity value becomes small compared to an isotropic case where there is almost no coercivity difference, and thus it is preferable. A material having magnetic anisotropy within the plane has differences in coercivity depending on the direction in the plane, and the minimum coercivity value becomes small compared to a magnetically isotropic material. As a result, the hysteresis loss is reduced, and the magnetic permeability is increased, which is preferable.

In the above-mentioned plane of a pressed powder material (in the plane parallel to the flat surface of a flaky magnetic metal particle), it is more preferable as the proportion of the direction-induced coercivity difference is larger, and the proportion is preferably 1% or greater. More preferably, the proportion of the coercivity difference is 10% or greater; even more preferably, the proportion of the coercivity difference is 50% or greater; and still more preferably, the proportion of the coercivity difference is 100% or greater. The proportion of the coercivity difference as used herein is defined by the formula: (Hc(max)−Hc(min))/Hc(min)×100(%), by using the maximum coercivity Hc(max) and the minimum coercivity Hc(min) within a flat surface.

Coercivity can be evaluated conveniently by using a vibrating sample magnetometer (VSM) or the like. When the coercivity is low, even a coercivity of 0.1 Oe or less can be measured using a low magnetic field unit. Measurement is made by varying the direction within the above-mentioned plane of a pressed powder material (in the plane parallel to the flat surface of a flaky magnetic metal particle) with respect to the direction of the magnetic field to be measured.

Figure 21:
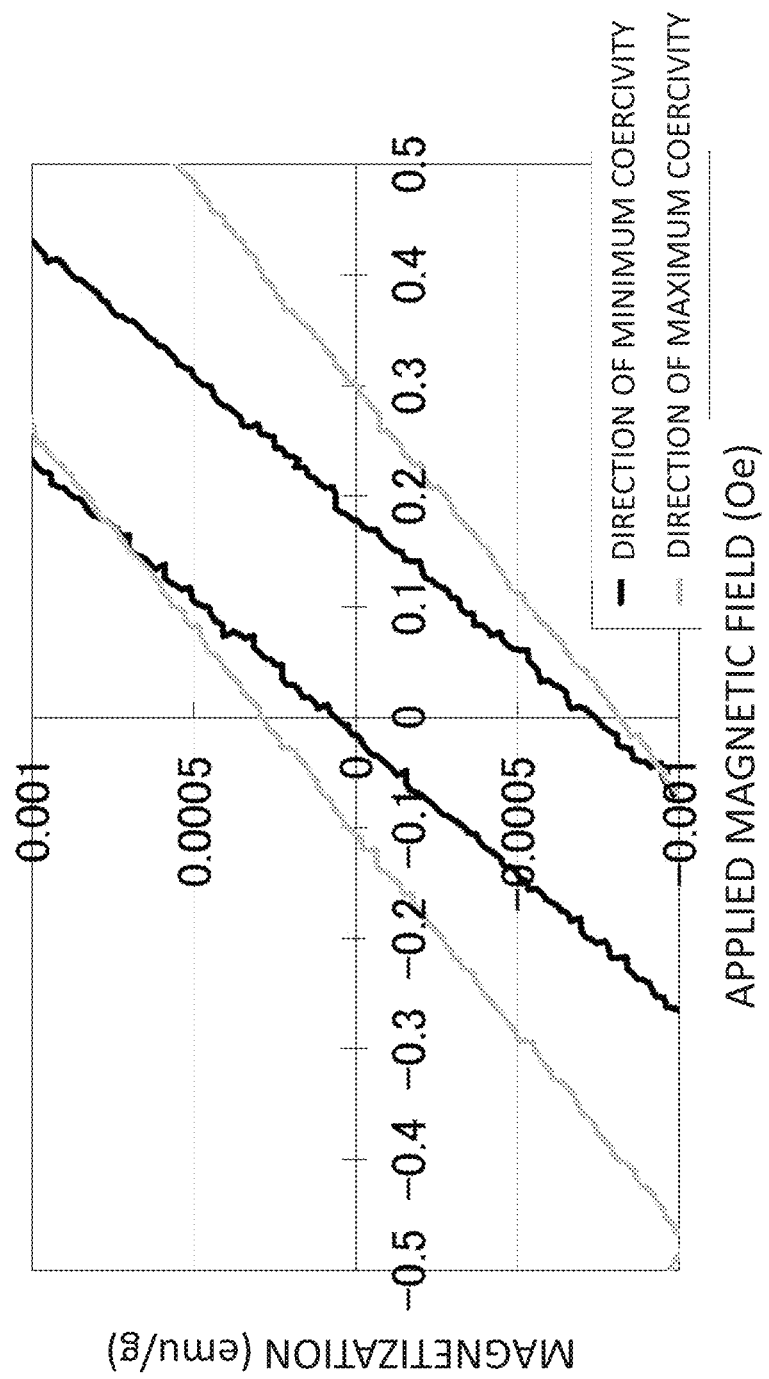
FIG. 21 is a diagram illustrating examples of a magnetization curve in a direction in which coercivity has the minimum value and a magnetization curve in a direction in which coercivity has the maximum value, within a flat surface of the pressed powder material according to the third embodiment.

FIG. 21 shows examples of a magnetization curve in a direction in which coercivity has the minimum value and a magnetization curve in a direction in which coercivity has the maximum value, within a plane of a pressed powder material as an example. The magnetization curve is shifted from the zero point; however, this is merely an error in measurement. When coercivity is calculated, a value obtained by dividing the difference between the magnetic fields at two points that intersect with abscissa (magnetic fields H1 and H2 where magnetization is zero) by 2 can be employed (that is, coercivity can be calculated by the formula: coercivity=|H2−H1|/2). This sample has a composition of Fe—Co—B—Si (Fe:Co:B:Si=52:23:19:6 (at %), Fe:Co=70:30 (at %), the total amount of the additive elements B+Si is 25 at % with respect to the total amount of Fe+Co+B+Si), and it is understood from FIG. 21 that the minimum coercivity is about 0.1 Oe, while the maximum coercivity is about 0.2 Oe. That is, the proportion of the coercivity difference is (0.2−0.1)/0.1×100=100(%).

Figure 22:
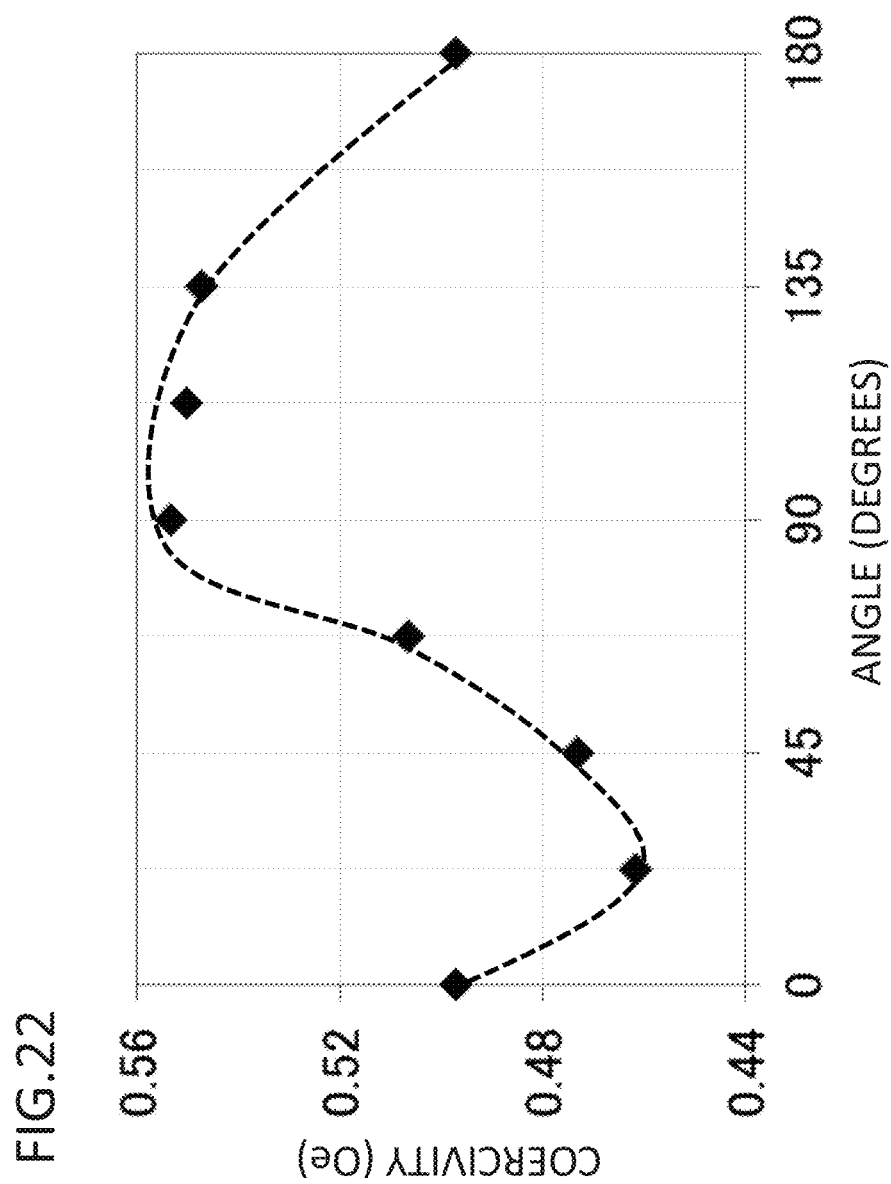
FIG. 22 is a diagram illustrating an example of a direction-induced coercivity difference within the plane of the pressed powder material according to the third embodiment.

FIG. 22 illustrates an example of a coercivity difference in the pressed powder material of the present embodiment, in a case in which the flat surfaces of the flaky magnetic metal particles are oriented parallel to a plane of the pressed powder material, and the pressed powder material has a direction-induced coercivity difference within the above-mentioned plane of the pressed powder material. In the direction of 22.5°, the coercivity is 0.46 Oe (minimum value), and in the direction of 90°, the coercivity is 0.55 Oe (maximum value). Therefore, the coercivity difference is (0.55−0.46)/0.46×100=19.6%. As such, the coercivity difference is preferably 1% or greater, and more preferably, the proportion of the coercivity difference is 10% or greater; the proportion of the coercivity difference is even more preferably 50% or greater; and the proportion of the coercivity difference is still more preferably 100% or greater.

From the viewpoint of imparting magnetic anisotropy, it is preferable that the magnetic metal particles are arranged so as to have the maximum length directions aligned. Whether the maximum length directions are aligned is determined by making an observation of the magnetic metal particles included in the pressed powder material by TEM or SEM or with an optical microscope or the like, determining the angle formed by the maximum length direction and an arbitrarily determined reference line as shown in FIGS. 23A and 23B, and judging the state according to the degree of variation. Preferably, it is preferable to determine the average degree of variation for twenty or more flaky magnetic metal particles; however, in a case in which an observation of twenty or more flaky magnetic metal particles cannot be made, it is preferable that an observation of as many flaky magnetic metal particles as possible is made, and an average degree of variation is determined for those particles. According to the present specification, it is said that the maximum length directions are aligned when the degree of variation is in the range of ±30°. It is more preferable that the degree of variation is in the range of ±20°, and it is even more preferable that the degree of variation is in the range of ±10°. As a result, magnetic anisotropy may be easily imparted to the pressed powder material, which is desirable. A schematic diagram of this structure is shown in FIG. 23A. More preferably, it is desirable that the first directions of either or both of a plurality of concavities and a plurality of convexities in the flat surface are arranged in the maximum length direction. As a result, significant magnetic anisotropy can be imparted, and thus it is desirable. FIG. 23B is a schematic diagram illustrating an example in which the maximum length directions are not aligned.

Figure 24:
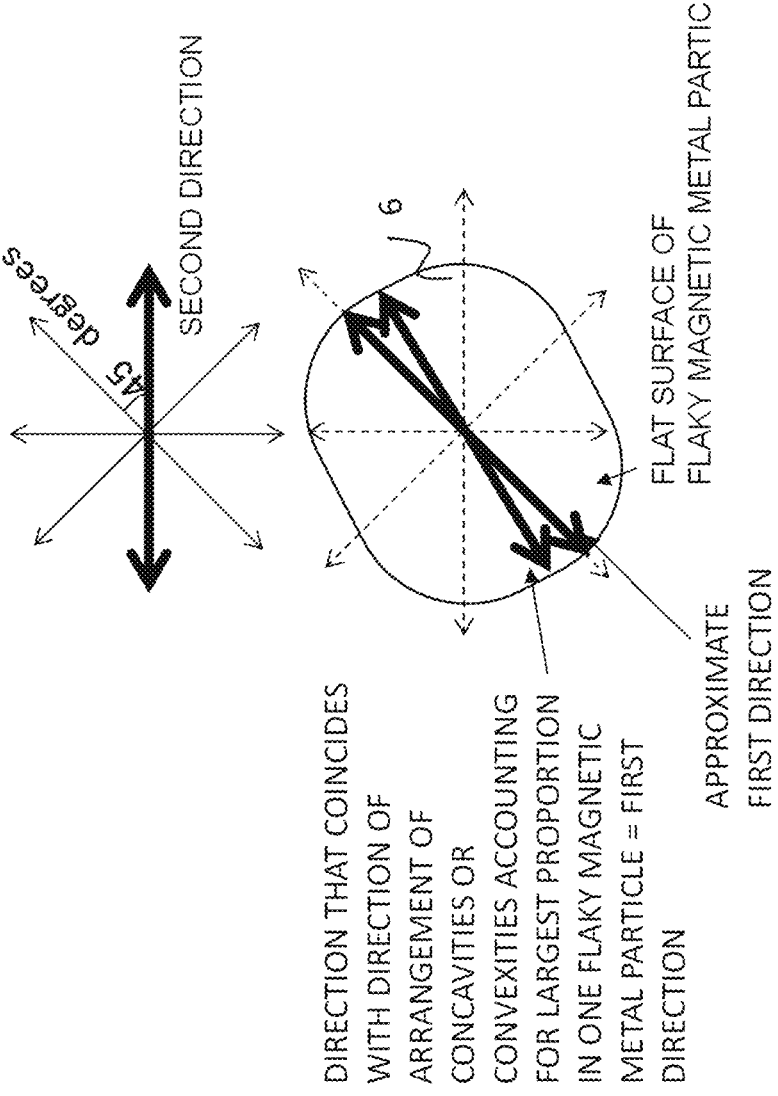
FIG. 24 is a schematic diagram illustrating a method for determining an approximate first direction according to the third embodiment.
Figure 25:
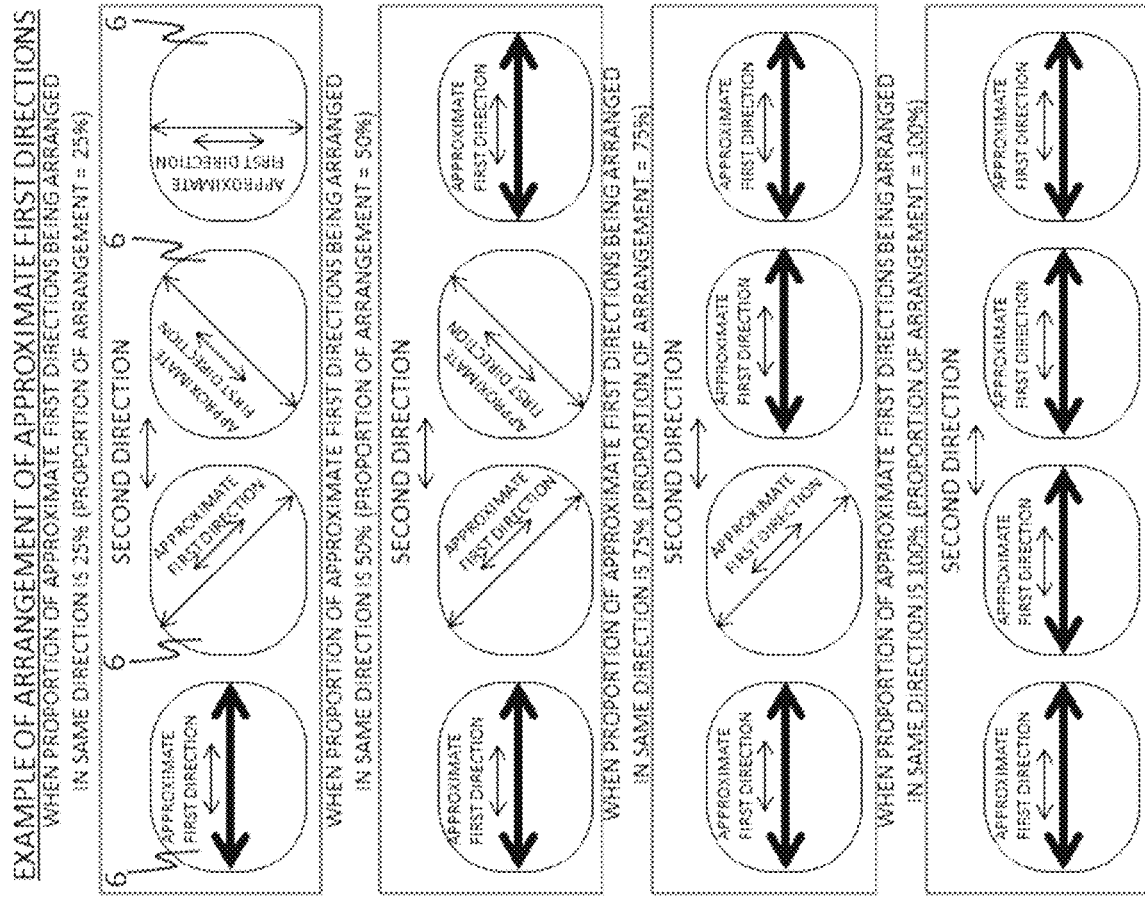
FIG. 25 is a schematic diagram illustrating examples of the direction of arrangement (example of the proportion of arrangement) of the approximate first direction according to the third embodiment.

In regard to the pressed powder material, it is preferable that the "proportion of arrangement" at which an approximate first direction is arranged in a second direction is 30% or higher. The "proportion of arrangement" is more desirably 50% or higher, and even more desirably 75% or higher. As a result, the magnetic anisotropy becomes appropriately high, and the magnetic characteristics are enhanced as described above, which is preferable. FIG. 24 and FIG. 25 are schematic diagrams illustrating a method for determining the approximate first direction according to the present embodiment, and an example of the direction of arrangement of the approximate first directions (example of the proportion of arrangement). FIG. 24 shows a method of determining the approximate first direction. First, for all of the flaky magnetic metal particles to be evaluated in advance, the direction in which the direction of arrangement of the concavities or convexities carried by various flaky magnetic metal particles accounts for the largest proportion is defined as a first direction. The direction in which the largest number of the first directions of the various flaky magnetic metal particles will be arranged in the pressed powder material as a whole is defined as a second direction. In FIG. 24, a case in which the direction of the bold black arrow line serves as the second direction, is shown as an example. Next, directions obtained by dividing the angle of 360° into angles at an interval of 45° with respect to the second direction are determined. Next, the first directions of the various flaky magnetic metal particles are sorted according to the direction of angle to which the first directions are arranged most closely, and that direction is defined as the "approximate first direction". That is, the first directions are sorted into four classes, that is, the direction of 0°, the direction of 45°, the direction of 90°, and the direction of 135°. FIG. 24 illustrates examples of the second direction, the first direction, and the approximate first direction. FIG. 25 is a schematic diagram illustrating an example of the direction of arrangement of the approximate first directions (example of the proportion of arrangement). FIG. 25 shows examples of the proportion in which the approximate first directions are arranged in the same direction as the second direction (this is defined as the "proportion of arrangement") is 25%, 50%, 75%, or 100%. When this "proportion of arrangement" is evaluated, four consecutive neighboring flaky magnetic metal particles are selected, and the four particles are evaluated. This is carried out repeatedly for at least three or more times (the more the better; for example, five or more times is desirable, and ten or more times is more desirable), and thereby, the average value is employed as the proportion of arrangement. Meanwhile, flaky magnetic metal particles in which the directions of the concavities or the convexities cannot be determined are excluded from the evaluation, and an evaluation of the flaky magnetic metal particles immediately adjacent thereto is performed. For example, in many of flaky magnetic metal particles obtained by pulverizing a ribbon synthesized with a single roll quenching apparatus, concavities or convexities attach only on one of the flat surfaces, and the other flat surface does not have any concavities or convexities attached thereto. When such flaky magnetic metal particles are observed by SEM, the situation in which the flat surface without any concavities or convexities attached thereto is shown on the image of observation may also occur at a probability of about 50% (in this case, too, there may be concavities or convexities actually attached to the flat surface on the rear side; however, these flaky magnetic metal particles have been excluded from the evaluation).

FIG. 26 shows an example of a scanning electron microscopic photograph of the direction of arrangement of the approximate first directions. First, in order to determine a second direction, a direction that coincides with the direction of arrangement (first direction) of concavities or convexities accounting for the largest proportion is decided, and that direction is set as the second direction. In FIG. 26, it is understood from the results of observation of the scanning electron microscopic photograph, that the direction represented by a bold black arrow line in the schematic diagram on the left-hand side becomes the second direction. Next, directions each inclined by 45° from that direction are determined (four directions, namely, the direction of 0°, the direction of 45°, the direction of 90°, and the direction 135°). Next, the first directions of the various flaky magnetic metal particles (for each flaky magnetic metal particle, the direction of the concavities or convexities accounting for the largest proportion) are sorted based on the direction that is closest to the direction of a set angle, and the first direction is determined as an "approximate first direction". For example, in FIG. 26, the approximate first direction of the flaky magnetic metal particles of (1) to (6), (12) and (13) is the direction of 0°, the approximate first direction of the flaky magnetic metal particles of (7) to (11) is the direction of 90°, and the approximate first direction of the flaky magnetic metal particle of (14) is the direction of 135°. In FIG. 26, the directions of the approximate first direction of (1) to (14) are recorded on the scanning electron microscopic photograph as white arrows. Next, four consecutive neighboring flaky magnetic metal particles are selected, and the four particles are evaluated. For example, since the four particles of (1) to (4) are all in the direction of 0°, which is the same as the second direction, the proportion at which the particles are arranged in the same direction is 100%. For the next four of (5) to (8), since the two particles of (5) and (6) are in the direction of 0°, which is the same as the second direction, the proportion in which the particles are arranged in the same direction is 50%. For the next four of (9) to (12), since only the particle of (12) is in the direction of 0°, which is the same as the second direction, the proportion at which the particles are arranged in the same direction is 25% (although the three particles of (9) to (11) are arranged in the same direction, since this direction is a direction different from the second direction, this direction is not counted as the same direction). Therefore, the proportions in which the particles are arranged in the same direction (=proportion of arrangement) in connection with the three sets of (1) to (4), (5) to (8), and (9) to (12), are 100%, 50%, and 25%, and the average value is about 58%.

Furthermore, it is preferable that the largest number of the approximate first directions are arranged in the direction of the easy magnetization axis of the pressed powder material. That is, it is preferable that the easy magnetization axis of the pressed powder material is parallel to the second direction. FIG. 27 shows a schematic diagram illustrating the desired directions of the approximate first direction and the easy magnetization axis. Since the length direction in which the concavities or convexities are arranged is likely to become the easy magnetization axis due to the effect of shape magnetic anisotropy, it is preferable to align the directions by taking this direction as the easy magnetization axis, since magnetic anisotropy is easily imparted.

Figure 28:
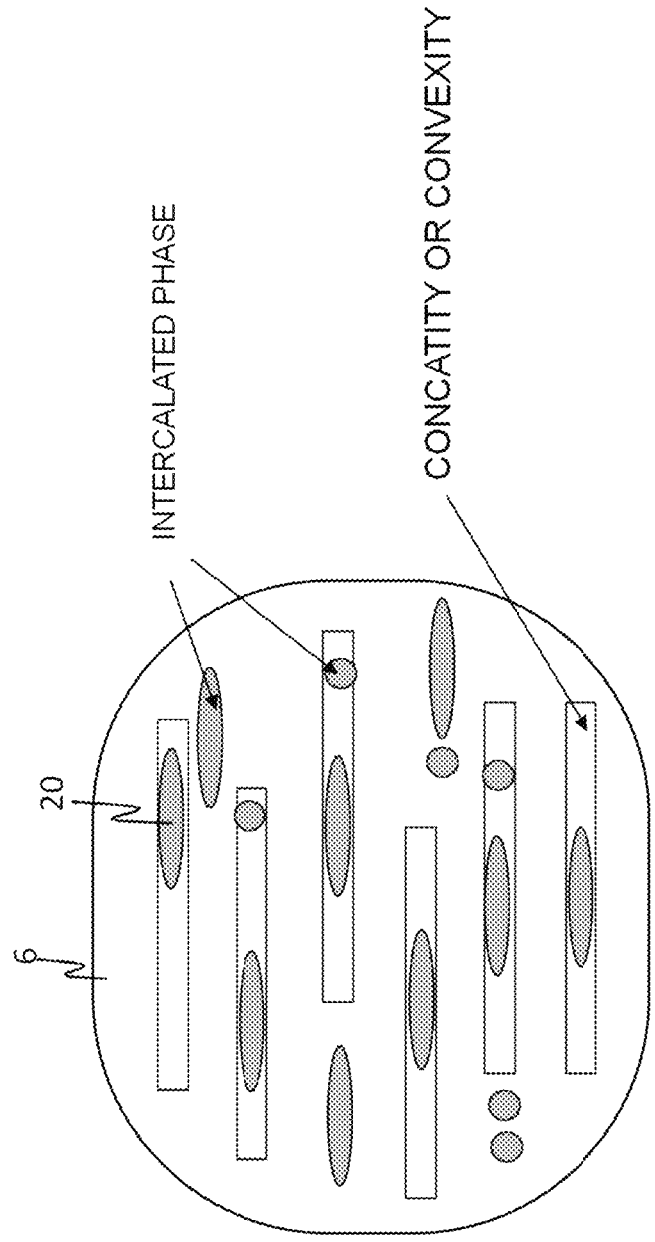
FIG. 28 is a schematic diagram illustrating the disposition of an intercalated phase according to the third embodiment.
Figure 29:
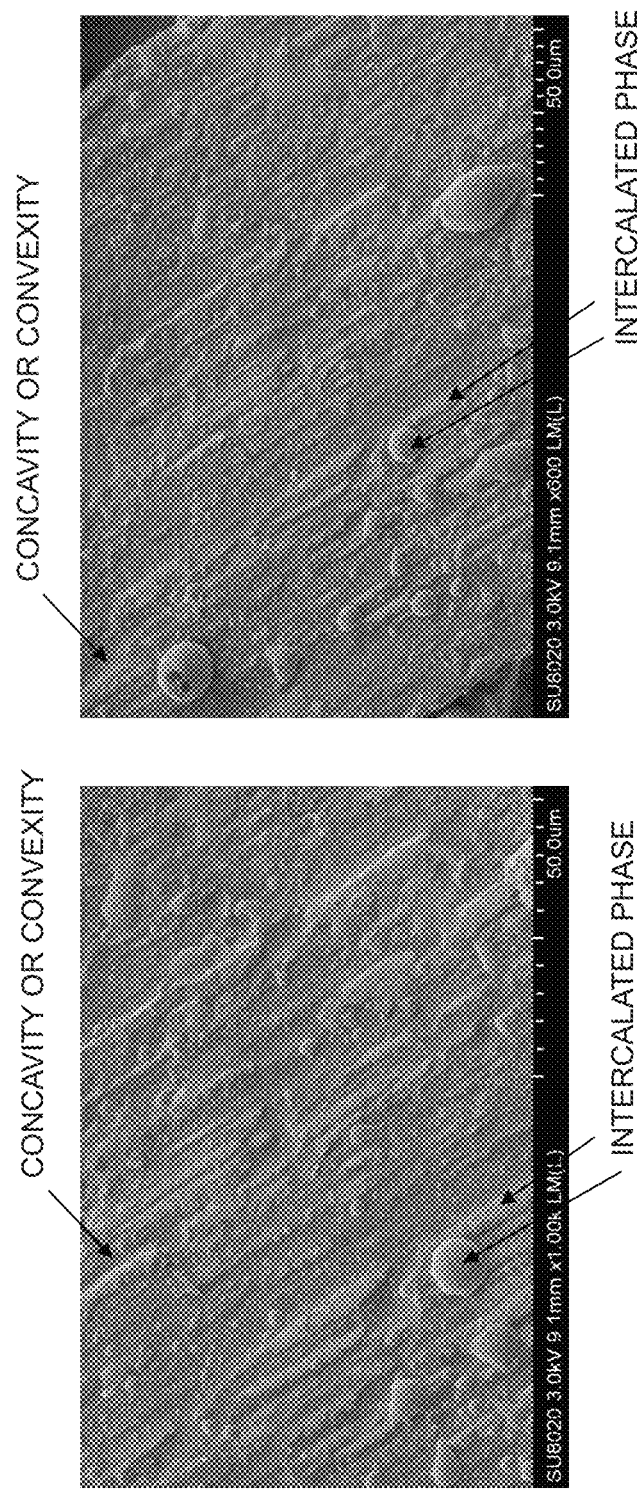
FIG. 29 is a scanning electron microscopic photograph of a flaky magnetic metal particle containing an intercalated phase according to the third embodiment.

FIG. 28 shows a schematic diagram illustrating the disposition of the intercalated phase. It is preferable that a portion of the intercalated phase is attached along the first direction. In other words, it is preferable that a portion of the intercalated phase is attached along the direction of the concavities or convexities on the flat surfaces of the flaky magnetic metal particles. As a result, magnetic anisotropy can be easily induced unidirectionally, which is preferable. Such attachment of the intercalated phase is preferable because the adhesiveness between the flaky magnetic metal particles is enhanced, and consequently, mechanical characteristics such as strength and hardness and thermal stability are enhanced. It is also preferable that the intercalated phase includes a particulate phase. As a result, the adhesiveness between the flaky magnetic metal particles is maintained in an adequate state as appropriate, strain is reduced (since there is a particulate intercalated phase between the flaky magnetic metal particles, the stress applied to the flaky magnetic metal particles is relieved), and coercivity can be easily reduced (hysteresis loss is reduced, and magnetic permeability is increased), which is preferable. FIG. 29 shows an example of the scanning electron microscopic photograph of flaky magnetic metal particles including an intercalated phase. It is understood that an intercalated phase is attached along the direction of the concavities or convexities on the flat surfaces of the flaky magnetic metal particles.

It is preferable that the intercalated phase is included in an amount of between 0.01 wt % and 80 wt % inclusive, more preferably between 0.1 wt % and 60 wt % inclusive, and even more preferably between 0.1 wt % and 40 wt % inclusive, with respect to the total amount of the pressed powder material. If the proportion of the intercalated phase is too large, the proportion of the flaky magnetic metal particles that have the role of exhibiting magnetic properties becomes small, and as a result, saturation magnetization or magnetic permeability of the pressed powder material is lowered, which is not preferable. In contrast, if the proportion of the intercalated phase is too small, an interaction between the flaky magnetic metal particles and the intercalated phase is weakened, and it is not preferable from the viewpoints of thermal stability and mechanical characteristics such as strength and toughness. The proportion of the intercalated phase that is optimal from the viewpoints of magnetic characteristics such as saturation magnetization and magnetic permeability, thermal stability, and mechanical characteristics, is between 0.01 wt % and 80 wt % inclusive, more preferably between 0.1 wt % and 60 wt % inclusive, and even more preferably between 0.1 wt % and 40 wt % inclusive, with respect to the total amount of the pressed powder material.

Furthermore, it is preferable that the proportion of lattice mismatch between the intercalated phase and the flaky magnetic metal particles is between 0.1% and 50% inclusive. As a result, an appropriately high magnetic anisotropy can be easily imparted, and the above-mentioned magnetic characteristics are enhanced, which is preferable. In order to set the lattice mismatch to the range described above, the lattice mismatch can be realized by selecting the combination of the composition of the intercalated phase and the composition of the flaky magnetic metal particles 10. For example, Ni of the fcc structure has a lattice constant of 3.52 Å, and MgO of the NaCl type structure has a lattice constant of 4.21 Å. Thus, the lattice mismatch of the two is (4.21−3.52)/3.52×100=20%. That is, the lattice mismatch can be set to 20% by employing Ni of the fcc structure as the main composition of the flaky magnetic metal particles and employing MgO for the intercalated phase 20. As such, the lattice mismatch can be set to the range described above by selecting the combination of the main composition of the flaky magnetic metal particles and the main composition of the intercalated phase.

The intercalated phase contains at least one secondary element selected from the group consisting of oxygen (O), carbon (C), nitrogen (N), and fluorine (F). It is because the resistance can be increased thereby. It is preferable that the electrical resistivity of the intercalated phase is higher than the electrical resistivity of the flaky magnetic metal particles. It is because the eddy current loss of the flaky magnetic metal particles can be reduced thereby. Since the intercalated phase exists so as to surround the flaky magnetic metal particles, the oxidation resistance and thermal stability of the flaky magnetic metal particles can be enhanced, which is preferable. Above all, it is more preferable that the intercalated phase contains oxygen from the viewpoint of having high oxidation resistance and high thermal stability. Since the intercalated phase also plays a role of mechanically adhering flaky magnetic metal particles to neighboring flaky magnetic metal particles, it is preferable also from the viewpoint of high strength.

The intercalated phase may satisfy at least one of the following three conditions: "being a eutectic oxide", "containing a resin", and "containing at least one magnetic metal selected from Fe, Co, and Ni". This will be described below.

First, the first "case in which the intercalated phase is a eutectic oxide" will be described. In this case, the intercalated phase contains a eutectic oxide containing at least two tertiary elements selected from the group consisting of B (boron), Si (silicon), Cr (chromium), Mo (molybdenum), Nb (niobium), Li (lithium), Ba (barium), Zn (zinc), La (lanthanum), P (phosphorus), Al (aluminum), Ge (germanium), W (tungsten), Na (sodium), Ti (titanium), As (arsenic), V (vanadium), Ca (calcium), Bi (bismuth), Pb (lead), Te (tellurium), and Sn (tin). Particularly, it is preferable that the intercalated phase contains a eutectic system containing at least two elements from among B, Bi, Si, Zn, and Pb. As a result, the adhesiveness between the flaky magnetic metal particles and the intercalated phase becomes strong (interaction strength increases), and thermal stability and mechanical characteristics such as strength and toughness may be easily enhanced.

Furthermore, the eutectic oxide preferably has a softening point of between 200° C. and 600° C. inclusive, and more preferably between 400° C. and 500° C. inclusive. Even more preferably, the eutectic oxide is preferably a eutectic oxide containing at least two elements from among B, Bi, Si, Zn and Pb, and having a softening point of between 400° C. and 500° C. inclusive. As a result, the interaction between the flaky magnetic metal particles and the eutectic oxide becomes strong, and the thermal stability and mechanical characteristics such as strength and toughness may be easily enhanced. When the flaky magnetic metal particles are integrated with the eutectic oxide, the two components are integrated while performing a heat treatment at a temperature near the softening point of the eutectic oxide, and preferably a temperature slightly higher than the softening point. Then, the adhesiveness between the flaky magnetic metal particles and the eutectic oxide increases, and mechanical characteristics can be enhanced. Generally, as the temperature of the heat treatment is higher to a certain extent, the adhesiveness between the flaky magnetic metal particles and the eutectic oxide increases, and the mechanical characteristics are enhanced. However, if the temperature of the heat treatment is too high, the coefficient of thermal expansion may be increased, and consequently, the adhesiveness between the flaky magnetic metal particles and the eutectic oxide may be decreased on the contrary (when the difference between the coefficient of thermal expansion of the flaky magnetic metal particles and the coefficient of thermal expansion of the eutectic oxide becomes large, the adhesiveness may be further decreased). Furthermore, in a case in which the crystallinity of the flaky magnetic metal particles is non-crystalline or amorphous, if the temperature of the heat treatment is high, crystallization proceeds, and coercivity increases. Therefore, it is not preferable. For this reason, in order to achieve a balance between the mechanical characteristics and the coercivity characteristics, it is preferable to adjust the softening point of the eutectic oxide to be between 200° C. and 600° C. inclusive, and more preferably between 400° C. and 500° C. inclusive, and to integrate the flaky magnetic metal particles and the eutectic oxide while performing a heat treatment at a temperature near the softening point of the eutectic oxide, and preferably at a temperature slightly higher than the softening point. Furthermore, regarding the temperature at which the integrated material is actually used in a device or a system, it is preferable to set the use temperature of the integrated material to be lower than the softening point.

Furthermore, it is desirable that the eutectic oxide has a glass transition temperature. Furthermore, it is desirable that the eutectic oxide has a coefficient of thermal expansion of between $0.5 \times 10^{-6}$/° C. and $40 \times 10^{-6}$/° C. inclusive. As a result, the interaction between the flaky magnetic metal particles 10 and the eutectic oxide becomes strong, and the thermal stability and the mechanical characteristics such as strength and toughness may be easily enhanced.

Furthermore, it is more preferable that the eutectic oxide includes at least one or more eutectic particles that are in a particulate form (preferably a spherical form) having a particle size of between 10 nm and 10 μm inclusive. These eutectic particles contain a material that is the same as the eutectic oxide but is not in a particulate form. In a pressed powder material, pores may also exist in some part, and thus, it can be easily observed that a portion of the eutectic oxide exists in a particulate form, and preferably in a spherical form. Even in a case in which there are no pores, the interface of the particulate form or spherical form can be easily discriminated. The particle size of the eutectic particles is more preferably between 10 nm and 1 μm inclusive, and even more preferably between 10 nm and 100 nm inclusive. As a result, when stress is appropriately relieved during the heat treatment while the adhesiveness between the flaky magnetic metal particles is maintained, the strain applied to the flaky magnetic metal particles can be reduced, and coercivity can be reduced. As a result, the hysteresis loss is also reduced, and the magnetic permeability is increased. Meanwhile, the particle size of the eutectic particles can be measured by making an observation by TEM or SEM. In the scanning electron microscopic photograph of FIG. 29 described above, it is understood that there is a plurality of spherical eutectic particles formed from the intercalated phase.

Furthermore, it is preferable that the intercalated phase has a softening point that is higher than the softening point of the eutectic oxide, and it is more preferable that the intercalated phase has a softening point higher than 600° C. and further contains intermediate intercalated particles containing at least one element selected from the group consisting of oxygen (O), carbon (C), nitrogen (N), and fluorine (F). When the intermediate intercalated particles exist between the flaky magnetic metal particles, on the occasion in which the pressed powder material is exposed to high temperature, the flaky magnetic metal particles can be prevented from being thermally fused with one another and undergoing deterioration of characteristics. That is, it is desirable that the intermediate intercalated particles exist mainly for the purpose of providing thermal stability. Furthermore, when the softening point of the intermediate intercalated particles is higher than the softening point of the eutectic oxide, and more preferably, the softening point is 600° C. or higher, thermal stability can be further increased.

It is preferable that the intermediate intercalated particles contain at least one non-magnetic metal selected from the group consisting of Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements, and contain at least one element selected from the group consisting of O (oxygen), C (carbon), N (nitrogen) and F (fluorine). More preferably, from the viewpoints of high oxidation resistance and high thermal stability, an oxide or composite oxide containing oxygen is more preferred. Particularly, oxides such as aluminum oxide ($Al_2O_3$), silicon dioxide ($SiO_2$), titanium oxide ($TiO_2$), and zirconium oxide ($Zr_2O_3$); and composite oxides such as Al—Si—O are preferred from the viewpoint of high oxidation resistance and high thermal stability.

Regarding the method for producing a pressed powder material containing intermediate intercalated particles, for example, a method of mixing the flaky magnetic metal particles and the intermediate intercalated particles (aluminum oxide ($Al_2O_3$) particles, silicon dioxide ($SiO_2$) particles, titanium oxide ($TiO_2$) particles, zirconium oxide ($Zr_2O_3$) particles, and the like) using a ball mill or the like to obtain a dispersed state, and then integrating the flaky magnetic metal particles and the intermediate intercalated particles by press molding or the like, may be used. The method of dispersing the particles is not particularly limited as long as it is a method capable of appropriately dispersing particles.

Next, the second "case in which the intercalated phase contains a resin" will be described. In this case, the resin is not particularly limited, and a polyester-based resin, a polyethylene-based resin, a polystyrene-based resin, a polyvinyl chloride-based resin, a polyvinyl butyral resin, a polyvinyl alcohol resin, a polybutadiene-based resin, a TEFLON (registered trademark)-based resin, a polyurethane resin, a cellulose-based resin, an ABS resin, a nitrile-butadiene-based rubber, a styrene-butadiene-based rubber, a silicone resin, other synthetic rubbers, natural rubber, an epoxy resin, a phenolic resin, an allyl resin, a polybenzimidazole resin, an amide-based resin, a polyimide-based resin, a polyamideimide resin, or copolymers of those resins are used. Particularly, in order to realize high thermal stability, it is preferable that the intercalated phase includes a silicone resin or a polyimide resin, both of which have high heat resistance. As a result, the interaction between the flaky magnetic metal particles and the intercalated phase becomes strong, and thermal stability and mechanical characteristics such as strength and toughness may be easily enhanced.

Regarding the resin, it is preferable that the weight reduction percentage after heating for 3,000 hours at 180° C. in an air atmosphere is 5% or less, more preferably 3% or less, even more preferably 1% or less, and still more preferably 0.1% or less. Furthermore, the weight reduction percentage after heating for 200 hours at 220° C. in an air atmosphere is preferably 5% or less, more preferably 3% or less, even more preferably 1% or less, and still more preferably 0.1% or less. Furthermore, the weight reduction percentage after heating for 200 hours at 250° C. in an air atmosphere is preferably 5% or less, more preferably 3% or less, even more preferably 1% or less, and still more preferably 0.1% or less. An evaluation of these weight reduction percentages is carried out using a material in an unused state. An unused state refers to a state that can be used after molding, and is a state that has not been exposed to heat (for example, heat at a temperature of 40° C. or higher), chemicals, sunlight (ultraviolet radiation), or the like from the unused state. The weight reduction percentage is calculated by the following formula from the masses obtained before and after heating: weight reduction percentage (%)=[Mass (g) before heating−mass (g) after heating]/mass (g) before heating×100. It is also preferable that the strength after heating for 20,000 hours at 180° C. in an air atmosphere is a half or more of the strength before heating. It is more preferable that the strength after heating for 20,000 hours at 220° C. in an air atmosphere is a half or more of the strength before heating. Furthermore, it is preferable that the resin satisfies the area division H defined by the Japanese Industrial Standards (JIS). Particularly, it is preferable that the resin satisfies the heat resistance condition of enduring a maximum temperature of 180° C. More preferably, it is preferable that the resin satisfies the area division H defined by the Japanese National Railways Standards (JRS). Particularly, it is preferable that the resin satisfies the heat resistance condition of enduring a temperature increase of 180° C. with respect to the ambient temperature (standard: 25° C., maximum: 40° C.). Examples of a resin preferable for these conditions include a polysulfone, a polyether sulfone, polyphenylene sulfide, polyether ether ketone, an aromatic polyimide, an aromatic polyamide, an aromatic polyamideimide, polybenzoxazole, a fluororesin, a silicone resin, and a liquid crystal polymer. These resins have high intermolecular cohesive power, and therefore, the resins have high heat resistance, which is preferable. Among them, an aromatic polyimide and polybenzoxazole have higher heat resistance and are preferable, because the proportions occupied by rigid units in the molecule are high. Furthermore, it is preferable that the resin is a thermoplastic resin. The specifications about the weight reduction percentage upon heating, the specifications about strength, and the specifications about resin type as described above are respectively effective for increasing the heat resistance of the resin. Due to these, when a pressed powder material comprising a plurality of flaky magnetic metal particles and an intercalated phase (herein, a resin) is formed, the heat resistance of the pressed powder material is increased (thermal stability is increased), and mechanical characteristics such as strength and toughness after being exposed to a high temperature (for example, 200° C. or 250° C. described above) or while being under a high temperature (for example, 200° C. or 250° C. described above) are likely to be enhanced, which is preferable. Also, since a large amount of the intercalated phase exists so as to surround the periphery of the flaky magnetic metal particles even after heating, the pressed powder material has excellent oxidation resistance and does not easily undergo deterioration of the magnetic characteristics caused by oxidation of the flaky magnetic metal particles, which is preferable.

Furthermore, in regard to the pressed powder material, it is preferable that the weight reduction percentage after heating for 3,000 hours at 180° C. is 5% or less, more preferably 3% or less, even more preferably 1% or less, and still more preferably 0.1% or less. Furthermore, the pressed powder material is such that the weight reduction percentage after heating for 3,000 hours at 220° C. is preferably 5% or less, more preferably 3% or less, even more preferably 1% or less, and still more preferably 0.1% or less. Furthermore, the weight reduction percentage of the pressed powder material after heating for 200 hours at 250° C. in an air atmosphere is preferably 5% or less, more preferably 3% or less, even more preferably 1% or less, and still more preferably 0.1% or less. The evaluation of the weight reduction percentage is similar to the case of the resin as described above. Furthermore, preferably, it is preferable that the strength of the pressed powder material after heating for 20,000 hours at 180° C. in an air atmosphere is a half or more of the strength before heating. It is more preferable that the strength of the pressed powder material after heating for 20,000 hours at 220° C. in an air atmosphere is a half or more of the strength before heating. Furthermore, it is preferable that the pressed powder material satisfies the area division H defined by the Japanese Industrial Standards (JIS). Particularly, it is preferable that the pressed powder material satisfies the heat resistance condition of enduring a maximum temperature of 180° C. More preferably, it is preferable that the pressed powder material satisfies the area division H defined by the Japanese National Railways Standards (JRS). Particularly, it is preferable that the pressed powder material satisfies the heat resistance condition of enduring a temperature increase of 180° C. with respect to the ambient temperature (standard: 25° C., maximum: 40° C.). The specifications about the weight reduction percentage upon heating, the specifications about strength, and the specifications about resin type as described above are respectively effective for increasing the heat resistance of the pressed powder material, and a material having high reliability can be realized. Since the heat resistance of the pressed powder material is increased (thermal stability is increased), and mechanical characteristics such as strength and toughness after being exposed to a high temperature (for example, 200° C. or 250° C. described above) or while being under a high temperature (for example, 200° C. or 250° C. described above) are likely to be enhanced, which is preferable. Also, since a large amount of the intercalated phase exists so as to surround the periphery of the flaky magnetic metal particles even after heating, the pressed powder material has excellent oxidation resistance and does not easily undergo deterioration of the magnetic characteristics caused by oxidation of the flaky magnetic metal particles, which is preferable.

Furthermore, it is preferable that the pressed powder material includes a crystalline resin that does not have a glass transition point up to the thermal decomposition temperature. It is also preferable that the pressed powder material includes a resin having a glass transition temperature of 180° C. or higher, and it is more preferable that the pressed powder material includes a resin having a glass transition temperature of 220° C. or higher. It is even more preferable that the pressed powder material includes a resin having a glass transition temperature of 250° C. or higher. Generally, the flaky magnetic metal particles have a larger crystal grain size as the temperature of the heat treatment is higher. Therefore, in a case in which there is a need to make the crystal grain size of the flaky magnetic metal particles small, it is preferable that the glass transition temperature of the resin used is not too high, and specifically, it is preferable that the glass transition temperature is 600° C. or lower. Furthermore, it is preferable that the crystalline resin that does not have a glass transition point up to the thermal decomposition temperature includes a resin having a glass transition temperature of 180° C. or higher, and it is more preferable that the crystalline resin includes a resin having a glass transition temperature of 220° C. or higher. Specifically, it is preferable that the crystalline resin includes a polyimide having a glass transition temperature of 180° C. or higher, it is more preferable that the crystalline resin includes a polyimide having a glass transition temperature of 220° C. or higher, and it is even more preferable that the crystalline resin includes a thermoplastic polyimide. As a result, fusion of the resin to the magnetic metal particles is likely to occur, and the resin can be suitably used particularly for powder-compacting molding. The thermoplastic polyimide is preferably a polyimide having an imide bond in the polymer chain of a thermoplastic aromatic polyimide, a thermoplastic aromatic polyamideimide, a thermoplastic aromatic polyetherimide, a thermoplastic aromatic polyesterimide, a thermoplastic aromatic polyimidesiloxane, or the like. Among them, when the glass transition temperature is 250° C. or higher, superior heat resistance is obtained, and thus it is preferable.

An aromatic polyimide and polybenzoxazole exhibit high heat resistance since an aromatic ring and a heterocyclic ring are directly bonded to each other and adopt a planar structure, and those planar structures are immobilized by π-π stacking. As a result, the glass transition temperature can be increased, and thermal stability can be enhanced. Furthermore, the glass transition temperature can be easily adjusted to a desired glass transition point by appropriately introducing a curved unit such as an ether bond into the molecular structure, and thus it is preferable. Above all, when the benzene ring structure of a unit derived from an acid anhydride that constitutes the imide polymer is any one of a biphenyl structure, a triphenyl structure, and a tetraphenyl structure, it is preferable from the viewpoint of strength. Since the symmetric structure between imide groups, which affects heat resistance, is not damaged, and the orientation property also extends over a long distance, the material strength is also increased. An aromatic polyimide structure preferable for this is represented by the following Chemical Formula (1). In other words, the polyimide resin of the present embodiment includes a repeating unit represented by the following Chemical Formula (1):

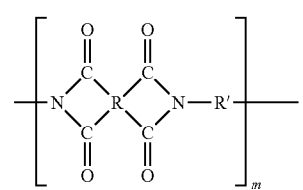

[Chem. 1]

In Chemical Formula (1), R represents any one of a biphenyl structure, a triphenyl structure, and a tetraphenyl structure; and R' represents a structure having at least one or more aromatic rings in the structure.

When the characteristics (weight reduction percentage, resin type, glass transition temperature, molecular structure, and the like) of an intercalated phase (herein, a resin), which is a constituent component of the pressed powder material, are determined from the pressed powder material, only a portion of resin is cut out from the pressed powder material, and evaluation of various characteristics is carried out. In a case in which it cannot be determined by visual inspection whether the portion is formed from a resin or not, the resin and the magnetic metal particles are distinguished by using an elemental analysis based on EDX, or the like.

When the content of the resin contained in the pressed powder material as a whole is larger, the space between the polymer wetting (covering) a flaky magnetic metal particle and the polymer wetting (covering) an adjacent flaky magnetic metal particle can be filled with a polymer without difficulty, and thus mechanical characteristics such as strength are enhanced. Furthermore, the electrical resistivity is also increased, and the eddy current loss of the pressed powder material can be reduced, which is preferable. Meanwhile, as the content of the resin is larger, the proportion of the flaky magnetic metal particles is decreased. Therefore, the saturation magnetization of the pressed powder material decreases, and the magnetic permeability is also decreased, which is not preferable. In order to realize a well-balanced material in comprehensive consideration of mechanical characteristics such as strength, and characteristics such as electrical resistivity, eddy current loss, saturation magnetization, and magnetic permeability, it is preferable to adjust the content of the resin in the entire pressed powder material to 93 wt % or less, more preferably to 86 wt % or less, even more preferably to between 2 wt % and 67 wt % inclusive, and still more preferably to between 2 wt % and 43 wt % inclusive. Furthermore, the content of the flaky magnetic metal particles is preferably 7 wt % or more, more preferably 14 wt % or more, even more preferably between 33 wt % and 98 wt % inclusive, and still more preferably between 57 wt % and 98 wt % inclusive. The flaky magnetic metal particles are such that when the particle size decreases, the surface area increases, and the amount of the resin required is dramatically increased. Therefore, it is preferable that the flaky magnetic metal particles have an appropriately large particle size. As a result, the pressed powder material can be subjected to high saturation magnetization, the magnetic permeability can be made high, and this is advantageous for miniaturization and power output increase of a system.

Next, the third "case in which the intercalated phase contains at least one magnetic metal selected from. Fe, Co, and Ni and has magnetic properties" will be described. In this case, it is preferable because, as the intercalated phase has magnetic properties, the flaky magnetic metal particles can readily interact magnetically with neighboring particles, and the magnetic permeability is increased. Furthermore, since the magnetic domain structure is stabilized, the frequency characteristics of the magnetic permeability are also enhanced, which is preferable. Meanwhile, the term "magnetic properties" as used herein means ferromagnetism, ferrimagnetism, feeble magnetism, antiferromagnetism, or the like. Particularly, in the case of ferromagnetism and ferrimagnetism, the magnetic interaction is stronger, and it is preferable. In regard to the fact that the intercalated phase has magnetic properties, an evaluation can be performed using a vibrating sample magnetometer (VSM) or the like. In regard to the fact that the intercalated phase contains at least one magnetic metal selected from Fe, Co and Ni and has magnetic properties, an investigation can be performed conveniently by using EDX or the like.

Thus, three conditions of the intercalated phase have been described, and it is preferable that at least one of these three conditions is satisfied; however, it is still acceptable that two or more, or all of the three conditions are satisfied. The "case in which the intercalated phase is a eutectic oxide" (first case) exhibits slightly inferior mechanical characteristics such as strength as compared to a case in which the intercalated phase is a resin (second case); however, on the other hand, the first case is highly excellent from the viewpoint that strain may be easily relieved, and particularly, lowering of coercivity may easily occur, which is preferable (as a result, low hysteresis loss and high magnetic permeability may be easily realized, which is preferable). Furthermore, eutectic oxides have higher heat resistance compared to resins in many cases, and eutectic oxides also have excellent thermal stability, which is preferable. In contrast, the "case in which the intercalated phase contains a resin" (second case) has a defect that since the adhesiveness between the flaky magnetic metal particles and the resin is high, stress is likely to be applied (strain is likely to enter), and as a result, coercivity tends to increase. However, since a resin is highly excellent, particularly in view of mechanical characteristics such as strength, a resin is preferable. The "case in which the intercalated phase contains at least one magnetic metal selected from Fe, Co, and Ni and has magnetic properties" (third case) is preferable because the flaky magnetic metal particles may easily interact magnetically with neighboring particles, and particularly because the intercalated phase becomes highly excellent in view of high magnetic permeability and low coercivity (therefore, low hysteresis loss). An intercalated phase that achieves a good balance can be produced by using the three conditions as appropriate, or by combining some of the three conditions, based on the above-described advantages and disadvantages.

In regard to the flaky magnetic metal particles included in the pressed powder material, it is desirable that the particles satisfy the requirements described in the first and second embodiments. Here, description of overlapping matters will not be repeated.

In regard to the pressed powder material, it is preferable that the flat surfaces of the flaky magnetic metal particles described above are oriented in a layered form so as to be parallel to each other. As a result, the eddy current loss of the pressed powder material can be reduced, and thus, it is preferable. Furthermore, since the diamagnetic field can be made small, the magnetic permeability of the pressed powder material can be made high, which is preferable. Also, since the ferromagnetic resonance frequency can be made high, the ferromagnetic resonance loss can be made small, which is preferable. Such a laminated structure is preferable because the magnetic domain structure is stabilized, and low magnetic loss can be realized. Here, as the angle formed by a plane parallel to the flat surface of a flaky magnetic metal particle and a plane of the pressed powder material is closer to 0°, it is defined that the flaky magnetic metal particles are oriented. Specifically, the aforementioned angle is determined for a large number of flaky magnetic metal particles 10 that is, ten or more particles, and it is desirable that the average value is preferably between 0° and 45° inclusive, more preferably between 0° and 30° inclusive, and even more preferably between 0° and 10° inclusive.

The pressed powder material may have a laminated type structure composed of a magnetic layer containing the flaky magnetic metal particles, and an intermediate layer containing any of O, C, and N. In regard to the magnetic layer, it is preferable that the flaky magnetic metal particles are oriented (oriented such that the flat surfaces are parallel to one another). Furthermore, it is preferable that the magnetic permeability of the intermediate layer is made smaller than the magnetic permeability of the magnetic layer. Through these countermeasures, a pseudo thin film laminated structure can be realized, and the magnetic permeability in the layer direction can be made high, which is preferable. In regard to such a structure, since the ferromagnetic resonance frequency can be made high, the ferromagnetic resonance loss can be made small, which is preferable. Furthermore, such a laminated structure is preferable because the magnetic domain structure is stabilized, and low magnetic loss can be realized. In order to further enhance these effects, it is more preferable to make the magnetic permeability of the intermediate layer smaller than the magnetic permeability of the intercalated phase (intercalated phase within the magnetic layer). As a result, the magnetic permeability in the layer direction can be made even higher in a pseudo thin film laminated structure, and therefore, it is preferable. Also, since the ferromagnetic resonance frequency can be made even higher, the ferromagnetic resonance loss can be made small, which is preferable.

Thus, according to the present embodiment, a pressed powder material having excellent magnetic characteristics such as low magnetic loss can be provided.

Fourth Embodiment

Figure 30:
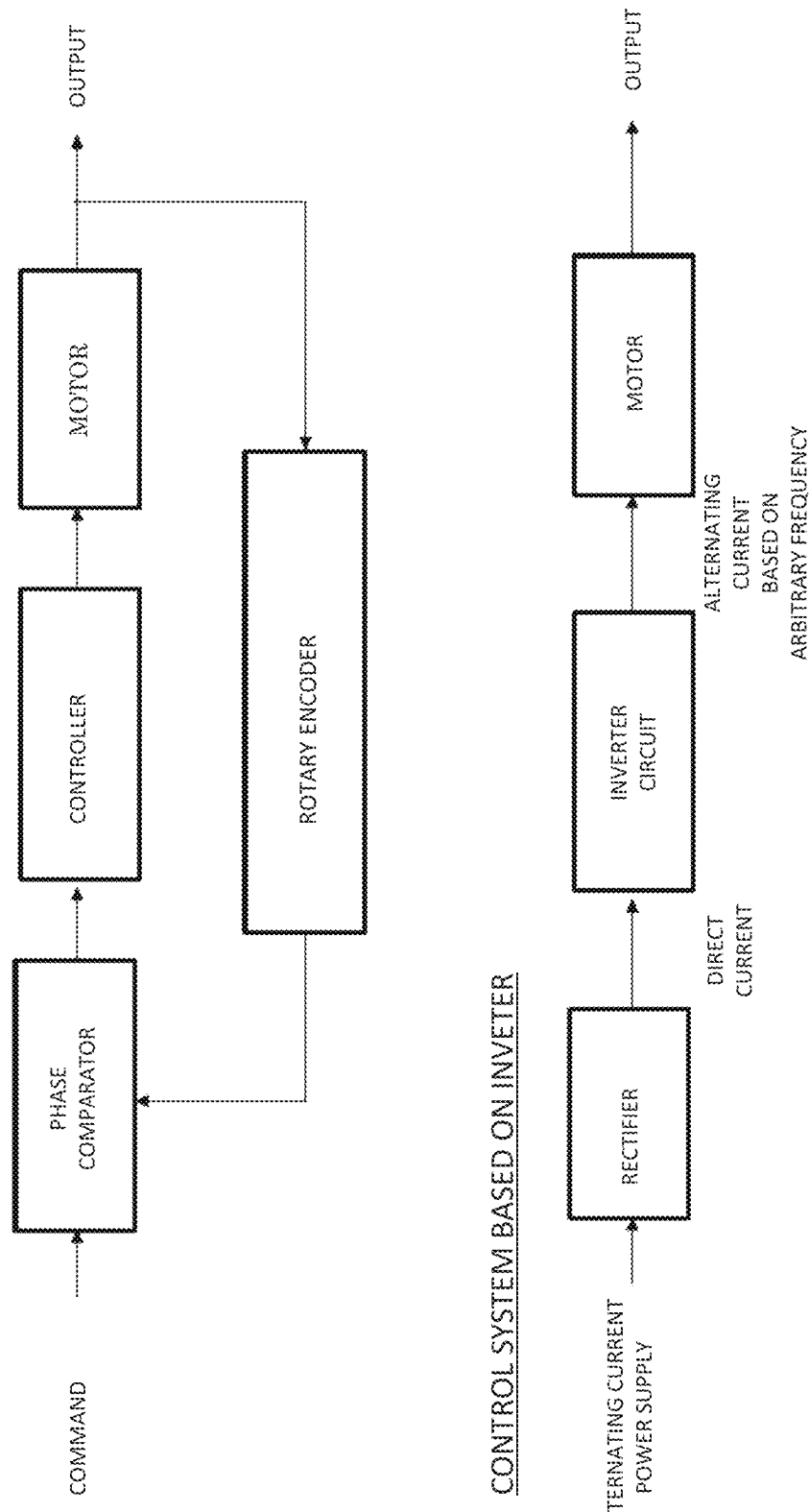
FIG. 30 is an exemplary conceptual diagram of a motor system of a fourth embodiment.

The system and the device apparatus of the present embodiment have the pressed powder material of the third embodiment. Therefore, any matters overlapping with the contents of the first to third embodiments will not be described repeatedly. Examples of the component parts of the pressed powder material included in these system and device apparatus include cores for rotating electric machines such as various motors and generators (for example, motors and generators), potential transformers, inductors, transformers, choke coils, and filters; and magnetic wedges for a rotating electric machine. FIG. 30 shows a conceptual diagram of a motor system as an example of the rotating electric machine system. A motor system is one system including a control system for controlling the rotational frequency or the electric power (output power) of a motor. Regarding the mode for controlling the rotational frequency of a motor, there are control methods that are based on control by a bridge servo circuit, proportional current control, voltage comparison control, frequency synchronization control, and phase locked loop (PLL) control. As an example, a control method based on PLL is illustrated in FIG. 30. A motor system that controls the rotational frequency of a motor based on PLL comprises a motor; a rotary encoder that converts the amount of mechanical displacement of the rotation of the motor into electrical signals and detects the rotational frequency of the motor; a phase comparator that compares the rotational frequency of the motor given by a certain command, with the rotational frequency of the motor detected by the rotary encoder, and outputs the difference of those rotational frequencies; and a controller that controls the motor so as to make the difference of the rotational frequencies small. On the other hand, examples of the method for controlling the electric power of the motor include control methods that are based on pulse width modulation (PWM) control, pulse amplitude modulation (PAM) control, vector control, pulse control, bipolar drive, pedestal control, and resistance control. Other examples of the control method include control methods based on microstep drive control, multiphase drive control, inverter control, and switching control. As an example, a control method using an inverter is illustrated in FIG. 30. A motor system that controls the electric power of the motor using an inverter comprises an alternating current power supply; a rectifier that converts the output of the alternating current power supply to a direct current; an inverter circuit that converts the direct current to an alternating current based on an arbitrary frequency; and a motor that is controlled by this alternating current.

Figure 31:
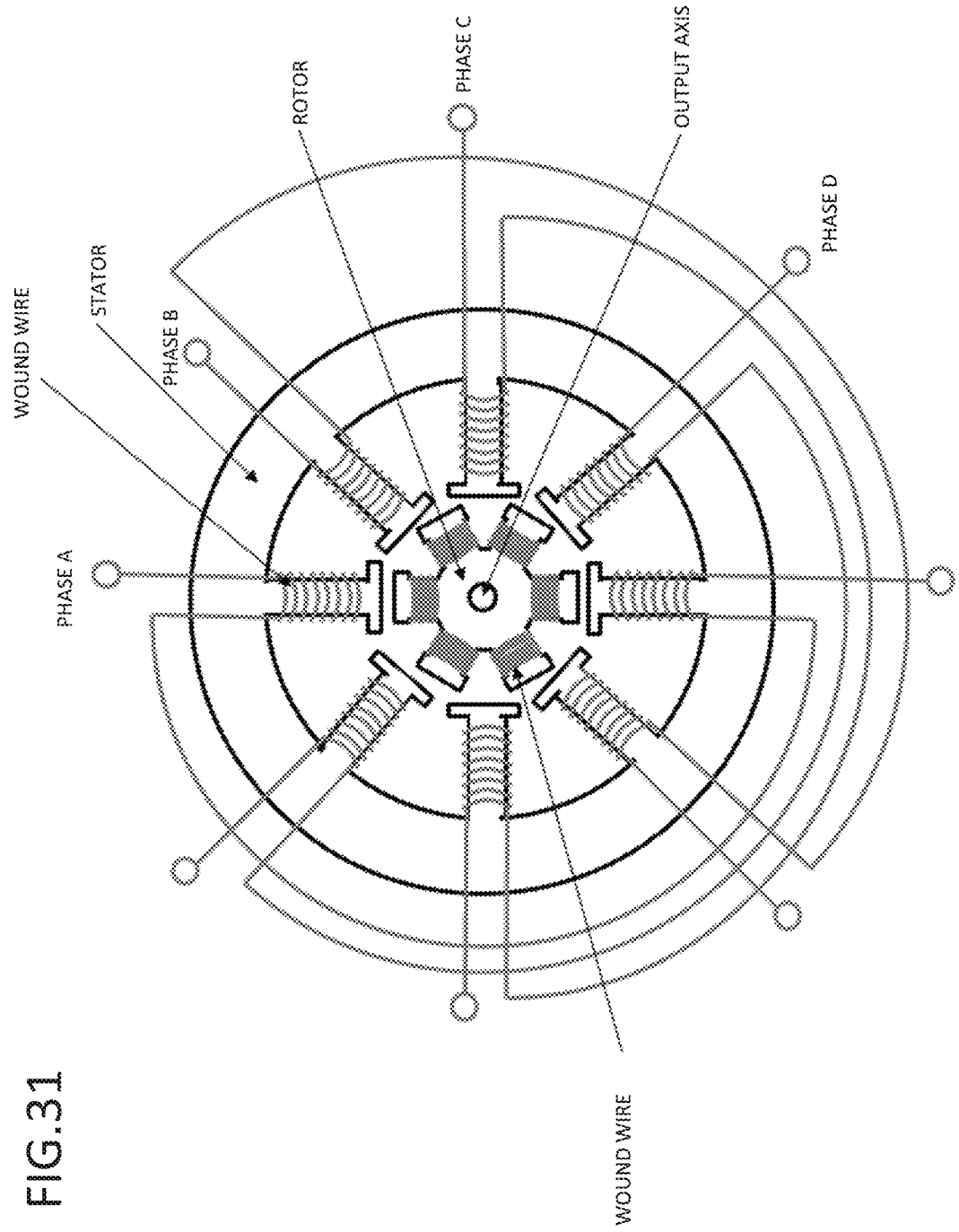
FIG. 31 is a schematic diagram of a motor of the fourth embodiment.

FIG. 31 shows a conceptual diagram of a motor 200 as an example of the rotating electric machine. In the motor, a first stator (magneto stator) and a second rotor (rotator) are disposed. The diagram illustrates an inner rotor type motor in which a rotor is disposed on the inner side of a stator; however, the motor may also be of an outer rotor type in which the rotor is disposed on the outer side of the stator.

Figure 32:
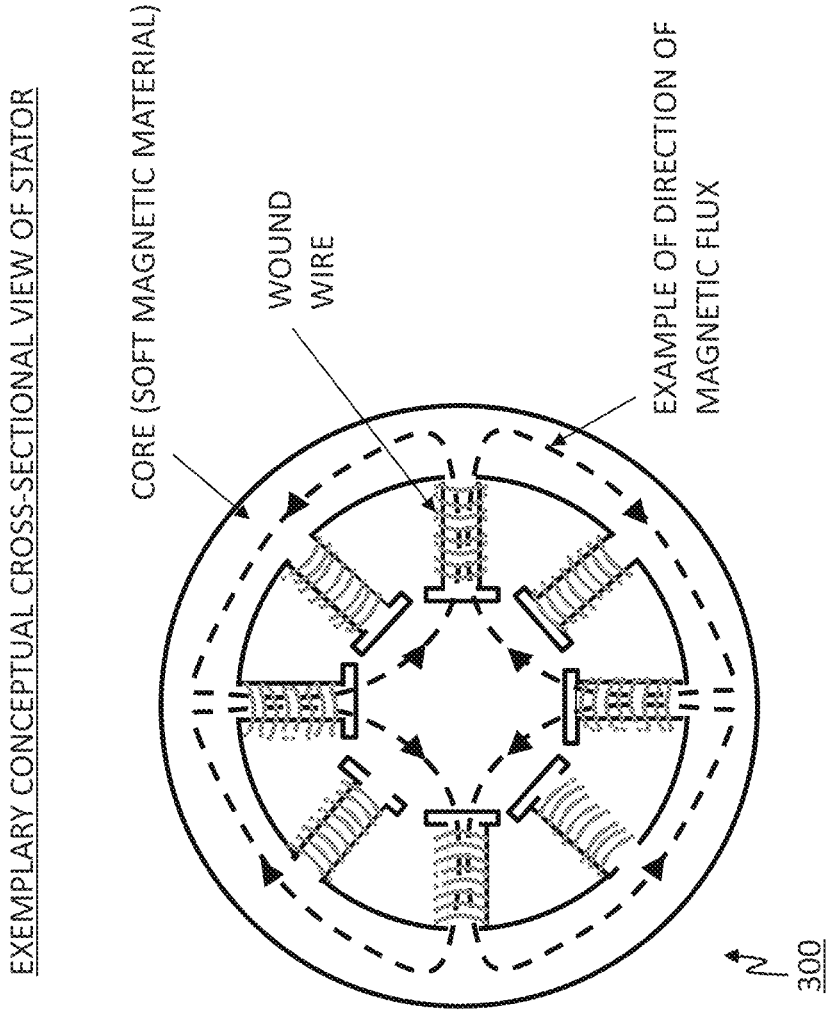
FIG. 32 is a schematic diagram of a motor core of the fourth embodiment.
Figure 33:
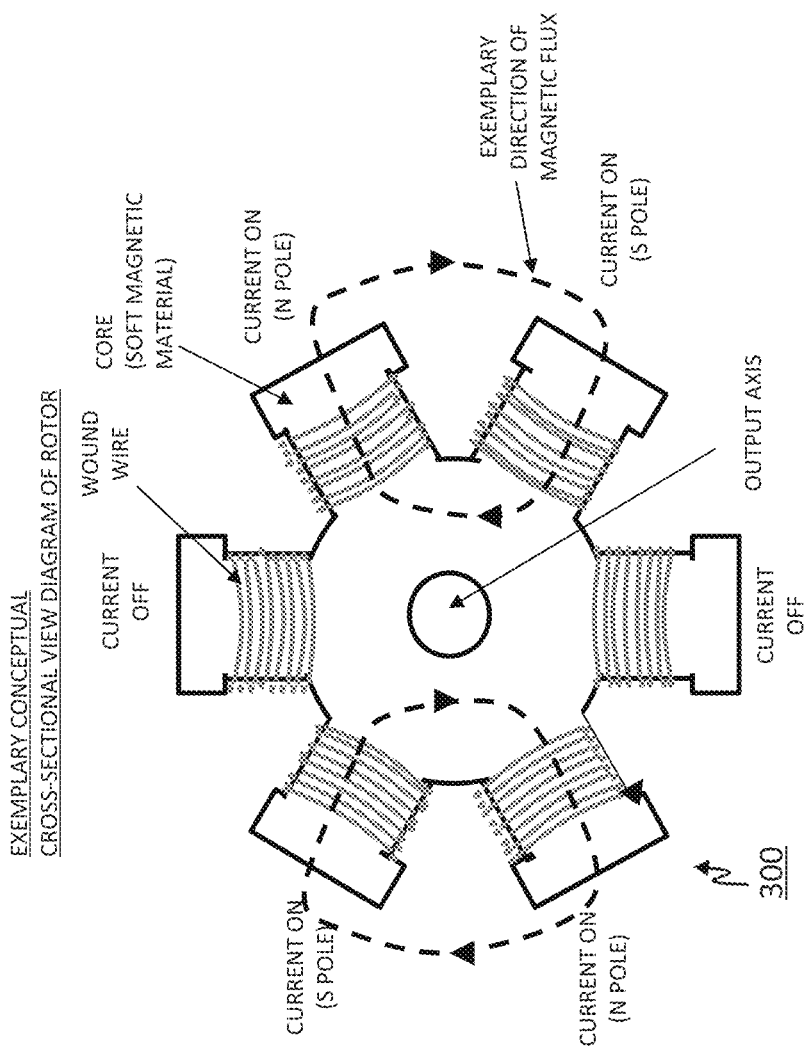
FIG. 33 is a schematic diagram of the motor core of the fourth embodiment.

FIG. 32 and FIG. 33 show conceptual diagrams of a motor core (core of a motor) 300. The cores of a stator and a rotor correspond to the motor core. This will be described below. FIG. 32 is an exemplary conceptual cross-sectional diagram of a first stator. The first stator has a core and coils. The coils are wound around some of the protrusions of the core, which are provided on the inner side of the core. In this core, the pressed powder material of the third embodiment can be disposed. FIG. 33 is an exemplary conceptual cross-sectional diagram of the first rotor. The first rotor has a core and coils. The coils are wound around some of the protrusions of the core, which are provided on the outer side of the core. In this core, the pressed powder material of the third embodiment can be disposed.

FIG. 32 and FIG. 33 are intended only for illustrative purposes to describe examples of motors, and the applications of the pressed powder material are not limited to these. The pressed powder material can be applied to all kinds of motors as cores for making it easy to lead the magnetic flux.

Figure 34:
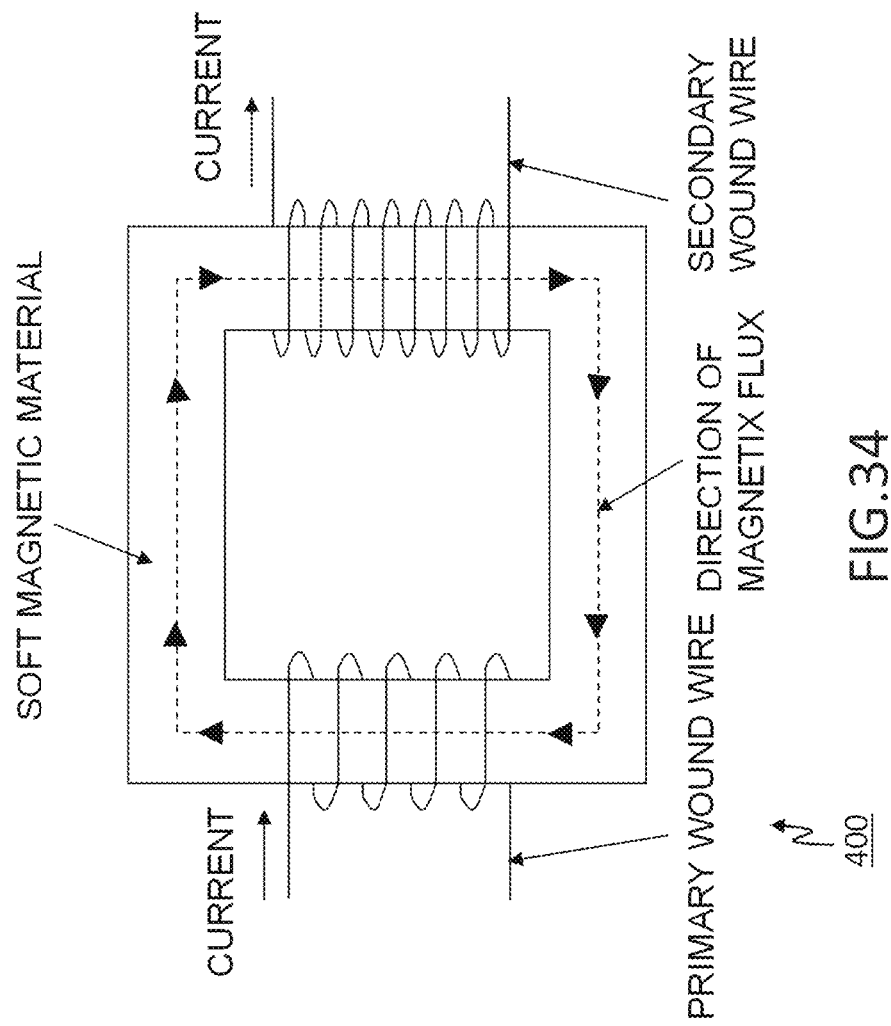
FIG. 34 is a schematic diagram of a potential transformer and a transformer according to the fourth embodiment.
Figure 35:
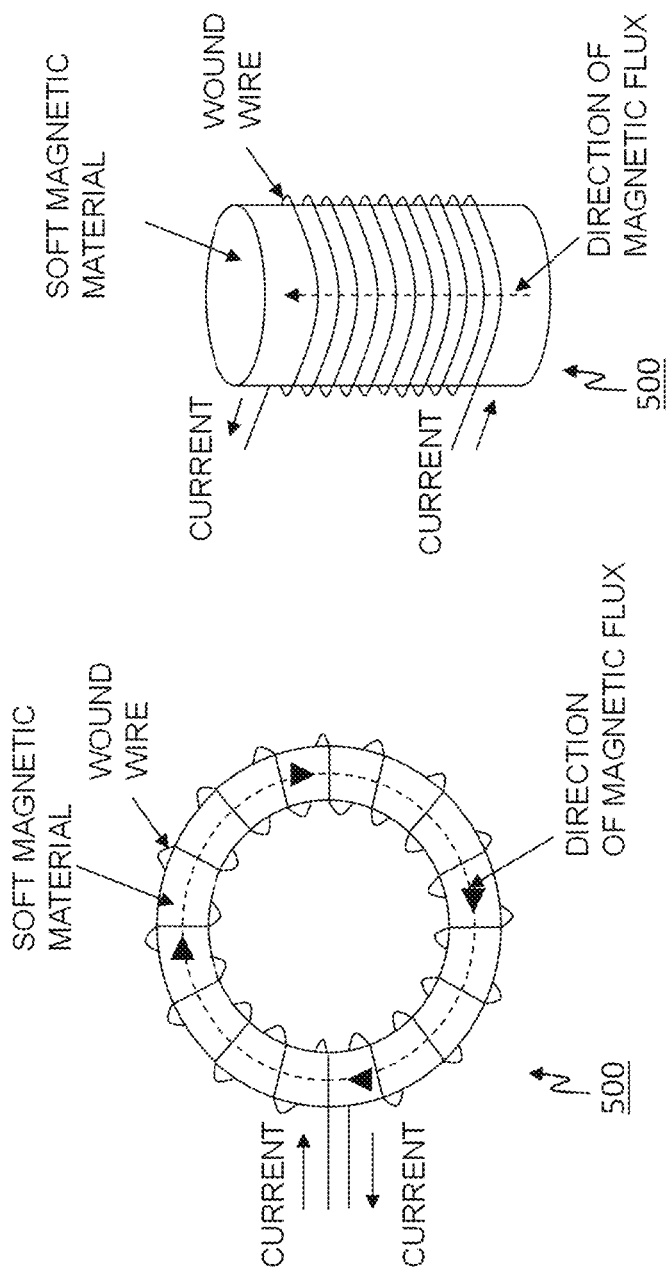
FIG. 35 is a schematic diagram of an inductor according to the fourth embodiment.
Figure 36:
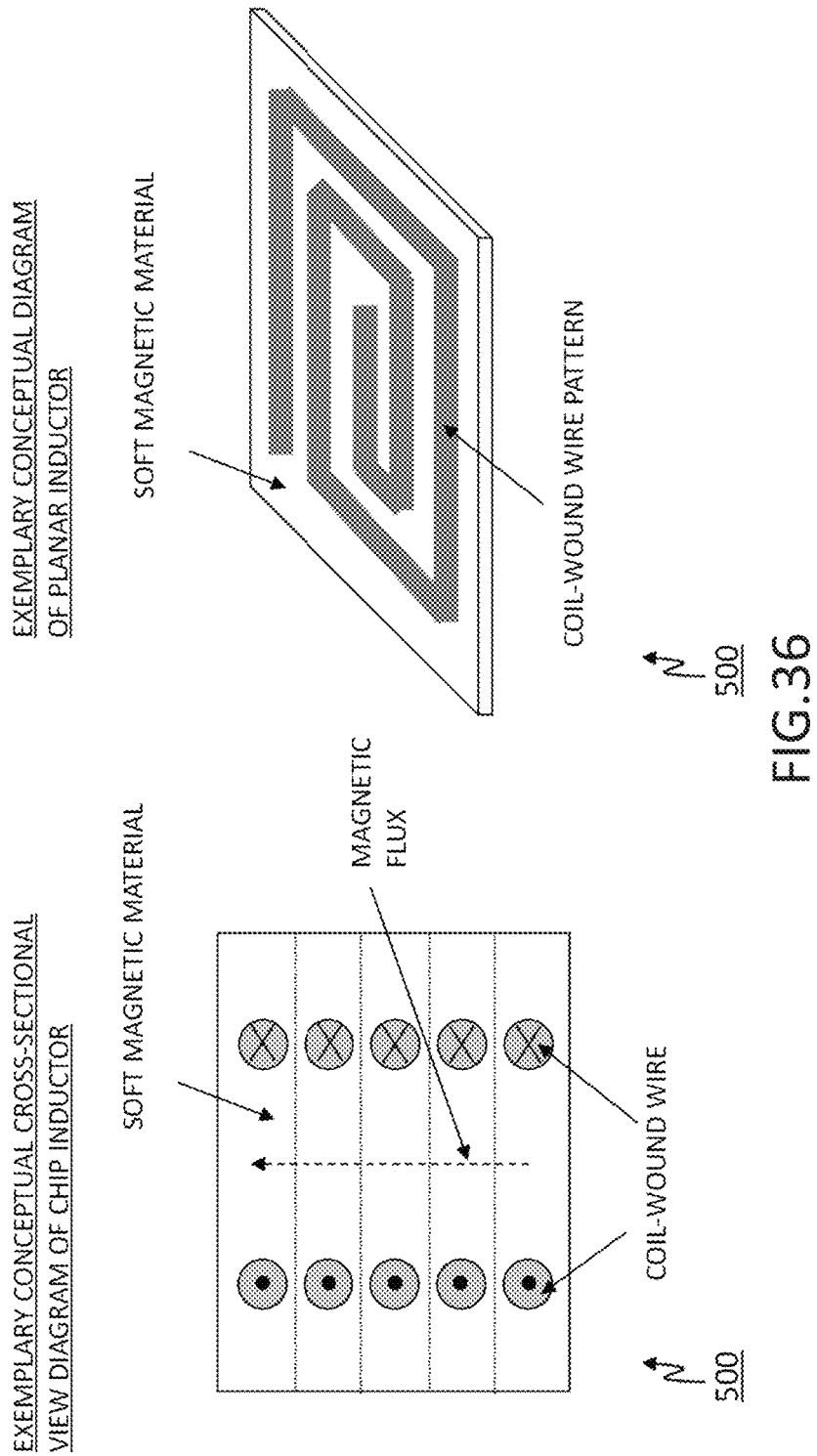
FIG. 36 is a schematic diagram of an inductor according to the fourth embodiment.

Furthermore, a conceptual diagram of a potential transformer/transformer 400 is shown in FIG. 34, and conceptual diagrams of an inductor 500 are illustrated in FIG. 35 and FIG. 36. These diagrams are also intended only for illustrative purposes. Also for the potential transformer/transformer and the inductor, similarly to the motor core, the pressed powder materials can be applied to all kinds of potential transformers/transformers and inductors in order to make it easy to lead the magnetic flux, or to utilize high magnetic permeability.

Figure 37:
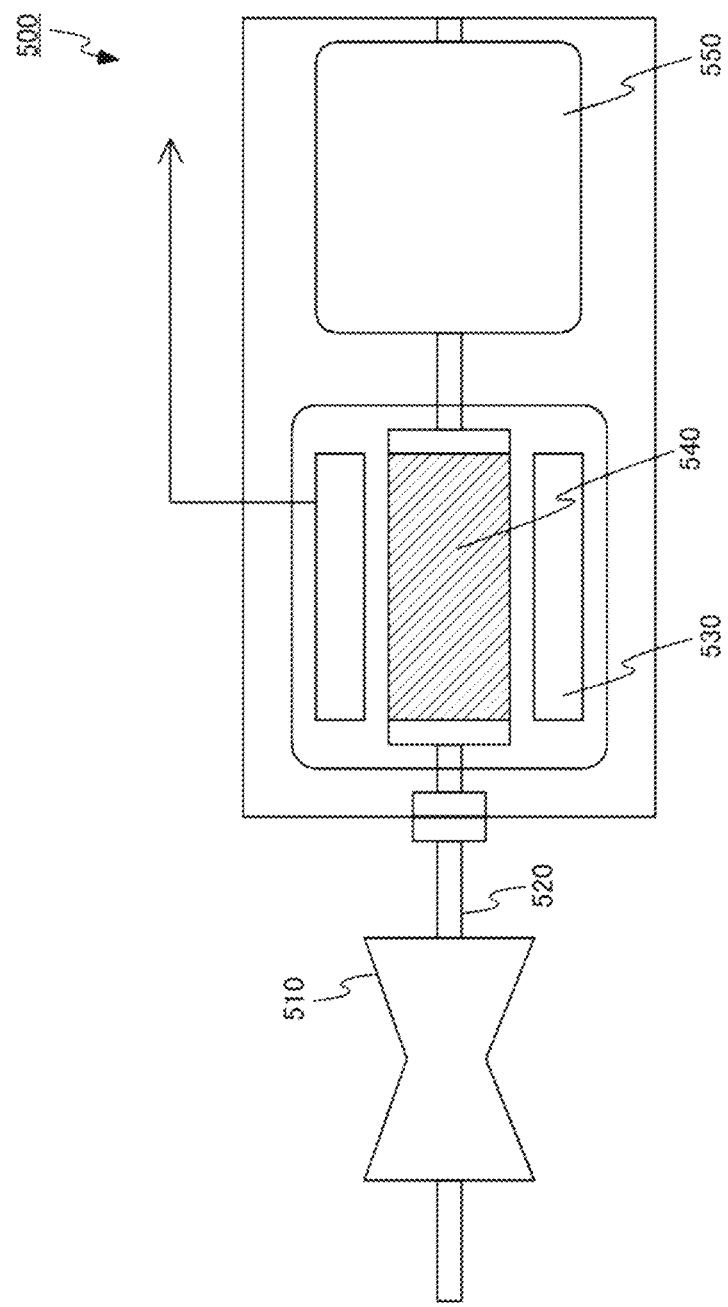
FIG. 37 is a schematic diagram of a generator according to the fourth embodiment.

FIG. 37 shows an exemplary conceptual diagram of a generator 500 as an example of the rotating electric machine. The generator 500 comprises either or both of a second stator (magneto stator) 530 that uses the pressed powder material of the first, second, or third embodiment as the core; and a second rotor (rotator) 540 that uses the pressed powder material of the first, second, or third embodiment as the core. In the diagram, the second rotor (rotator) 540 is disposed on the inner side of the second stator 530; however, the second rotor may also be disposed on the outer side of the second stator. The second rotor 540 is connected to a turbine 510 provided at an end of the generator 500 through a shaft 520. The turbine 510 is rotated by, for example, a fluid supplied from the outside, which is not shown in the diagram. Meanwhile, instead of the turbine that is rotated by a fluid, the shaft can also be rotated by transferring dynamic rotation of the regenerative energy of an automobile or the like. Various known configurations can be employed for the second stator 530 and the second rotor 540.

The shaft is in contact with a commutator not shown in the diagram that is disposed on the opposite side of the turbine with respect to the second rotor. The electromotive force generated by rotation of the second rotor is transmitted, as the electric power of the generator, after undergoing a voltage increase to the system voltage by means of an isolated phase bus that is not shown in the diagram, and a main transformer that is not shown in the diagram. Meanwhile, in the second rotor, an electrostatic charge is generated due to an axial current resulting from the static electricity from the turbine or power generation. Therefore, the generator comprises a brush intended for discharging the electrostatic charge of the second rotor.

The rotating electric machine of the present embodiment can be preferably used in railway vehicles. For example, the rotating electric machine can be preferably used in the motor 200 that drives a railway vehicle, or the generator 500 that generates electricity for driving a railway vehicle.

Figure 38:
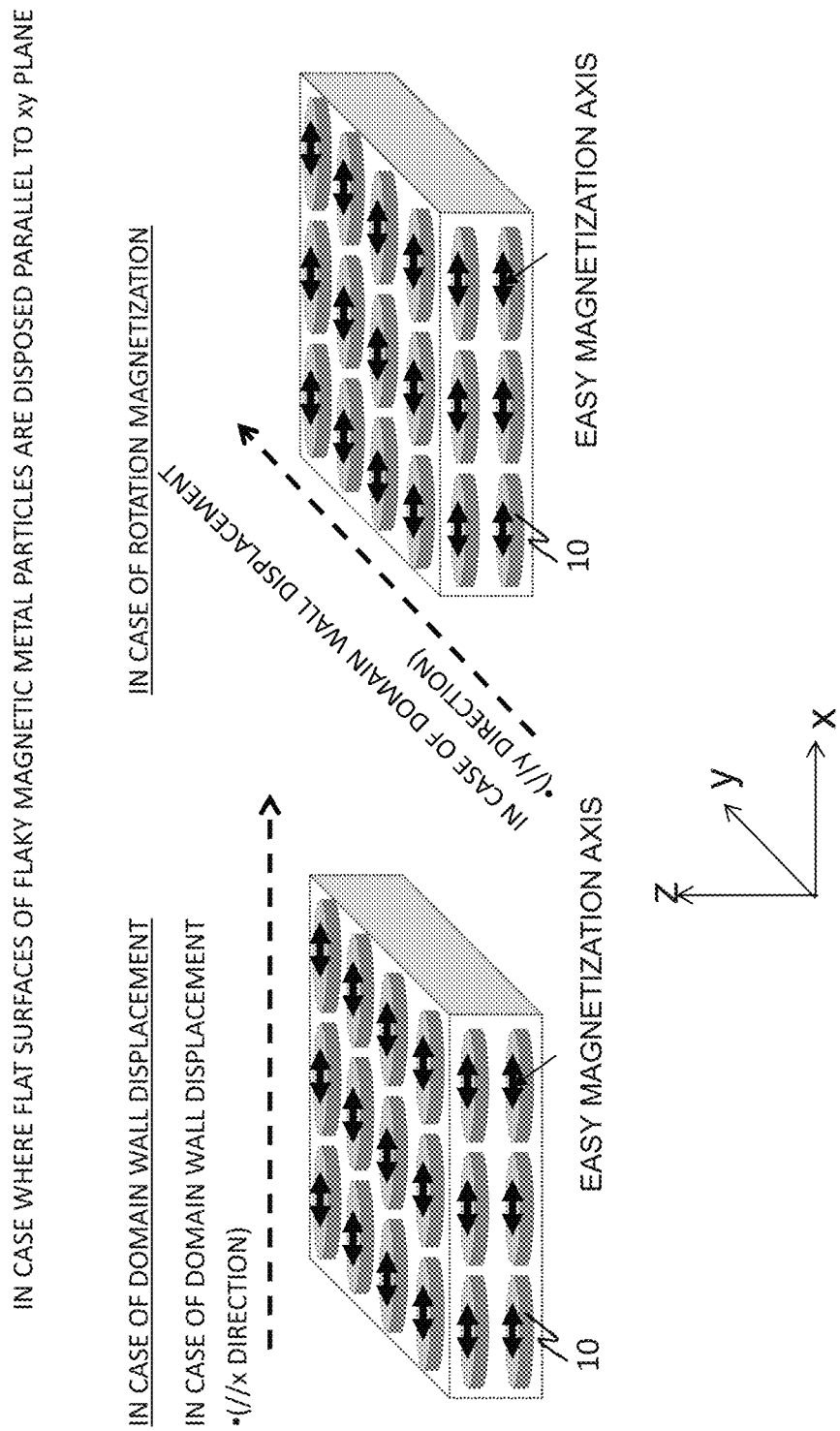
FIG. 38 is a conceptual diagram illustrating the relation between the direction of the magnetic flux and the direction of arrangement of the pressed powder material.

Furthermore, FIG. 38 illustrates a preferred example of the relation between the direction of the magnetic flux and the direction of disposition of a pressed powder material. First, for both of the domain wall displacement type and the rotation magnetization type, it is preferable that the flat surfaces of the flaky magnetic metal particles included in a pressed powder material are disposed in a direction in which the flat surfaces are parallel to one another as far as possible are aligned in a layered form, with respect to the direction of the magnetic flux. This is because the eddy current loss can be reduced by making the cross-sectional area of the flaky magnetic metal particles that penetrate through the magnetic flux, as small as possible. Furthermore, in regard to the domain wall displacement type, it is preferable that the easy magnetization axis (direction of the arrow) in the flat surface of a flaky magnetic metal particle is disposed parallel to the direction of the magnetic flux. As a result, the system can be used in a direction in which coercivity is further decreased, and therefore, the hysteresis loss can be reduced, which is preferable. Furthermore, the magnetic permeability is also made high, and it is preferable. In contrast, in regard to the rotation magnetization type, it is preferable that the easy magnetization axis (direction of the arrow) in the flat surface of a flaky magnetic metal particle is disposed perpendicularly to the direction of the magnetic flux. As a result, the system can be used in a direction in which coercivity is further decreased, and therefore, the hysteresis loss can be reduced, which is preferable. That is, it is preferable to understand the magnetization characteristics of a pressed powder material, determine whether the pressed powder material is of the domain wall displacement type or the rotation magnetization type (method for determination is as described above), and then dispose the pressed powder material as shown in FIG. 38. In a case in which the direction of the magnetic flux is complicated, it may be difficult to dispose the pressed powder material perfectly as shown in FIG. 38; however, it is preferable to dispose the pressed powder material as shown in FIG. 38 as far as possible. It is desirable that the method for disposition described above is applied to all of the systems and device apparatuses of the present embodiment (for example, cores for rotating electric machines such as various motors and generators (for example, motors and generators), potential transformers, inductors, transformers, choke coils, and filters; and magnetic wedges for a rotating electric machine).

In order for a pressed powder material to be applied to these systems and device apparatuses, the pressed powder material is allowed to be subjected to various kinds of processing. For example, in the case of a sintered body, the pressed powder material is subjected to mechanical processing such as polishing or cutting; and in the case of a powder, the pressed powder material is mixed with a resin such as an epoxy resin or polybutadiene. If necessary, the pressed powder material is further subjected to a surface treatment. Also, if necessary, a coil treatment is carried out.

When the system and device apparatus of the present embodiment are used, a motor system, a motor, a potential transformer, a transformer, an inductor and a generator, all having excellent characteristics (high efficiency and low losses), can be realized.

EXAMPLES

Hereinafter, the invention will be described in more detail by comparing Examples 1 to 22 and Comparative Examples 1 to 5. For the flaky magnetic metal particles obtainable by Examples and Comparative Examples described below, a summary of the thickness of the flaky magnetic metal particles, the ratio of the average length in the flat surface to the thickness, the proportion (%) of the coercivity difference within the flat surface of the flaky magnetic metal particles, and the proportion (%) of the coercivity difference within a plane of the pressed powder material is presented in Table 1. In regard to the thickness, the ratio of the average length in the flat surface with respect to thickness, and the ratio of the maximum length to the minimum length in the flat surface, the values are calculated as average values of a large number of particles based on a TEM observation or a SEM observation.

Example 1

First, a ribbon of Fe—Co—B—Si (Fe:Co:B:Si=52:23:19:6 (at %), Fe:Co=70:30 (at %), the total amount of the additive elements B+Si is 25 at % with respect to the total amount of Fe+Co+B+Si) is produced using a single roll quenching apparatus. Next, the ribbon thus obtained is subjected to a heat treatment at 300° C. in a H2 atmosphere. Next, this ribbon is pulverized using a mixer apparatus and is subjected to a heat treatment in a magnetic field at 400° C. in a $H_2$ atmosphere, and thus flaky magnetic metal particles are obtained. The thickness t of the flaky magnetic metal particles thus obtained is 10 μm, the ratio A of the average length in the flat surface with respect to the thickness is 20, and the flat surface has a rectangular contour shape in which the ratio a/b of the maximum length to the minimum length is 1.6. Furthermore, the crystal grain size of the magnetic metal phase is about 2 nm. The flaky magnetic metal particles thus obtained are mixed with an inorganic oxide intercalated phase ($B_2O_3$—$Bi_2O_3$—ZnO), the mixture is subjected to molding in a magnetic field (the flaky particles are oriented), and the mixture is subjected to a heat treatment in a magnetic field. Thus, a pressed powder material is obtained. In the heat treatment in a magnetic field, a magnetic field is applied in the direction of the easy magnetization axis, and a heat treatment is carried out.

Example 2

In regard to Example 1, the ribbon pieces are collected and subjected to pulverization and rolling at about 1,000 rpm in an Ar atmosphere by means of a bead mill using $ZrO_2$ balls and a $ZrO_2$ vessel. Thus, the ribbon pieces are converted to a flaky powder. Operations of pulverization, rolling, and heat treatment are repeated, and thereby a treatment is carried out so as to obtain a predetermined size and a predetermined structure. The procedure except for those is almost the same as the procedure of Example 1. The thickness of the flaky magnetic metal particles thus obtained is 10 nm, the ratio of the average length in the flat surface with respect to the thickness is 200, and the flat surface has a rectangular contour shape in which the ratio a/b of the maximum length to the minimum length is 1.6. Furthermore, the crystal gain size of the magnetic metal phase is about 2 nm.

Example 3

A pressed powder material is obtained in almost the same manner as in Example 2, except that the thickness of the flaky magnetic metal particles is 1 µm, and the ratio of the average length in the flat surface with respect to the thickness is 100.

Example 4

A pressed powder material is obtained in almost the same manner as in Example 2, except that the thickness of the flaky magnetic metal particles is 100 µm, and the ratio of the average length in the flat surface with respect to the thickness is 5.

Example 5

A pressed powder material is obtained in almost the same manner as in Example 2, except that the thickness of the flaky magnetic metal particles is 10 nm, and the ratio of the average length in the flat surface with respect to the thickness is 1,000.

Example 6

A pressed powder material is obtained in almost the same manner as in Example 2, except that the thickness of the flaky magnetic metal particles is 10 nm, and the ratio of the average length in the flat surface with respect to the thickness is 10,000.

Example 7

A pressed powder material is obtained in almost the same manner as in Example 1, except that the proportion of the coercivity difference within the flat surface of the flaky magnetic metal particles is adjusted to 12%, and the proportion of the coercivity difference within a plane of the pressed powder material is adjusted to 10%, by controlling the conditions for the heat treatment in a magnetic field.

Example 8

A pressed powder material is obtained in almost the same manner as in Example 1, except that the proportion of the coercivity difference within the flat surface of the flaky magnetic metal particles is adjusted to 52%, and the proportion of the coercivity difference within a plane of the pressed powder material is adjusted to 50%, by controlling the conditions for the heat treatment in a magnetic field.

Example 9

At the time of ribbon synthesis, the roll surface is wiped with a polishing paper in the direction of roll rotation, and thereby the surface roughness is adjusted. The flat surface of the flaky magnetic metal particles obtainable by this process has either or both of a plurality of concavities and a plurality of convexities, which are arranged in a first direction, each of the concavities and convexities having a width of 0.1 µm or more, a length of 1 µm or more, and an aspect ratio of 2 or higher. Except for this, a pressed powder material is obtained in almost the same manner as in Example 1.

Example 10

A pressed powder material is obtained in almost the same manner as in Example 1, except that at the time of ribbon synthesis, a lattice strain of 0.5% is applied to the flaky magnetic metal particles thus obtainable, by controlling the quenching conditions.

Example 11

A pressed powder material is obtained in almost the same manner as in Example 1, except that at the time of ribbon synthesis, the flaky magnetic metal particles thus obtainable are subjected to (110) orientation by controlling the quenching conditions.

Example 12

A pressed powder material is obtained in almost the same manner as in Example 1, except that at the time of ribbon synthesis, five or more on the average of small magnetic metal particles having an average particle size of between 10 nm and 1 µm inclusive are attached on the flat surfaces of the flaky magnetic metal particles thus obtainable, by controlling the quenching conditions and the pulverization conditions.

Example 13

A pressed powder material is obtained in almost the same manner as in Example 1, except that the composition is changed to Fe—Co—B—Zr (Fe:Co:B:Zr=63:27:4:6 (at %), Fe:Co=70:30 (at %), the total amount of the additive elements B+Zr is 10 at % with respect to the total amount of Fe+Co+B+Zr).

Example 14

A pressed powder material is obtained in almost the same manner as in Example 1, except that the composition is changed to Fe—Co—B—Y (Fe:Co:B:Y=63:27:4:6 (at %), Fe:Co=70:30 (at %), the total amount of the additive elements B+Y is 10 at % with respect to the total amount of Fe+Co+B+Y).

Example 15

A pressed powder material is obtained in almost the same manner as in Example 1, except that the composition is changed to Fe—Co—Si (Fe:Co:Si=66.5:28.5:5.0 (at %), Fe:Co=70:30 (at %), the amount of the additive element Si is 5.0 at % with respect to the total amount of Fe+Co+Si).

Example 16

A pressed powder material is obtained in almost the same manner as in Example 1, except that the ratio a/b of the maximum length to the minimum length within the flat surface is 2, and the maximum length directions are unidirectionally aligned.

Example 17

A pressed powder material is obtained in almost the same manner as in Example 17, except that the ratio a/b of the maximum length to the minimum length within the flat surface is 5, and the maximum length directions are unidirectionally aligned.

Example 18

A pressed powder material is obtained in almost the same manner as in Example 16, except that the flaky magnetic metal particles have either or both of a plurality of concavities and a plurality of convexities on the flat surface, each of the concavities and convexities having a width of 0.1 μm or more, a length of 1 μm or more, and an aspect ratio of 2 or higher, and the proportion of arrangement of the maximum length directions of the concavities or convexities is 30% or higher.

Example 19

A pressed powder material is obtained in almost the same manner as in Example 16, except that the maximum length directions are not aligned.

Example 20

A pressed powder material is obtained in almost the same manner as in Example 16, except that the contour shape of the flat surface is rounded.

Example 21

A pressed powder material is obtained in almost the same manner as in Example 1, except that the surface of the flaky magnetic metal particles is coated with a non-magnetic $SiO_2$ layer having a thickness of about 10 nm by a sol-gel method.

Comparative Example 1

Commercially available Fe—Si—Cr—Ni flaky particles are used. The thickness of the flaky magnetic metal particles is about 400 nm, and the aspect ratio is about 100. A pressed powder material is obtained by mixing the flaky magnetic metal particles with an intercalated phase, and molding the mixture (molding in a magnetic field and a heat treatment in a magnetic field are not carried out).

Comparative Example 2

A pressed powder material is obtained in almost the same manner as in Example 1, except that the thickness of the flaky magnetic metal particles is 8 nm, and the ratio of the average length within the flat surface with respect to the thickness is 1,000.

Comparative Example 3

A pressed powder material is obtained in almost the same manner as in Example 1, except that the thickness of the flaky magnetic metal particles is 120 μm, and the ratio of the average length within the flat surface with respect to the thickness is 5.

Comparative Example 4

A pressed powder material is obtained in almost the same manner as in Example 1, except that the thickness of the flaky magnetic metal particles is 100 μm, and the ratio of the average length within the flat surface with respect to the thickness is 4.

Comparative Example 5

A pressed powder material is obtained in almost the same manner as in Example 1, except that the thickness of the flaky magnetic metal particles is 10 nm, and the ratio of the average length within the flat surface with respect to the thickness is 12,000.

Next, for the materials for evaluation of Examples 1 to 21 and Comparative Examples 1 to 5, the saturation magnetization, the real part of magnetic permeability (μ'), the magnetic permeability loss (tan δ), the change over time in the real part of magnetic permeability (μ') after 100 hours, the core loss, and the strength ratio are evaluated by the following methods. The evaluation results are presented in Table 2.

(1) Saturation magnetization: The saturation magnetization at room temperature is measured using a VSM.

(2) Real part of magnetic permeability, μ', and magnetic permeability loss (tan δ=μ"/μ'×100(%)): The magnetic permeability of a ring-shaped sample is measured using an impedance analyzer. The real part of magnetic permeability, μ', and the imaginary part of magnetic permeability, μ", at a frequency of 100 Hz are measured. Furthermore, the magnetic permeability loss or coefficient of loss, tan δ, is calculated by the formula: μ"/μ'×100(%).

(3) Change over time in real part of magnetic permeability, μ', after 100 hours: A material for evaluation is heated at a temperature of 60° C. in an air atmosphere for 100 hours, and then the real part of magnetic permeability, μ', is measured again. Thus, the change overtime (real part of magnetic permeability, μ', after standing for 100 hours/real part of magnetic permeability, μ', before standing) is determined.

(4) Core loss: The core loss under the operating conditions of 100 Hz and 1 T is measured using a B—H analyzer. In a case in which the core loss cannot be directly measured under the conditions of 100 Hz and 1 T, the dependency on frequency and the dependency on the magnetic flux density of the core loss are measured, and the core loss at 100 Hz and 1 T is estimated from the data (then, this estimated value is employed).

(5) Strength ratio: The flexural strength of a material for evaluation is measured, and this is represented as the ratio of the measured flexural strength with respect to the flexural strength of the sample of Comparative Example 1 (=flexural strength of material for evaluation/flexural strength of sample of Comparative Example 1).

TABLE 1

| | t | A | a/b | Contour shape | Proportion (%) of coercivity difference within flat surface of flaky magnetic metal particles | Proportion (%) of coercivity difference within plane of pressed powder material | Remarks |
| --- | --- | --- | --- | --- | --- | --- | --- |
| Example 1 | 10 μm | 20 | 1.6 | Rectangle | 105 | 100 | — |
| Example 2 | 10 nm | 200 | 1.6 | Rectangle | 80 | 70 | — |
| Example 3 | 1 μm | 100 | 1.6 | Rectangle | 90 | 80 | — |
| Example 4 | 100 μm | 5 | 1.6 | Rectangle | 100 | 90 | — |

TABLE 1-continued

| | t | | A | a/b | Contour shape | Proportion (%) of coercivity difference within flat surface of flaky magnetic metal particles | Proportion (%) of coercivity difference within plane of pressed powder material | Remarks |
|---|---|---|---|---|---|---|---|---|
| Example 5 | 10 | nm | 1000 | 1.6 | Rectangle | 80 | 70 | — |
| Example 6 | 10 | nm | 10000 | 1.6 | Rectangle | 80 | 70 | — |
| Example 7 | 10 | μm | 20 | 1.6 | Rectangle | 12 | 10 | — |
| Example 8 | 10 | μm | 20 | 1.6 | Rectangle | 52 | 50 | — |
| Example 9 | 10 | μm | 20 | 1.6 | Rectangle | 110 | 105 | A plurality of concavities and convexities unidirectionally arranged |
| Example 10 | 10 | μm | 20 | 1.6 | Rectangle | 115 | 107 | Lattice strain |
| Example 11 | 10 | μm | 20 | 1.6 | Rectangle | 110 | 105 | (110) orientation |
| Example 12 | 10 | μm | 20 | 1.6 | Rectangle | 102 | 100 | Small magnetic metal particles attached |
| Example 13 | 10 | μm | 20 | 1.6 | Rectangle | 50 | 48 | Fe—Co—B—Zr |
| Example 14 | 10 | μm | 20 | 1.6 | Rectangle | 55 | 52 | Fe—Co—B—Y |
| Example 15 | 10 | μm | 20 | 1.6 | Rectangle | 17 | 15 | Fe—Co—Si |
| Example 16 | 10 | μm | 20 | 2 | Rectangle | 140 | 120 | Directions of maximum lengths unidirectionally arranged |
| Example 17 | 10 | μm | 20 | 5 | Rectangle | 340 | 200 | Directions of maximum lengths unidirectionally arranged |
| Example 18 | 10 | μm | 20 | 2 | Rectangle | 150 | 130 | Directions of maximum lengths and plurality of concavities and convexities unidirectionally arranged |
| Example 19 | 10 | μm | 20 | 2 | Rectangle | 140 | 32 | Directions of maximum lengths disorderly arranged |
| Example 20 | 10 | μm | 20 | 2 | Round | 135 | 115 | Directions of maximum lengths unidirectionally arranged |
| Example 21 | 10 | μm | 20 | 1.6 | Rectangle | 105 | 102 | Coating layer exists |
| Comparative Example 1 | 400 | nm | 100 | 1.6 | Rectangle | ≈0 | ≈0 | — |
| Comparative Example 2 | 8 | nm | 1000 | 1.6 | Rectangle | 50 | 40 | — |
| Comparative Example 3 | 120 | μm | 5 | 1.6 | Rectangle | 80 | 70 | — |
| Comparative Example 4 | 100 | μm | 4 | 1.6 | Rectangle | 70 | 60 | — |
| Comparative Example 5 | 10 | nm | 12000 | 1.6 | Rectangle | 50 | 40 | — |

TABLE 2

| | Saturation magnetization (T) | μ' (100 Hz) | tanδ (%) (100 Hz) | Core loss (kW/m³) 100 Hz, 1 T | Proportion (%) of change over time in μ' | Strength ratio |
|---|---|---|---|---|---|---|
| Example 1 | 1.0 | 90 | ≈0 | 15 | 92 | 1.2 |
| Example 2 | 1.0 | 85 | ≈0 | 18 | 92 | 1.2 |
| Example 3 | 1.0 | 88 | ≈0 | 16 | 93 | 1.2 |
| Example 4 | 1.0 | 78 | ≈0 | 20 | 93 | 1.2 |
| Example 5 | 1.0 | 82 | ≈0 | 18 | 92 | 1.2 |
| Example 6 | 1.0 | 80 | ≈0 | 15 | 92 | 1.2 |
| Example 7 | 1.0 | 50 | ≈0 | 40 | 93 | 1.2 |
| Example 8 | 1.0 | 60 | ≈0 | 22 | 93 | 1.3 |
| Example 9 | 1.0 | 93 | ≈0 | 13 | 94 | 1.4 |
| Example 10 | 1.0 | 93 | ≈0 | 13 | 94 | 1.4 |
| Example 11 | 1.0 | 97 | ≈0 | 13 | 94 | 1.4 |
| Example 12 | 1.0 | 93 | ≈0 | 13 | 94 | 1.4 |
| Example 13 | 1.3 | 30 | ≈0 | 60 | 92 | 1.3 |
| Example 14 | 1.3 | 33 | ≈0 | 50 | 92 | 1.3 |
| Example 15 | 1.8 | 25 | ≈0 | 180 | 92 | 1.3 |
| Example 16 | 1.0 | 95 | ≈0 | 13 | 93 | 1.3 |
| Example 17 | 1.0 | 102 | ≈0 | 12 | 93 | 1.3 |

TABLE 2-continued

|  | Saturation magnetization (T) | µ' (100 Hz) | tanδ (%) (100 Hz) | Core loss (kW/m³) 100 Hz, 1 T | Proportion (%) of change over time in µ' | Strength ratio |
|---|---|---|---|---|---|---|
| Example 18 | 1.0 | 98 | ≈0 | 12 | 95 | 1.4 |
| Example 19 | 1.0 | 68 | ≈0 | 14 | 93 | 1.3 |
| Example 20 | 1.0 | 97 | ≈0 | 12 | 94 | 1.4 |
| Example 21 | 1.0 | 92 | ≈0 | 13 | 94 | 1.4 |
| Comparative Example 1 | 1.0 | 20 | ≈0 | 500 | 88 | — |
| Comparative Example 2 | 1.0 | 87 | ≈0 | 20 | 90 | 1.1 |
| Comparative Example 3 | 1.0 | 88 | ≈0 | 21 | 90 | 1.1 |
| Comparative Example 4 | 1.0 | 86 | ≈0 | 20 | 90 | 1.1 |
| Comparative Example 5 | 1.0 | 88 | ≈0 | 21 | 90 | 1.1 |

As is obvious from Table 1, the flaky magnetic metal particles according to Examples 1 to 21 have a thickness of between 10 nm and 100 µm inclusive and a ratio of the average length within the flat surface with respect to the thickness of between 5 and 10,000 inclusive. Furthermore, the flaky magnetic metal particles have a coercivity difference depending on the direction within the flat surface of the flaky magnetic metal particle, and also have a coercivity difference depending on the direction within a plane of the pressed powder material. Examples 7 and 8 have a low proportion of coercivity difference compared to Example 1. Example 9 has both a plurality of concavities and a plurality of convexities, the concavities and convexities being arranged in a first direction on the flat surface, and each of the concavities and convexities having a width of 0.1 µm or more, a length of 1 µm or more, and an aspect ratio of 2 or higher. In Example 10, a lattice strain of 0.5% is applied. In Example 11, the flaky magnetic metal particles are subjected to (110) orientation. In Example 12, five or more on the average of small magnetic metal particles having an average particle size of between 10 nm and 1 µm inclusive are attached on the flat surfaces of the flaky magnetic metal particles. Example 13 has a Fe—Co—B—Zr composition, Example 14 has a Fe—Co—B—Y composition, and Example 15 has a Fe—Co—Si composition. In Examples 16 to 18, the ratio of the maximum length to the minimum length within the flat surface is larger than 5, and the maximum length directions are unidirectionally aligned compared to Example 1. Example 18 has both a plurality of concavities and a plurality of concavities arranged in the maximum length direction on the flat surface. As a result, it is understood that a large coercivity difference within a plane of the pressed powder material can be applied. Meanwhile, in Example 19, the flaky magnetic metal particles have a large direction-induced coercivity difference within the flat surface; however, it is understood that since the maximum length directions are not aligned, the coercivity difference within a plane of the pressed powder material is decreased. Furthermore, in Example 20, it is understood that since the flaky magnetic metal particles have a rounded contour shape, the coercivity difference within a plane of the pressed powder material is decreased. Example 21 is a product obtained by forming a coating layer on the surface of the flaky magnetic metal particles of Example 1.

As is obvious from Table 2, it is understood that the pressed powder materials that use the flaky magnetic metal particles of Examples 1 to 21 are excellent in terms of the magnetic permeability, the core loss, the proportion of change over time in the magnetic permeability, and the strength ratio, compared to the pressed powder material of Comparative Example 1. That is, it is understood that the pressed powder materials have excellent magnetic characteristics, thermal stability, and mechanical characteristics. Furthermore, it is understood that Examples 9 to 12 and 18 are slightly superior to Example 1 in terms of the magnetic permeability, the core loss, the proportion of change over time in the magnetic permeability, and the strength ratio. That is, it is understood that those Examples have slightly superior magnetic characteristics, thermal stability, and mechanical characteristics. It is understood that Examples 7 and 8 are slightly inferior to Example 1 particularly in terms of the magnetic permeability and the core loss, due to the lower proportions of coercivity difference. In Examples 13 to 15, the saturation magnetization in particular can be changed by changing the composition. Depending on the use applications (for example, magnetic wedges of motors), even a material having relatively low saturation magnetization can be sufficiently used, and there are occasions in which such a material specializing in low losses and high magnetic permeability is rather preferable. Therefore, in that case, materials having a saturation magnetization in the 1-T class, such as Examples 1 to 12 and 16 to 21, can be used. Meanwhile, in a case in which high saturation magnetization is required as in the case of a motor core, materials having high saturation magnetization, such as Examples 13 to 15, and particularly Example 15, can be used. It is important to select the composition and the amount of additive elements according to the use applications. In Examples 16 to 18, a large coercivity difference can be imparted to a plane of the pressed powder material compared to Example 1; however, it is understood that Examples 16 to 18 are inferior in terms of magnetic permeability, the core loss, and durability. Comparative Examples 2 to 5 have a coercivity difference depending on the direction in the flat surface of the flaky magnetic metal particle, and also have a coercivity difference depending on the direction in a plane of the pressed powder material. However, the thicknesses and the aspect ratios of the flaky magnetic metal particles are not in the defined ranges. In this case, it is understood that the pressed powder materials are slightly inferior particularly in terms of the proportion of change over time in the magnetic permeability and the strength ratio. In summary, it is understood that the pressed powder materials of Examples 1 to 22 have excellent magnetic characteristics and mechanical characteristics, such as high saturation magnetization, high magnetic permeability, a low core loss, a small "proportion of change over time in the magnetic permeability", and high strength. Meanwhile, since the materials are pressed powder materials, the materials can be applied to complex shapes.

Example 22

A pressed powder material is obtained in almost the same manner as in Example 1, except that a resin intercalated phase (a polyimide-based resin having a glass transition temperature of 180° C.) is used instead of an inorganic oxide intercalated phase ($B_2O_3$—$Bi_2O_3$—ZnO). The weight reduction percentage after heating for 3,000 hours at 180° C. of the present resin intercalated phase was 5%. Furthermore, the weight reduction percentage of the present pressed powder material was 5% or less.

Example 23

A pressed powder material is obtained in almost the same manner as in Example 1, except that a resin intercalated phase (a crystalline polyimide-based resin that does not exhibit glass transition up to the thermal decomposition initiation temperature) is used instead of an inorganic oxide intercalated phase ($B_2O_3$—$Bi_2O_3$—ZnO). The present resin intercalated phase exhibited a weight reduction percentage after heating for 3,000 hours at 180° C. of 0.1% or less. Furthermore, the weight reduction percentage of the present pressed powder material was 0.1% or less.

Example 24

A pressed powder material is obtained in almost the same manner as in Example 1, except that a resin intercalated phase (a polyimide-based resin formed from an acid anhydride containing a biphenyl skeleton and an aromatic diamine and having a glass transition temperature of 280° C.) is used instead of an inorganic oxide intercalated phase ($B_2O_3$—$Bi_2O_3$—ZnO). The present resin intercalated phase exhibited a weight reduction percentage after heating for 3,000 hours at 220° C. of 2%. Furthermore, the weight reduction percentage of the present pressed powder material was 5% or less.

Example 25

A pressed powder material is obtained in almost the same manner as in Example 1, except that a resin intercalated phase (a crystalline polyimide-based resin that is formed from an acid anhydride containing a biphenyl skeleton and an aromatic diamine and does not exhibit glass transition up to the thermal decomposition initiation temperature) is used instead of an inorganic oxide intercalated phase ($B_2O_3$—$Bi_2O_3$—ZnO). The present resin intercalated phase exhibited a weight reduction percentage after heating for 3,000 hours at 220° C. of 0.1% or less. Furthermore, the weight reduction percentage of the present pressed powder material was 0.1% or less.

Comparative Example 6

A pressed powder material is obtained in almost the same manner as in Example 1, except that a resin intercalated phase (a polyimide-based resin having a glass transition temperature of 170° C.) is used instead of an inorganic oxide intercalated phase ($B_2O_3$—$Bi_2O_3$—ZnO). The present resin intercalated phase exhibited a weight reduction percentage after heating for 3,000 hours at 180° C. of 10%. Furthermore, the weight reduction percentage of the present pressed powder material was 5% or more.

Comparative Example 7

A pressed powder material is obtained in almost the same manner as in Example 1, except that a resin intercalated phase (an epoxy resin) is used instead of an inorganic oxide intercalated phase ($B_2O_3$—$Bi_2O_3$—ZnO). The present resin intercalated phase exhibited a weight reduction percentage after heating for 3,000 hours at 180° C. of 90%. Furthermore, the weight reduction percentage of the present pressed powder material was 5% or more.

Next, for the materials for evaluation of Examples 22 to 25 and Comparative Examples 6 and 7, the change over time in the real part of magnetic permeability ($\mu'$) upon heating for 3,000 hours at 180° C. or 220° C., the strength retention ratio, and the weight reduction percentage are evaluated by the following methods. The evaluation results are presented in Table 3. The materials for evaluation of Examples 22 to 25 and Comparative Examples 6 and 7 before heating, materials exhibiting a saturation magnetization of 1 T, a real part of magnetic permeability ($\mu'$) at a frequency of 100 Hz of 90, and a magnetic permeability loss (tan $\delta$) of almost zero, were used.

(1) Saturation magnetization: The saturation magnetization at room temperature is measured using a VSM.

(2) Real part of magnetic permeability, $\mu'$, and magnetic permeability loss (tan $\delta = \mu''/\mu' \times 100(\%)$): The magnetic permeability of a ring-shaped sample is measured using an impedance analyzer. The real part of magnetic permeability, $\mu'$, and the imaginary part of magnetic permeability, $\mu''$, at a frequency of 100 Hz are measured. Furthermore, the magnetic permeability loss or coefficient of loss, tan $\delta$, is calculated by the formula: $\mu''/\mu' \times 100(\%)$.

(3) Core loss: The core loss under the operating conditions of 100 Hz and 1 T is measured using a B—H analyzer. In a case in which the core loss cannot be directly measured under the conditions of 100 Hz and 1 T, the dependency on frequency and the dependency on the magnetic flux density of the core loss are measured, and the core loss at 100 Hz and 1 T is estimated from the data (then, this estimated value is employed).

(4) Strength: The flexural strength of a material for evaluation is measured according to the measurement method of JIS Z2248. In a case in which the material for evaluation is small and does not satisfy the requirement for the specimen shape as defined in JIS Z2248, a calibration curve drawn from a test piece having the same size and having a known flexural strength is used to estimate the flexural strength of the material for evaluation (and this estimated value is employed).

(5) Weight reduction percentage after 3,000 hours: The weight of a material for evaluation is measured using an electronic balance. The material for evaluation is heated for 3,000 hours at a temperature of 180° C. or 220° C. in an air atmosphere, and then the weight of the material for evaluation is measured again. Thereby, the weight reduction percentage (=(weight before heating−weight after heating)/weight before heating×100(%)) is determined.

(6) Change over time in real part of magnetic permeability, $\mu'$, after 3,000 hours: A material for evaluation is heated for 3,000 hours at a temperature of 180° C. or 220° C. in an air atmosphere, and then the real part of magnetic permeability, $\mu'$, is measured again. Thus, the proportion of change over time (real part of magnetic permeability, $\mu'$, after standing for 3,000 hours/real part of magnetic permeability, µ', before standing) is determined.

(7) Strength retention ratio after 3,000 hours: The flexural strength of a material for evaluation is measured. The material for evaluation is heated for 3,000 hours at a temperature of 180° C. or 220° C. in an air atmosphere, and then the flexural strength of the material for evaluation is measured again. Thus, the strength retention ratio (=flexural strength after heating/flexural strength before heating×100 (%)) is determined.

TABLE 3

|  | Strength | Proportion (%) of change over time in µ' | Strength retention ratio (%) |
|---|---|---|---|
| Example 22 | 130 MPa | 91 | 87 |
| Example 23 | 130 MPa | 98 | 93 |
| Example 24 | 150 MPa | 92 | 90 |
| Example 25 | 150 MPa | 98 | 93 |
| Comparative Example 6 | 120 MPa | 87 | 78 |
| Comparative Example 7 | 100 MPa | 76 | 12 |

As is obvious from Table 3, it is understood that the pressed powder materials of Examples 22 to 25 have superior proportions of change over time in the real part of magnetic permeability after 3,000 hours and superior strength retention ratios, compared to the pressed powder materials of Comparative Examples 6 and 7. That is, it is understood that Examples 22 to 25 have superior thermal stability. Furthermore, it is understood that Examples 24 and 25 are slightly superior in strength to Examples 22 and 23. That is, it is understood that Examples 24 and 25 have slightly superior mechanical characteristics and durability.

While certain embodiments have been described, these embodiments have been presented by way of example only, and are not intended to limit the scope of the inventions. Indeed, a plurality of flaky magnetic metal particles, a pressed powder material, and a rotating electric machine described herein may be embodied in a variety of other forms; furthermore, various omissions, substitutions and changes in the form of the devices and methods described herein may be made without departing from the spirit of the inventions. The accompanying claims and their equivalents are intended to cover such forms or modifications as would fall within the scope and spirit of the inventions.

What is claimed is:

1. A pressed powder material, comprising:
   a plurality of flaky magnetic metal particles, each flaky magnetic metal particle having a flat surface and a magnetic metal phase containing at least one primary element selected from the group consisting of Fe, Co, and Ni, and the flaky magnetic metal particles having an average thickness of between 10 nm and 100 µm inclusive and an average value of the ratio of the average length within the flat surface with respect to the thickness of between 5 and 10,000 inclusive; and
   an intercalated phase existing between the flaky magnetic metal particles, and the intercalated phase containing at least one secondary element selected from the group consisting of oxygen (O), carbon (C), nitrogen (N), and fluorine (F),
   wherein in the pressed powder material, the flat surfaces are oriented to be parallel to a plane of the pressed powder material and have a direction-induced coercivity difference within the plane.

2. The pressed powder material according to claim 1, wherein the proportion of the direction-induced coercivity difference within the plane is 1% or higher.

3. The pressed powder material according to claim 1, wherein the magnetic metal phase contains at least one additive element selected from the group consisting of B, Si, Al, C, Ti, Zr, Hf, Nb, Ta, Mo, Cr, Cu, W, P, N, Ga, and Y.

4. The pressed powder material according to claim 1, wherein the flat surface has either or both of a plurality of concavities and a plurality of convexities, the concavities or convexities being arranged in a first direction, and each of the concavities and convexities has a width of 0.1 µm or more, a length of 1 µm or more, and an aspect ratio of 2 or higher.

5. The pressed powder material according to claim 1, wherein the lattice strain of the flaky magnetic metal particles is between 0.01% and 10% inclusive.

6. The pressed powder material according to claim 1, wherein the intercalated phase contains a resin having a weight reduction percentage after heating for 3,000 hours at 180° C. of 5% or less.

7. The pressed powder material according to claim 1, wherein the pressed powder material has a weight reduction percentage after heating for 3,000 hours at 180° C. of 5% or less.

8. The pressed powder material according to claim 1, wherein the intercalated phase contains a resin having a glass transition temperature of 180° C. or higher.

9. The pressed powder material according to claim 1, wherein the intercalated phase contains a resin not having a glass transition point up to the thermal decomposition temperature.

10. The pressed powder material according to claim 1, wherein the intercalated phase comprises a polyimide resin.

11. The pressed powder material according to claim 10, wherein the polyimide resin contains a repeating unit represented by the following Chemical Formula (1):

[Chem. 1]

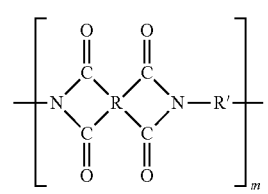

wherein in Chemical Formula (1), R represents any one of a biphenyl structure, a triphenyl structure, and a tetraphenyl structure; and R' represents a structure having at least one or more aromatic rings in the structure.

12. A rotating electric machine, comprising the pressed powder material according to claim 1.

* * * * *